(12) United States Patent
Berkovich et al.

(10) Patent No.: US 11,825,228 B2
(45) Date of Patent: Nov. 21, 2023

(54) PROGRAMMABLE PIXEL ARRAY HAVING MULTIPLE POWER DOMAINS

(71) Applicant: META PLATFORMS TECHNOLOGIES, LLC, Menlo Park, CA (US)

(72) Inventors: Andrew Samuel Berkovich, Bellevue, WA (US); Shlomo Alkalay, Redmond, WA (US); Hans Reyserhove, Seattle, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/324,803

(22) Filed: May 19, 2021

(65) Prior Publication Data

US 2021/0368124 A1    Nov. 25, 2021

Related U.S. Application Data

(60) Provisional application No. 63/088,807, filed on Oct. 7, 2020, provisional application No. 63/027,820, filed on May 20, 2020.

(51) Int. Cl.
*H04N 5/3745* (2011.01)
*H04N 5/378* (2011.01)
(Continued)

(52) U.S. Cl.
CPC ........... *H04N 25/771* (2023.01); *H04N 25/50* (2023.01); *H04N 25/709* (2023.01); *H04N 25/75* (2023.01)

(58) Field of Classification Search
CPC .. H04N 5/37452; H04N 5/351; H04N 5/3698; H04N 5/378; H04N 5/23241
See application file for complete search history.

(56) References Cited

U.S. PATENT DOCUMENTS 4,121,896 A    10/1978 Shepherd
6,384,905 B1    5/2002 Barrows
(Continued)

FOREIGN PATENT DOCUMENTS

CN    103207716 A    7/2013
CN    103907133 A    7/2014
(Continued)

OTHER PUBLICATIONS

U.S. Appl. No. 16/421,441, "Non-Final Office Action", dated May 7, 2021, 17 pages.
(Continued)

*Primary Examiner* — Nicholas G Giles
(74) *Attorney, Agent, or Firm* — Kilpatrick Townsend & Stockton LLP

(57) ABSTRACT

In some examples, an apparatus comprises an array of pixel cells, and processing circuits associated with blocks of pixel cells of the array of pixel cells and associated with first hierarchical power domains. The apparatus further includes banks of memory devices, each bank of memory devices being associated with a block of pixel cells, to store the quantization results of the associated block of pixel cells, the banks of memory devices further being associated with second hierarchical power domains. The apparatus further includes a processing circuits power state control circuit configured to control a power state of the processing circuits based on programming data targeted at each block of pixel cells and global processing circuits power state control signals, and a memory power state control circuit configured to control a power state of the banks of memory devices based on the programming data and global memory power state control signals.

20 Claims, 32 Drawing Sheets

(51) Int. Cl.
  *H04N 5/369*   (2011.01)
  *H04N 25/771*  (2023.01)
  *H04N 25/50*   (2023.01)
  *H04N 25/75*   (2023.01)
  *H04N 25/709*  (2023.01)

(56) References Cited

U.S. PATENT DOCUMENTS

| | | | |
|---|---|---|---|
| 6,853,579 B1 | 2/2005 | Chou | |
| 7,359,275 B1 | 4/2008 | Wu | |
| 7,362,355 B1 | 4/2008 | Yang et al. | |
| 7,659,925 B2 * | 2/2010 | Krymski | H04N 5/32 348/222.1 |
| 7,920,409 B1 | 4/2011 | Clark et al. | |
| 7,956,914 B2 | 6/2011 | Xu | |
| 7,969,759 B1 | 6/2011 | Thummalapally et al. | |
| 8,134,623 B2 | 3/2012 | Purcell et al. | |
| 8,441,535 B2 | 5/2013 | Morin | |
| 8,675,110 B2 | 3/2014 | Hirai et al. | |
| 8,779,346 B2 | 7/2014 | Fowler et al. | |
| 9,094,629 B2 | 7/2015 | Ishibashi | |
| 9,210,330 B2 | 12/2015 | Seo | |
| 9,282,264 B2 | 3/2016 | Park et al. | |
| 9,363,454 B2 | 6/2016 | Ito et al. | |
| 9,560,296 B2 | 1/2017 | Hseih et al. | |
| 9,646,681 B1 | 5/2017 | Jung et al. | |
| 9,723,233 B2 | 8/2017 | Grauer et al. | |
| 9,743,024 B2 | 8/2017 | Tyrrell et al. | |
| 9,826,175 B2 | 11/2017 | Isobe | |
| 9,832,370 B2 | 11/2017 | Cho et al. | |
| 9,912,885 B2 | 3/2018 | Isobe | |
| 9,955,091 B1 | 4/2018 | Dai et al. | |
| 10,007,350 B1 | 6/2018 | Holz et al. | |
| 10,090,342 B1 | 10/2018 | Gambino et al. | |
| 10,096,631 B2 * | 10/2018 | Ishizu | H01L 27/1225 |
| 10,154,221 B2 | 12/2018 | Ogino et al. | |
| 10,157,951 B2 | 12/2018 | Kim et al. | |
| 10,274,730 B2 | 4/2019 | Jepsen et al. | |
| 10,321,081 B2 | 6/2019 | Watanabe et al. | |
| 10,345,447 B1 | 7/2019 | Hicks | |
| 10,484,628 B2 | 11/2019 | Zhang et al. | |
| 10,515,284 B2 | 12/2019 | Gousev et al. | |
| 10,594,974 B2 | 3/2020 | Ivarsson et al. | |
| 10,607,413 B1 | 3/2020 | Marcolina et al. | |
| 10,715,824 B2 | 7/2020 | Tall et al. | |
| 10,726,627 B2 | 7/2020 | Liu | |
| 10,867,655 B1 | 12/2020 | Harms et al. | |
| 10,897,586 B2 | 1/2021 | Liu et al. | |
| 10,915,995 B2 | 2/2021 | Moloney | |
| 10,939,062 B2 | 3/2021 | Ogawa et al. | |
| 10,970,619 B1 | 4/2021 | Xiao et al. | |
| 10,984,235 B2 | 4/2021 | Gousev et al. | |
| 10,999,539 B2 | 5/2021 | Wendel et al. | |
| 11,057,581 B2 | 7/2021 | Liu | |
| 11,126,497 B2 | 9/2021 | Oh et al. | |
| 11,204,835 B2 | 12/2021 | Lu et al. | |
| 11,568,609 B1 | 1/2023 | Liu et al. | |
| 11,630,724 B2 | 4/2023 | Shin et al. | |
| 2002/0113886 A1 | 8/2002 | Hynecek | |
| 2003/0005231 A1 | 1/2003 | Ooi et al. | |
| 2003/0020100 A1 | 1/2003 | Guidash | |
| 2005/0057389 A1 | 3/2005 | Krymski | |
| 2005/0058773 A1 | 3/2005 | Hasei et al. | |
| 2005/0073874 A1 | 4/2005 | Chan et al. | |
| 2005/0237380 A1 | 10/2005 | Kakii et al. | |
| 2006/0224792 A1 | 10/2006 | Ooi | |
| 2007/0076109 A1 * | 4/2007 | Krymski | H04N 5/32 348/300 |
| 2007/0222881 A1 | 9/2007 | Mentzer | |
| 2008/0007731 A1 | 1/2008 | Botchway et al. | |
| 2008/0055736 A1 | 3/2008 | Tsuji et al. | |
| 2008/0226170 A1 | 9/2008 | Sonoda | |
| 2009/0033588 A1 | 2/2009 | Kajita et al. | |
| 2009/0245637 A1 | 10/2009 | Barman et al. | |
| 2010/0194956 A1 | 8/2010 | Yuan et al. | |
| 2010/0197821 A1 | 8/2010 | Jeong et al. | |
| 2010/0197876 A1 | 8/2010 | Lyu et al. | |
| 2010/0245600 A1 | 9/2010 | Chang et al. | |
| 2010/0276572 A1 | 11/2010 | Iwabuchi et al. | |
| 2011/0055461 A1 | 3/2011 | Steiner et al. | |
| 2011/0075470 A1 | 3/2011 | Liaw | |
| 2011/0155892 A1 | 6/2011 | Neter et al. | |
| 2011/0254986 A1 | 10/2011 | Nishimura et al. | |
| 2011/0267362 A1 | 11/2011 | Handschy et al. | |
| 2012/0002459 A1 | 1/2012 | Rimondi et al. | |
| 2012/0002460 A1 | 1/2012 | Rimondi et al. | |
| 2012/0044399 A1 | 2/2012 | Hirai et al. | |
| 2012/0086082 A1 | 4/2012 | Malinge et al. | |
| 2012/0105475 A1 | 5/2012 | Tseng | |
| 2012/0105668 A1 | 5/2012 | Velarde et al. | |
| 2012/0113119 A1 | 5/2012 | Massie | |
| 2012/0133807 A1 | 5/2012 | Wu et al. | |
| 2012/0161088 A1 | 6/2012 | Choi et al. | |
| 2012/0198312 A1 | 8/2012 | Kankani et al. | |
| 2012/0200499 A1 | 8/2012 | Osterhout et al. | |
| 2012/0212465 A1 | 8/2012 | White et al. | |
| 2012/0240007 A1 | 9/2012 | Barndt et al. | |
| 2012/0262616 A1 | 10/2012 | Sa et al. | |
| 2013/0056809 A1 | 3/2013 | Mao et al. | |
| 2013/0057742 A1 | 3/2013 | Nakamura et al. | |
| 2013/0068929 A1 | 3/2013 | Solhusvik et al. | |
| 2013/0069787 A1 | 3/2013 | Petrou | |
| 2013/0141619 A1 | 6/2013 | Lim et al. | |
| 2013/0185609 A1 | 7/2013 | Park et al. | |
| 2013/0187027 A1 | 7/2013 | Qiao et al. | |
| 2013/0198577 A1 | 8/2013 | Oh et al. | |
| 2013/0207219 A1 | 8/2013 | Ahn | |
| 2013/0215290 A1 | 8/2013 | Solhusvik et al. | |
| 2013/0293753 A1 | 11/2013 | Keelan et al. | |
| 2013/0299674 A1 | 11/2013 | Fowler et al. | |
| 2013/0300009 A1 | 11/2013 | Oganesian et al. | |
| 2013/0314591 A1 | 11/2013 | Eromaki | |
| 2013/0326116 A1 | 12/2013 | Goss et al. | |
| 2014/0042299 A1 | 2/2014 | Wan et al. | |
| 2014/0055635 A1 | 2/2014 | Seo | |
| 2014/0063250 A1 | 3/2014 | Park | |
| 2014/0170345 A1 | 6/2014 | Aoshima et al. | |
| 2014/0247382 A1 | 9/2014 | Moldovan et al. | |
| 2014/0368687 A1 | 12/2014 | Yu et al. | |
| 2015/0050479 A1 | 2/2015 | Nakamura et al. | |
| 2015/0050480 A1 | 2/2015 | Suzuki et al. | |
| 2015/0085134 A1 | 3/2015 | Novotny et al. | |
| 2015/0158259 A1 | 6/2015 | Yamamoto et al. | |
| 2015/0189209 A1 | 7/2015 | Yang et al. | |
| 2015/0201142 A1 | 7/2015 | Smith et al. | |
| 2015/0222827 A1 | 8/2015 | Isobe | |
| 2015/0229859 A1 | 8/2015 | Guidash et al. | |
| 2015/0279884 A1 | 10/2015 | Kusumoto | |
| 2015/0309311 A1 | 10/2015 | Cho | |
| 2015/0309316 A1 | 10/2015 | Osterhout et al. | |
| 2015/0312502 A1 | 10/2015 | Borremans | |
| 2015/0358571 A1 | 12/2015 | Dominguez Castro et al. | |
| 2015/0381911 A1 | 12/2015 | Shen et al. | |
| 2016/0011422 A1 | 1/2016 | Thurber et al. | |
| 2016/0018645 A1 | 1/2016 | Haddick et al. | |
| 2016/0021302 A1 | 1/2016 | Cho et al. | |
| 2016/0028974 A1 | 1/2016 | Guidash et al. | |
| 2016/0032074 A1 | 2/2016 | Aizenberg et al. | |
| 2016/0078614 A1 | 3/2016 | Ryu et al. | |
| 2016/0088253 A1 | 3/2016 | Tezuka | |
| 2016/0100115 A1 | 4/2016 | Kusano | |
| 2016/0165160 A1 | 6/2016 | Hseih et al. | |
| 2016/0210785 A1 | 7/2016 | Balachandreswaran et al. | |
| 2016/0344965 A1 | 11/2016 | Grauer et al. | |
| 2016/0360127 A1 | 12/2016 | Dierickx et al. | |
| 2017/0039906 A1 | 2/2017 | Jepsen | |
| 2017/0041571 A1 | 2/2017 | Tyrrell et al. | |
| 2017/0117310 A1 | 4/2017 | Tatani et al. | |
| 2017/0154909 A1 * | 6/2017 | Ishizu | G09G 3/2092 |
| 2017/0161579 A1 | 6/2017 | Gousev et al. | |
| 2017/0228345 A1 | 8/2017 | Gupta et al. | |
| 2017/0248789 A1 | 8/2017 | Yokoyama | |
| 2017/0270664 A1 | 9/2017 | Hoogi et al. | |
| 2017/0272768 A1 | 9/2017 | Tall et al. | |

(56) References Cited

U.S. PATENT DOCUMENTS

| | | |
|---|---|---|
| 2017/0280031 A1 | 9/2017 | Price et al. |
| 2017/0293799 A1 | 10/2017 | Skogo et al. |
| 2017/0307887 A1 | 10/2017 | Stenberg et al. |
| 2017/0310910 A1 | 10/2017 | Smith et al. |
| 2017/0338262 A1 | 11/2017 | Hirata |
| 2017/0339327 A1 | 11/2017 | Koshkin et al. |
| 2018/0027174 A1 | 1/2018 | Sengoku |
| 2018/0115725 A1 | 4/2018 | Zhang et al. |
| 2018/0136471 A1 | 5/2018 | Miller et al. |
| 2018/0143701 A1* | 5/2018 | Suh ................. H04N 5/3698 |
| 2018/0167575 A1 | 6/2018 | Watanabe et al. |
| 2018/0176545 A1 | 6/2018 | Aflaki Beni |
| 2018/0204867 A1 | 7/2018 | Kim et al. |
| 2018/0211582 A1 | 7/2018 | Sakariya et al. |
| 2018/0224658 A1 | 8/2018 | Teller |
| 2018/0239108 A1 | 8/2018 | Ishii et al. |
| 2018/0241953 A1 | 8/2018 | Johnson |
| 2018/0252857 A1 | 9/2018 | Glik et al. |
| 2018/0270436 A1 | 9/2018 | Ivarsson et al. |
| 2018/0276841 A1 | 9/2018 | Krishnaswamy et al. |
| 2018/0284594 A1 | 10/2018 | Gao |
| 2019/0019023 A1 | 1/2019 | Konttori et al. |
| 2019/0027454 A1 | 1/2019 | Chen et al. |
| 2019/0035154 A1 | 1/2019 | Liu |
| 2019/0046044 A1 | 2/2019 | Tzvieli et al. |
| 2019/0098232 A1 | 3/2019 | Mori et al. |
| 2019/0110039 A1 | 4/2019 | Linde et al. |
| 2019/0123088 A1 | 4/2019 | Kwon |
| 2019/0149751 A1 | 5/2019 | Wise |
| 2019/0172227 A1 | 6/2019 | Kasahara |
| 2019/0191116 A1 | 6/2019 | Madurawe |
| 2019/0199946 A1 | 6/2019 | Wendel et al. |
| 2019/0204527 A1 | 7/2019 | Nakajima |
| 2019/0246036 A1 | 8/2019 | Wu et al. |
| 2019/0253650 A1 | 8/2019 | Kim |
| 2019/0307313 A1 | 10/2019 | Wade |
| 2019/0331914 A1 | 10/2019 | Lee et al. |
| 2019/0361250 A1 | 11/2019 | Lanman et al. |
| 2019/0363118 A1 | 11/2019 | Berkovich et al. |
| 2020/0035661 A1 | 1/2020 | Yu et al. |
| 2020/0053299 A1 | 2/2020 | Zhang et al. |
| 2020/0098096 A1 | 3/2020 | Moloney |
| 2020/0193206 A1 | 6/2020 | Turkelson et al. |
| 2020/0195828 A1 | 6/2020 | Reyserhove et al. |
| 2020/0195875 A1 | 6/2020 | Berkovich et al. |
| 2020/0273784 A1 | 8/2020 | Mallik et al. |
| 2021/0026796 A1 | 1/2021 | Graif et al. |
| 2021/0110187 A1 | 4/2021 | Pillai et al. |
| 2021/0118847 A1 | 4/2021 | Chuang et al. |
| 2021/0142086 A1 | 5/2021 | Berkovich et al. |
| 2021/0185264 A1* | 6/2021 | Wong ................. H04N 5/23232 |
| 2021/0227159 A1* | 7/2021 | Sambonsugi ........ H04N 5/3698 |
| 2021/0264679 A1 | 8/2021 | Liu et al. |
| 2021/0283871 A1 | 9/2021 | Lee et al. |
| 2021/0306586 A1 | 9/2021 | Yamamoto et al. |
| 2021/0368124 A1 | 11/2021 | Berkovich et al. |
| 2021/0409625 A1 | 12/2021 | Zhu et al. |
| 2022/0021833 A1 | 1/2022 | Berkovich |
| 2022/0076726 A1 | 3/2022 | Hulton et al. |

FOREIGN PATENT DOCUMENTS

| | | |
|---|---|---|
| CN | 104204904 A | 12/2014 |
| CN | 106255978 A | 12/2016 |
| CN | 106791504 A | 5/2017 |
| CN | 107005641 A | 8/2017 |
| CN | 109298528 A | 2/2019 |
| DE | 102015122055 A1 | 6/2017 |
| EP | 0775591 A2 | 5/1997 |
| EP | 1603170 A1 | 12/2005 |
| EP | 1746820 A1 | 1/2007 |
| EP | 1788802 A1 | 5/2007 |
| EP | 2037505 A1 | 3/2009 |
| EP | 2228846 A1 | 9/2010 |
| EP | 2330173 A2 | 6/2011 |
| EP | 2357679 A2 | 8/2011 |
| EP | 2804074 A2 | 11/2014 |
| EP | 3229457 A1 | 10/2017 |
| EP | 3833005 A1 | 6/2021 |
| JP | 2003319262 A | 11/2003 |
| JP | 2005129139 A | 5/2005 |
| JP | 2006348085 A | 12/2006 |
| JP | 2008270500 A | 11/2008 |
| JP | 2013043383 A | 3/2013 |
| KR | 20110100974 A | 9/2011 |
| WO | 2014055391 A2 | 4/2014 |
| WO | 2016095057 A1 | 6/2016 |
| WO | 2017003477 A1 | 1/2017 |
| WO | 2017013806 A1 | 1/2017 |
| WO | 2017047010 A1 | 3/2017 |
| WO | 2018231962 A1 | 12/2018 |
| WO | 2019018084 A1 | 1/2019 |
| WO | 2019111528 A1 | 6/2019 |
| WO | 2019145578 A1 | 8/2019 |
| WO | 2019178060 A1 | 9/2019 |
| WO | 2019244142 A2 | 12/2019 |
| WO | 2020077283 A1 | 4/2020 |

OTHER PUBLICATIONS

U.S. Appl. No. 16/715,792, "Non-Final Office Action", dated Jan. 1, 2021, 15 pages.
U.S. Appl. No. 16/715,792, "Notice of Allowance", dated Apr. 16, 2021, 10 pages.
U.S. Appl. No. 16/715,792, "Notice of Allowance", dated Aug. 25, 2021, 9 pages.
U.S. Appl. No. 16/716,050, "Non-Final Office Action", dated May 14, 2021, 16 pages.
U.S. Appl. No. 17/083,920, "Non-Final Office Action", dated Apr. 21, 2021, 17 pages.
PCT/US2019/034007, "International Search Report and Written Opinion", dated Oct. 28, 2019, 19 pages.
PCT/US2019/066805, "International Search Report and Written Opinion", dated Mar. 6, 2020, 13 pages.
PCT/US2019/066831, "International Search Report and Written Opinion", dated Feb. 27, 2020, 15 pages.
PCT/US2020/044807, "International Search Report and Written Opinion", dated Sep. 30, 2020, 12 pages.
PCT/US2020/059636, "International Search Report and Written Opinion", dated Feb. 11, 2021, 18 pages.
Final Office Action dated Oct. 18, 2021 for U.S. Appl. No. 16/716,050, filed Dec. 16, 2019, 18 Pages.
Final Office Action dated Oct. 21, 2021 for U.S. Appl. No. 16/421,441, filed May 23, 2019, 23 Pages.
Final Office Action dated Jul. 28, 2021 for U.S. Appl. No. 17/083,920, filed Oct. 29, 2020, 19 Pages.
Non-Final Office Action dated Oct. 21, 2021 for U.S. Appl. No. 17/083,920, filed Oct. 29, 2020, 19 Pages.
Restriction Requirement dated Feb. 2, 2021 for U.S. Appl. No. 16/716,050, filed Dec. 16, 2019, 7 Pages.
Advisory Action dated Oct. 1, 2021 for U.S. Appl. No. 17/083,920, filed Oct. 29, 2020, 4 pages.
Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.
Cho K., et al., "A Low Power Dual CDS for a Column-Parallel CMOS Image Sensor," Journal of Semiconductor Technology and Science, Dec. 30, 2012, vol. 12 (4), pp. 388-396.
Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.
Corrected Notice of Allowability dated Apr. 9, 2021 for U.S. Appl. No. 16/255,528, filed Jan. 23, 2019, 5 Pages.
Corrected Notice of Allowance dated Mar. 22, 2022 for U.S. Appl. No. 16/716,050, filed Dec. 16, 2019, 2 Pages.
Extended European Search Report for European Application No. 18179846.3, dated Dec. 7, 2018, 10 Pages.

(56) References Cited

OTHER PUBLICATIONS

Extended European Search Report for European Application No. 18179851.3, dated Dec. 7, 2018, 8 Pages.
Extended European Search Report for European Application No. 19743908.6, dated Sep. 30, 2020, 9 Pages.
Final Office Action dated Jan. 27, 2021 for U.S. Appl. No. 16/255,528, filed Jan. 23, 2019, 31 Pages.
International Preliminary Report on Patentability for International Application No. PCT/US2020/044807, dated Feb. 17, 2022, 10 pages.
International Search Report and Written Opinion for International Application No. PCT/US2018/039350, dated Nov. 15, 2018, 11 Pages.
International Search Report and Written Opinion for International Application No. PCT/US2018/039352, dated Oct. 26, 2018, 8 Pages.
International Search Report and Written Opinion for International Application No. PCT/US2018/039431, dated Nov. 7, 2018, 12 Pages.
International Search Report and Written Opinion for International Application No. PCT/US2020/058097, dated Feb. 12, 2021, 09 Pages.
International Search Report and Written Opinion for International Application No. PCT/US2021/031201, dated Aug. 2, 2021, 13 Pages.
International Search Report and Written Opinion for International Application No. PCT/US2021/033321, dated Sep. 6, 2021, 11 pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action dated Mar. 2, 2022 for U.S. Appl. No. 17/127,670, filed Dec. 18, 2020, 18 pages.
Non-Final Office Action dated Sep. 2, 2021 for U.S. Appl. No. 16/910,844, filed Jun. 24, 2020, 7 Pages.
Non-Final Office Action dated Jul. 10, 2020 for U.S. Appl. No. 16/255,528, filed Jan. 23, 2019, 27 Pages.
Non-Final Office Action dated Nov. 23, 2018 for U.S. Appl. No. 15/847,517, filed Dec. 19, 2017, 21 Pages.
Non-Final Office Action dated Jul. 25, 2019 for U.S. Appl. No. 15/909,162, filed Mar. 1, 2018, 20 Pages.
Notice of Allowance dated Apr. 1, 2021 for U.S. Appl. No. 16/255,528, filed Jan. 23, 2019, 7 Pages.
Notice of Allowance dated Mar. 7, 2022 for U.S. Appl. No. 16/421,441, filed May 23, 2019, 18 pages.
Notice of Allowance dated Mar. 11, 2022 for U.S. Appl. No. 16/716,050, filed Dec. 16, 2019, 13 pages.
Notice of Allowance dated Feb. 14, 2022 for U.S. Appl. No. 16/715,792, filed Dec. 16, 2019, 9 pages.
Notice of Allowance dated Mar. 18, 2020 for U.S. Appl. No. 15/909,162, filed Mar. 1, 2018, 9 Pages.
Notice of Allowance dated Apr. 20, 2022 for U.S. Appl. No. 17/083,920, filed Oct. 29, 2020, 06 pages.
Notice of Allowance dated Dec. 22, 2021 for U.S. Appl. No. 16/910,844, filed Jun. 24, 2020, 7 pages.
Notice of Allowance dated Feb. 22, 2022 for U.S. Appl. No. 17/083,920, filed Oct. 29, 2020, 10 pages.
Notice of Allowance dated Nov. 24, 2021 for U.S. Appl. No. 16/910,844, filed Jun. 24, 2020, 8 pages.
Office Action dated Jul. 3, 2020 for Chinese Application No. 201810821296, filed Jul. 24, 2018, 17 Pages.
Office Action dated Mar. 9, 2021 for Chinese Application No. 201810821296, filed Jul. 24, 2018, 10 Pages.
Office Action dated Jun. 28, 2020 for Chinese Application No. 201810821296, filed Jul. 24, 2018, 2 Pages.
Partial European Search Report for European Application No. 18179838.0, dated Dec. 5, 2018, 13 Pages.

Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Office Action dated Apr. 5, 2022 for European Patent Application No. 19731047.7, filed May 24, 2019, 7 pages.
Invitation to Pay Additional Fees and Where Applicable, Protest Fee for International Application No. PCT/US2021/041775, Oct. 8, 2021, 12 pages.
Notice of Allowance dated Jun. 17, 2022 for U.S. Appl. No. 16/715,792, filed Dec. 16, 2019, 2 pages.
Notice of Allowance dated Jun. 2, 2022 for U.S. Appl. No. 16/716,050, filed Dec. 16, 2019, 13 pages.
Notice of Allowance dated Jun. 24, 2022 for U.S. Appl. No. 16/421,441, filed May 23, 2019, 17 pages.
Notice of Allowance dated May 24, 2022 for U.S. Appl. No. 16/715,792, filed Dec. 16, 2019, 9 pages.
Final Office Action dated Oct. 6, 2022 for U.S. Appl. No. 17/127,670, filed Dec. 18, 2020, 20 pages.
Non-Final Office Action dated Nov. 2, 2022 for U.S. Appl. No. 16/983,863, filed Aug. 3, 2020, 20 pages.
Notice of Allowance dated Sep. 2, 2022 for U.S. Appl. No. 16/715,792, filed Dec. 16, 2019, 9 pages.
Notice of Allowance dated Sep. 6, 2022 for U.S. Appl. No. 16/421,441, filed May 23, 2019, 17 pages.
Notice of Allowance dated Sep. 9, 2022 for U.S. Appl. No. 17/083,920, filed Oct. 29, 2020, 10 pages.
Notice of Allowance dated Sep. 9, 2022 for U.S. Appl. No. 17/091,331, filed Nov. 6, 2020, 2 pages.
Notice of Allowance dated Sep. 19, 2022 for U.S. Appl. No. 16/716,050, filed Dec. 16, 2019, 13 pages.
Notice of Allowance dated Sep. 28, 2022 for U.S. Appl. No. 16/716,050, filed Dec. 16, 2019, 6 pages.
Office Action dated Aug. 11, 2022 for European Patent Application No. 19731047.7, filed May 24, 2019, 10 pages.
Office Action dated Aug. 17, 2022 for Chinese Application No. 201980083991.5, filed Jun. 17, 2021, 24 pages.
Notice of Allowance dated Aug. 24, 2022 for U.S. Appl. No. 17/091,331, filed Nov. 6, 2020, 9 pages.
Office Action dated Jul. 29, 2022 for Taiwan Application No. 108118209, filed May 27, 2019, 15 pages.
Corrected Notice of Allowance dated Apr. 18, 2023 for U.S. Appl. No. 17/127,670, filed Mar. 5, 2021, 2 pages.
Final Office Action dated Apr. 12, 2023 for U.S. Appl. No. 16/983,863, filed Aug. 3, 2020, 21 pages.
International Search Report and Written Opinion for International Application No. PCT/US2022/034259, dated Oct. 21, 2022, 10 pages.
International Search Report and Written Opinion for International Application No. PCT/US2023/011630, dated Apr. 6, 2023, 10 pages.
Non-Final Office Action dated Feb. 2, 2023 for U.S. Appl. No. 17/469,258, filed Sep. 8, 2021, 17 pages.
Non-Final Office Action dated Mar. 6, 2023 for U.S. Appl. No. 17/992,648, filed Nov. 22, 2022, 24 pages.
Notice of Allowance dated Feb. 7, 2023 for U.S. Appl. No. 17/083,920, filed Oct. 29, 2020, 10 pages.
Notice of Allowance dated Apr. 19, 2023 for U.S. Appl. No. 16/715,792, filed Dec. 16, 2019, 9 pages.
Notice of Allowance dated Jan. 26, 2023 for U.S. Appl. No. 16/716,050, filed Dec. 16, 2019, 14 pages.
Notice of Allowance dated Mar. 27, 2023 for U.S. Appl. No. 17/127,670, filed Dec. 18, 2020, 9 pages.
Notice of Allowance dated Mar. 28, 2023 for U.S. Appl. No. 17/091,331, filed Nov. 6, 2020, 5 pages.
Office Action dated Feb. 11, 2023 for Chinese Application No. 201980048866.0, filed May 24, 2019, 20 Pages.

(56) References Cited

OTHER PUBLICATIONS

Office Action dated Feb. 13, 2023 for Taiwan Application No. 108146255, filed Dec. 17, 2019, 30 pages.
Office Action dated Mar. 14, 2023 for Taiwan Application No. 108146257, filed Dec. 17, 2019, 25 pages.
Office Action dated Mar. 23, 2023 for Chinese Application No. 201980083991.5, filed Jun. 17, 2021, 21 pages.
Amir M.F., et al., "NeuroSensor: A 3D Image Sensor with Integrated Neural Accelerator," IEEE SOI-3D-Subthreshold Microelectronics Technology Unified Conference (S3S), Oct. 2016, pp. 1-2.
Non-Final Office Action dated Jun. 30, 2023 for U.S. Appl. No. 17/556,436, filed Dec. 20, 2021, 25 pages.
Notice of Allowance dated Jun. 7, 2023 for U.S. Appl. No. 16/716,050, filed Dec. 16, 2019, 18 pages.
Notice of Allowance dated May 15, 2023 for U.S. Appl. No. 16/421,441, filed May 23, 2019, 10 pages.
Notice of Allowance dated Jul. 18, 2023 for U.S. Appl. No. 17/091,331, filed Nov. 6, 2020, 7 pages.
Devlin N.R., et al., "Patterning Decomposable Polynorbornene with Electron Beam Lithography to Create Nanochannels," Journal of Vacuum Science and Technology, vol. 27, No. 6, Dec. 1, 2009, pp. 2508-2511.
Dong J., et al., "Self-Assembly of Highly Stable Zirconium(IV) Coordination Cages with Aggregation Induced Emission Molecular Rotors for Live-Cell Imaging," Angewandte Chemie International Edition, vol. 59, No. 25, Jun. 15, 2020, 10 pages.
International Preliminary Report on Patentability for International Application No. PCT/US2020/058439, dated Jun. 23, 2022, 11 pages.
International Preliminary Report on Patentability for International Application No. PCT/US2020/059560, dated Jun. 16, 2022, 8 pages.
International Preliminary Report on Patentability for International Application No. PCT/US2020/061218, dated Jun. 9, 2022, 9 pages.
International Preliminary Report on Patentability for International Application No. PCT/US2020/062991, dated Jul. 7, 2022, 8 pages.
International Preliminary Report on Patentability for International Application No. PCT/US2020/066992, dated Jul. 7, 2022, 27 pages.
International Preliminary Report on Patentability for International Application No. PCT/US2021/014970, dated Sep. 9, 2022, 7 pages.
International Preliminary Report on Patentability for International Application No. PCT/US2021/016158, dated Aug. 18, 2022, 7 pages.
International Search Report and Written Opinion for International Application No. PCT/US2020/056758, dated Feb. 17, 2021, 11 Pages.
International Search Report and Written Opinion for International Application No. PCT/US2020/058439, dated Apr. 6, 2021, 16 Pages.
International Search Report and Written Opinion for International Application No. PCT/US2020/059560, dated Feb. 9, 2021, 9 Pages.
International Search Report and Written Opinion for International Application No. PCT/US2020/061218, dated Feb. 16, 2021, 11 pages.
International Search Report and Written Opinion for International Application No. PCT/US2020/062991, dated Feb. 24, 2021, 9 Pages.
International Search Report and Written Opinion for International Application No. PCT/US2020/066992, dated May 17, 2021, 31 Pages.
International Search Report and Written Opinion for International Application No. PCT/US2021/014970, dated Apr. 26, 2021, 8 Pages.
Khaled S.R., "A Review of Piezoelectric Polymers as Functional Materials for Electromechanical Transducers," Smart Materials and Structures, IOP Publishing LTD, Bristol, GB, Jan. 20, 2014 [retrieved on Jan. 20, 2014], vol. 23 (3), Article 33001, 29 pages, XP020258249, ISSN: 0964-1726, DOI: 10.1088/0964-1726/23/3/033001.
Levola T., "Diffractive Optics for Virtual Reality Displays," Journal of the Society for Information Display—SID, May 2006, vol. 14 (5), pp. 467-475, XP008093627.
Non-Final Office Action dated Jul. 22, 2021 for U.S. Appl. No. 16/834,605, filed Mar. 30, 2020, 12 pages.
Notice of Allowance dated Aug. 16, 2023 for U.S. Appl. No. 16/715,792, filed Dec. 16, 2019, 9 pages.
Notice of Allowance dated Mar. 22, 2022 for U.S. Appl. No. 16/834,605, filed Mar. 30, 2020, 8 pages.
Notice of Allowance dated May 31, 2022 for U.S. Appl. No. 16/706,859, filed Dec. 9, 2019, 13 pages.
Notice of Allowance dated Aug. 22, 2023 for U.S. Appl. No. 17/992,648, filed Nov. 22, 2022, 10 pages.

\* cited by examiner

| Total current | Quantization resolution |
|---|---|
| IQ0 | 1-bit |
| IQ1 | 2-bit |
| IQ2 | 4-bit |
| IQ3 | 8-bit |
| IQ4 | 16-bit |

FIG. 11B

| Total current | Supported memory operation |
|---|---|
| 0 | None – disabled |
| IM0 | Retain data, no read/write access |
| IM1 | Full read/write access |

```
┌─────────────────────────────────────────────────────────────────────┐
│ Receiving a pixel array programming map, the pixel array            │
│ programming map comprising programming data targeted at each block  │
│ of pixel cells of an array of pixel cells of an image sensor, the   │
│ image sensor further comprising processing circuits and banks of    │
│ memory devices, the processing circuits and the banks of memory     │
│ devices being associated with blocks of pixel cells of the array of │
│ pixel cells, the processing circuits further being associated with  │
│ first hierarchical power domains comprising a processing circuits   │
│ power domain and processing circuits power sub-domains, the banks   │
│ of memory devices further being associated with second hierarchical │
│ power domains comprising a memory power domain and memory power     │
│ sub-domains, wherein the processing circuits associated with        │
│ different blocks of pixel cells are associated with different       │
│ processing circuits power sub-domains, and wherein the banks of     │
│ memory devices associated with different blocks of pixel cells are  │
│ associated with different memory power sub-domains                  │
└─────────────────────────────────────────────────────────────────────┘
```
─1302

```
┌─────────────────────────────────────────────────────────────────────┐
│ Transmitting the programming data to each targeted block of pixel   │
│ cells to individually configure first power states of the           │
│ processing circuits associated with different processing circuits   │
│ power sub-domains and to individually configure second power states │
│ of banks of memory associated with different memory power           │
│ sub-domains                                                         │
└─────────────────────────────────────────────────────────────────────┘
```
─1304

```
┌─────────────────────────────────────────────────────────────────────┐
│ Transmitting a global processing circuits power state control       │
│ signal to configure the processing circuits of the processing       │
│ circuits power domain to switch from the first power states to a    │
│ same third power state                                              │
└─────────────────────────────────────────────────────────────────────┘
```
─1306

```
┌─────────────────────────────────────────────────────────────────────┐
│ Transmitting a global memory power state control signal to          │
│ configure the banks of memory devices of the memory power domain to │
│ switch from the second power states have a same fourth power state  │
└─────────────────────────────────────────────────────────────────────┘
```
─1308

FIG. 13

PROGRAMMABLE PIXEL ARRAY HAVING MULTIPLE POWER DOMAINS

RELATED APPLICATION

This patent application claims priority to U.S. Provisional Patent Application Ser. No. 63/027,820, filed May 20, 2020, entitled "FINE-GRAIN POWER GATING FOR IMAGE SENSOR" and U.S. Provisional Patent Application Ser. No. 63/088,807, filed Oct. 7, 2020, entitled "FINE-GRAIN POWER GATING FOR IMAGE SENSOR," which are assigned to the assignee hereof and are incorporated herein by reference in their entirety for all purposes.

BACKGROUND

The disclosure relates generally to image sensors, and more specifically to image sensors comprising a programmable pixel array.

A typical image sensor includes an array of pixel cells. Each pixel cell may include a photodiode to sense light by converting photons into charge (e.g., electrons or holes). The charge converted at each pixel cell can be quantized to become a digital pixel value, and an image can be generated from an array of digital pixel values. Many applications may require the image sensor to provide high-resolution images and/or images at high frame rates.

SUMMARY

The present disclosure relates to image sensors. More specifically, and without limitation, this disclosure relates to an image sensor having a programmable pixel cell array.

In some examples, an apparatus is provided. The apparatus comprises: an array of pixel cells, each pixel cell of the array of pixel cells including one or more photodiodes configured to detect light; processing circuits being associated with blocks of pixel cells of the array of pixel cells, the processing circuits being configured to quantize an intensity of the light detected by the one or more photodiodes of the associated block of pixel cells to generate quantization results, the processing circuits further being associated with first hierarchical power domains comprising a processing circuits power domain and processing circuits power sub-domains, wherein the processing circuits associated with different blocks of pixel cells are associated with different processing circuits power sub-domains; banks of memory devices, each bank of memory devices being associated with a block of pixel cells, the bank of memory devices being configured to store the quantization results of the associated block of pixel cells, the banks of memory devices further being associated with second hierarchical power domains comprising a memory power domain and memory power sub-domains, wherein the banks of memory devices associated with different blocks of pixel cells are associated with different memory power sub-domains; a processing circuits power state control circuit configured to control a power state of the processing circuits; a memory power state control circuit configured to control a power state of the banks of memory devices; and a pixel cell array control circuit configured to: receive a pixel array programming map, the pixel array programming map comprising programming data targeted at each block of pixel cells of the array of pixel cells; transmit the programming data to each targeted block of pixel cells to individually configure first power states of the processing circuits associated with different processing circuits power sub-domains and to individually configure second power states of banks of memory associated with different memory power sub-domains; transmit, using the processing circuits power state control circuit, a global processing circuits power state control signal to configure the processing circuits of the processing circuits power domain to switch from the first power states to a same third power state; and transmit, using the memory power state control circuit, a global memory power state control signal to configure the banks of memory devices of the memory power domain to switch from the second power states to a same fourth power state.

In some aspects, each block of pixel cells comprises a pixel cell, and wherein the processing circuits and a bank of memory devices associated with the block of pixel cells are part of the pixel cell.

In some aspects, each block of pixel cells comprises a plurality of pixel cells, and wherein each pixel cell of the block takes turns in accessing the processing circuits and a bank of memory devices associated with the block of pixel cells.

In some aspects, the processing circuits power domain is associated with the processing circuits of each block of pixel cells. The first hierarchical power domain further includes first level processing circuits power sub-domains and second level processing circuits power sub-domains. Each first level processing circuits power sub-domain is associated with processing circuits of blocks of pixel cells of the same column. Each second level processing circuits power sub-domain is associated with processing circuits of a block of pixel cells.

In some aspects, the processing circuits power state control circuit comprises: a global processing circuits power state control circuit configured to set a power state of all processing circuits of the processing circuits power domain, and column processing circuits power state control circuits configured to individually set a power state of the processing circuits of each column of blocks of pixel cells associated with each first level processing circuits power domain. Each block of pixel cells includes a local processing circuits power state control circuit configured to set a power state of the processing circuits of the block of pixel cells associated with a second level processing circuits power domain.

In some aspects, the global processing circuits power state control circuit is configured to transmit the global processing circuits power state control signal to each column processing circuits power state control circuit to set an upper limit of the power state of all processing circuits of the processing circuits power domain. Each column processing circuits power state control circuit is configured to, based on the global processing circuits power state control signal, transmit a column processing circuits power state control signal to each block of pixel cells of the column to set an upper limit of the power state of all processing circuits of the column. The local processing circuits power state control circuit of each block of pixel cells is configured to set the power state of the processing circuits of the block of pixel cells based on the column processing circuits power state control signal and the programming data.

In some aspects, the memory power domain is associated with the bank of memory devices of each block of pixel cells. The second hierarchical power domains further include first level memory power sub-domains and second level memory power sub-domains. Each first level memory power sub-domain is associated with banks of memory devices of blocks of pixel cells of the same column. Each second level memory power sub-domain is associated with a bank of memory devices of a block of pixel cells.

In some aspects, the second hierarchical power domains further include third level memory power sub-domains associated with different subsets of memory devices within a bank of memory devices.

In some aspects, the memory power state control circuit comprises: a global memory power state control circuit configured to set a power state of all banks of memory devices of the memory power domain; and column memory power state control circuits configured to individually set a power state of the banks of memory devices of each column of blocks of pixel cells associated with each first level memory power domain. Each block of pixel cells includes a local memory power state control circuit configured to set power states of different subsets of memory devices of the bank of memory devices of the block of pixel cells associated with different third level memory power domains of the second level memory power domain of the block of pixel cells.

In some aspects, the global memory power state control circuit is configured to transmit the global memory power state control signal to each column memory power state control circuit to set an upper limit of the power state of all banks of memory devices of the memory power domain. Each column memory power state control circuit is configured to, based on the global memory power state control signal, transmit a column memory power state control signal to each block of pixel cells of the column to set an upper limit of the power state of all banks of memory of the column. The local memory power state control circuit of each block of pixel cells is configured to set the power states of the different subsets of memory devices of the bank of memory devices of the block of pixel cells based on the column memory power state control signal and the programming data.

In some aspects, the programming data indicate, for each block of pixel cells, one of: the block of pixel cells being fully enabled, the block of pixel cells being disabled, or a performance mode of the block of pixel cells.

In some aspects, the processing circuits associated with a block of pixel cells comprise a quantizer. The programming data indicate a quantization resolution of the quantizer. The quantizer is configured based on at least one of the programming data or the global processing circuits power state control signal to generate the quantization result at the quantization resolution. A subset of memory devices of the bank of memory devices associated with the block of pixel cells is configured based on at least one of the programming data or the global memory power state control signal to store the quantization result having the quantization resolution.

In some aspects, the quantizer is configured to generate the quantization result at the quantization resolution based on setting a bias current, the bias current being based on the at least one of the programming data or the global processing circuits power state control signal.

In some aspects, the banks of memory devices are configured to operate, based on the global memory power state control signal, in one of: a fully disabled mode, a full operation mode that supports read and write access operations, and a partial operation mode that retains the stored data but does not support read and write access operations.

In some aspects, the apparatus further comprises a first hierarchical network of multiplexors and a second hierarchical network of multiplexors. The global processing circuits power state control signal is transmitted via the first hierarchical network of multiplexors. The global memory power state control signal is transmitted via the second hierarchical network of multiplexors.

In some aspects, the apparatus further includes a bias generator configured to supply bias voltages to the processing circuits, a digital ramp circuit and an analog threshold generation circuit configured to supply signals to the processing circuits to support the generation of the quantization results by the processing circuits. The bias generator, the digital ramp circuit, and the analog threshold generation circuit are associated with different processing circuits power sub-domains of the processing circuits power domain. The pixel cell array control circuit is configured to: transmit the programming data to enable a subset of the blocks of pixel cells; within a first part of an exposure period, transmit a first global processing circuits power state control signal and a first global memory power state control signal to disable all processing circuits, the bias generator, the digital ramp circuit, and the analog threshold generation circuit of the processing circuits power domain and all banks of memory devices of the memory power domain; within a second part of the exposure period, transmit a second global memory power state control signal to cause the processing circuits of the subset of the blocks of pixel cells to operate in a low power mode, and to enable the analog threshold generation circuit to supply a static threshold to the processing circuits, to determine whether light of a threshold intensity is received by the array of pixel cells; within a quantization period, transmit a second global processing circuits power state control signal and a third global memory power state control signal to enable the processing circuits, the digital ramp circuit, the analog threshold generation circuit, and the banks of memory devices of the subset of the blocks of pixel cells to generate and store quantization results based on the programming data; and after the quantization period ends, transmit a third global processing circuits power state control signal to disable the processing circuits of the subset of the blocks of pixel cells, and to disable the digital ramp circuit and the analog threshold generation circuit.

In some aspects, the apparatus further comprises interface circuits configured to transmit data from the banks of memory devices to an external host device. The pixel cell array control circuit is further configured to: within a first part of a read out period after the quantization period, transmit a fourth global memory power state control signal to cause the banks of memory devices of the subset of the blocks of pixel cells to retain the quantization results, and to disable the interface circuits; within a second part of the read out period, transmit a fifth global memory power state control signal to columns of blocks of pixel cells sequentially to perform a read out operation from the banks of memory devices of each of the columns of blocks of pixel cells, and to enable the interface circuits to transmit data obtained from the read out operations to the host device; and transmit a sixth global memory power state control signal to the columns of blocks of pixel cells sequentially to disable the banks of memory devices of each of the columns of blocks of pixel cells, and to disable the interface circuits, after the read out operations complete for the column.

In some aspects, the banks of memory devices comprise dynamic random access memory (DRAM) devices. the apparatus further comprises, for each column of blocks of pixel cells, a pre-charge circuit configured to pre-charge the banks of memory devices of the column prior to read out operations, each pre-charge circuit of a column being associated with the memory power sub-domain as the banks of memory devices of the column; wherein the fifth global memory power state control signal enables the pre-charge circuit of each column sequentially prior to the read out operations for the column; and wherein the sixth global memory power state control signal disables the pre-charge circuit of each column after the read out operations complete for the column.

In some examples, a method is provided. The method comprises: receiving a pixel array programming map, the pixel array programming map comprising programming data targeted at each block of pixel cells of an array of pixel cells of an image sensor, the image sensor further comprising processing circuits and banks of memory devices, the processing circuits and the banks of memory devices being associated with blocks of pixel cells of the array of pixel cells, the processing circuits further being associated with first hierarchical power domains comprising a processing circuits power domain and processing circuits power sub-domains, the banks of memory devices further being associated with second hierarchical power domains comprising a memory power domain and memory power sub-domains, wherein the processing circuits associated with different blocks of pixel cells are associated with different processing circuits power sub-domains, and wherein the banks of memory devices associated with different blocks of pixel cells are associated with different memory power sub-domains; transmitting the programming data to each targeted block of pixel cells to individually configure first power states of the processing circuits associated with different processing circuits power sub-domains and to individually configure second power states of banks of memory associated with different memory power sub-domains; transmitting a global processing circuits power state control signal to configure the processing circuits of the processing circuits power domain to switch from the first power states to a same third power state; and transmitting a global memory power state control signal to configure the banks of memory devices of the memory power domain to switch from the second power states to a same fourth power state.

In some aspects, the programming data is transmitted to enable a subset of the blocks of pixel cells. The method further comprises: within a first part of an exposure period, transmitting a first global processing circuits power state control signal and a first global memory power state control signal to disable all processing circuits of the processing circuits power domain and all banks of memory devices of the memory power domain; within a second part of the exposure period, transmitting a second global memory power state control signal to cause the processing circuits of the subset of the blocks of pixel cells to operate in a low power mode to determine whether light of a threshold intensity is received by the array of pixel cells; within a quantization period, transmitting a second global processing circuits power state control signal and a third global memory power state control signal to enable the processing circuits and the banks of memory devices of the subset of the blocks of pixel cells to generate and store quantization results based on the programming data; and after the quantization period ends, transmitting a third global processing circuits power state control signal to disable the processing circuits of the subset of the blocks of pixel cells.

In some aspects, the method further comprises: within a first part of a read out period after the quantization period, transmitting a fourth global memory power state control signal to cause the banks of memory devices of the subset of the blocks of pixel cells to retain the quantization results; within a second part of the read out period, transmitting a fifth global memory power state control signal to columns of blocks of pixel cells sequentially to perform a read out operation from the banks of memory devices of each of the columns of blocks of pixel cells; and transmitting a sixth global memory power state control signal to the columns of blocks of pixel cells sequentially to disable the banks of memory devices of each of the columns of blocks of pixel cells after the read out operations complete.

BRIEF DESCRIPTION OF THE DRAWINGS

Illustrative embodiments are described with reference to the following figures.

FIG. 11A, FIG. 11B, FIG. 11C, FIG. 11D, and FIG. 11E illustrate example components of the image sensor of FIGS. 7A-7C.

FIG. 13 illustrates a flowchart of an example process for generating image data.

Figure 1A:
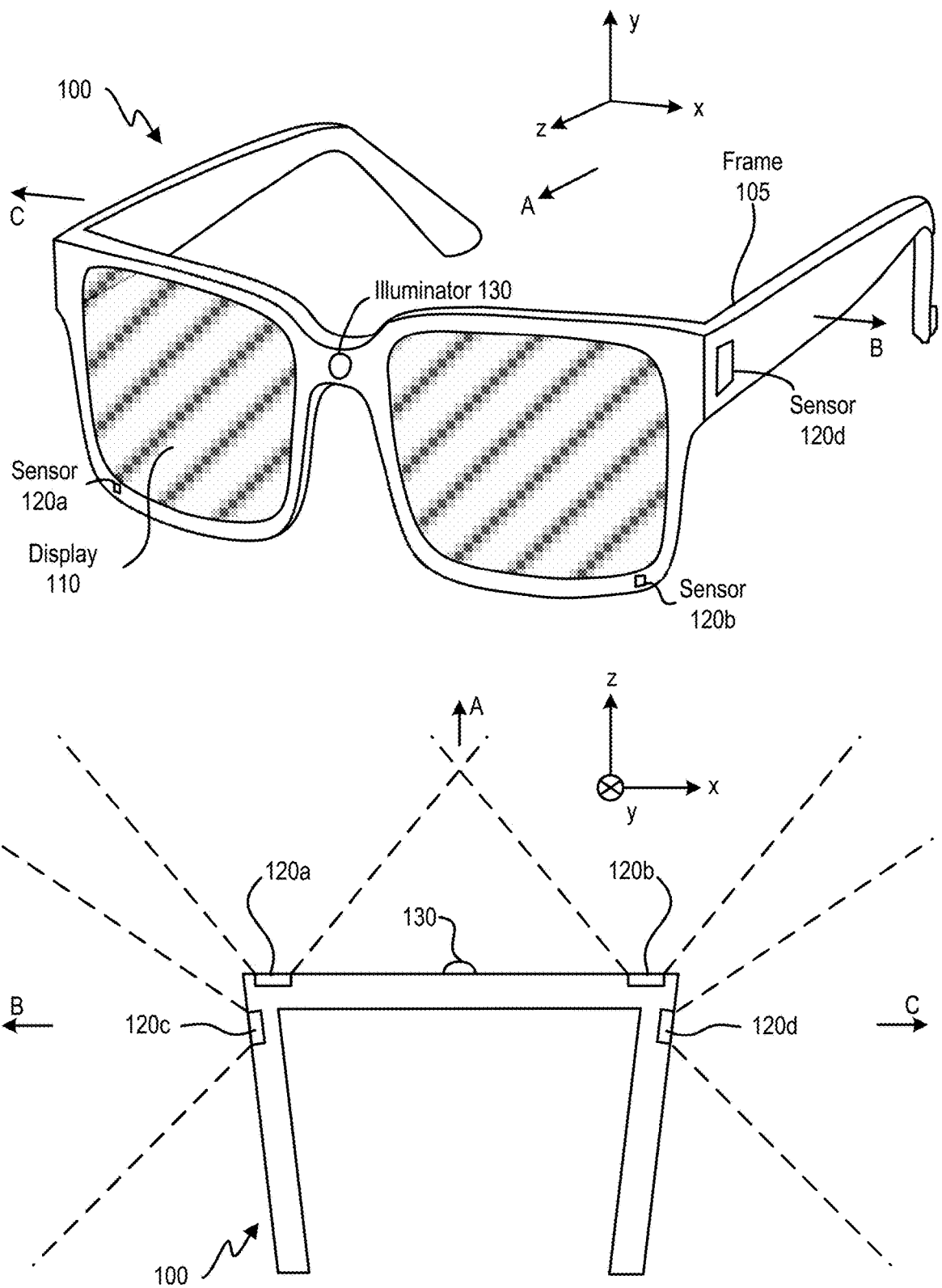
FIG. 1A and FIG. 1B are diagrams of an embodiment of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A typical image sensor includes an array of pixel cells. Each pixel cell includes a photodiode to sense incident light by converting photons into charge (e.g., electrons or holes).

The charge generated by photodiodes of the array of pixel cells can then be quantized by an analog-to-digital converter (ADC) into digital values. The ADC can quantize the charge by, for example, using a comparator to compare a voltage representing the charge with one or more quantization levels, and a digital value can be generated based on the comparison result. The digital values can then be stored in a memory to generate the image.

The image data from an image sensor can support various wearable applications, such as fusion of 2D and 3D sensing, object recognition and tracking, location tracking, etc. These applications can extract feature information from a subset of pixels of the image to perform computations. For example, to perform 3D sensing, an application can identify pixels of reflected structured light (e.g., dots), compare a pattern extracted from the pixels with the transmitted structured light, and perform depth computation based on the comparison. The application can also identify 2D pixel data from the same pixel cells that provide the extracted pattern of structured light to perform fusion of 2D and 3D sensing. To perform object recognition and tracking, an application can also identify pixels of image features of the object, extract the image features from the pixels, and perform the recognition and tracking based on the extraction results. These applications are typically executed on a host processor, which can be electrically connected with the image sensor and receive the pixel data via interconnects. The host processor, the image sensor, and the interconnects can be parts of a wearable device.

All these applications can benefit from high-resolution images and/or high frame rates. Higher-resolution images allow the application to extract more detailed features/patterns (e.g., more refined patterns of reflected structured light, more detailed image features, etc.), whereas providing images generated at a higher frame rate enables an application to track the location of an object, the location of the wearable device, etc., at a higher sampling rate, both of which can improve the performances of the applications.

However, high-resolution images and high frame rates can lead to generation, transmission, and processing of a large volume of pixel data, which can present numerous challenges. For example, transmitting and processing a large volume of pixel data at a high data rate can lead to high power consumption at the image sensor, the interconnect, and the host processor. Moreover, the image sensor and the host processor may impose bandwidth limitations on and add latency to the generation and processing of large volumes of pixel data. The high power and high bandwidth requirement can be especially problematic for a wearable device which tends to operate with relatively low power and at a relatively low speed due to form factor and safety considerations.

This disclosure relates to an image sensor that can address at least some of the issues above. The image sensor comprises an array of pixel cells, processing circuits, a memory, and a controller. Each pixel cell can include one or more photodiodes to detect light and convert the light to a charge. The processing circuits can include charge measurement devices. Each charge measurement device can include a charge storage device (e.g., a floating diffusion) and a source follower, to convert a charge to a voltage. The processing circuits can also include comparators to quantize the voltages output by the pixel cells to generate quantization results, whereas the memory can include banks of memory devices to store the quantization results. The image sensor may also include other circuits, such as an analog threshold generation circuit to generate an analog threshold voltage (which can be an analog ramp voltage, a static threshold voltage, etc.), and a digital ramp circuit (e.g., counter) to generate a digital ramp, to support the quantization operations by the processing circuits.

In some examples, the processing circuits and the memory banks can be divided into quantization units, where each quantization unit can be shared by a group of pixel cells, with each group of pixel cells comprising a pixel cell, a block (e.g., a sub-array) of pixel cells, a row of pixel cells, or a column of pixel cells. In some examples, each pixel cell can include a quantization unit including a comparator and a bank of memory devices. The analog threshold generation circuit and the counter can be shared by all pixel cells within the array, or a row/column of pixel cells.

The processing circuits can be associated with a processing circuits power domain, whereas the memory can be associated with a memory power domain. Each of the processing circuits power domain and memory power domain further comprises a hierarchy of power sub-domains The controller can separately control the processing circuits power domain and the memory power domain, as well as their hierarchy of power sub-domains, to set a first power state of the processing circuits and a second power state of the memory.

In some examples, through the controlling of the processing circuits power domain and the memory power domain, the controller can perform a spatial power state control operation, in which the controller can electively enable or operate a first subset of the pixel cells in a high power mode, and selectively enable or operate a second subset of the array of pixel cells in a low power mode (or in a disabled mode), to reduce power consumption of the image sensor. The spatial power state control operation can be performed to support a sparse image sensing operation, in which the first subset of the pixel cells may be associated with a region of interest (ROI) in a scene which provides important information which an application can process at a higher precision/frequency, whereas the outputs from the second subset of the array of pixel cells may be ignored, or processed by the application at a lower precision/frequency.

By operating a subset of the pixel cells at full-power to perform light intensity measurement operations, while disabling (or operating at a low power state) the rest of the pixel cells, the image sensor can generate a sparse image containing information of interest to the application. Meanwhile, information that is not of interest to the application is either not generated or generated at low speed/low resolution, which can reduce the power consumption and improve the power efficiency of the image sensor. Moreover, the controller can perform a temporal power state control operation, in which the controller can vary the power state of the processing circuits and/or the memory with respect to time, including the portion of the processing circuits and/or the memory used by the first subset of the pixel cells, to further reduce the power consumption and improve the power efficiency of the image sensor.

In addition, the processing circuits and the memory can be further divided based on the hierarchy of power sub-domains, with each power sub-domain being separately controllable by the controller. For example, the processing circuits of different quantization units used by different groups of pixel cells (e.g., different rows/columns/blocks of pixel cells), or used by different pixel cells can be associated with different processing circuits power sub-domains. In some examples, the processing circuits of multiple quantization units can also be associated with the same processing circuits power sub-domain. In some examples, the analog ramp generator and the digital ramp generator may each be associated with a different processing circuits power sub-domain. The controller can individually set the processing circuits power sub-domains to different power states. In some examples, the controller can set a processing circuits power domain/sub-domain to a power state out of multiple power states, such as a fully-on state, a fully-off state, and an intermediate state in which a quantization circuit unit operates at a low power mode.

The selection of a processing circuits power state can be based on a performance mode of the quantization circuit unit. For example, the controller can set a first processing circuits power sub-domain at the fully-on state (e.g., a high supply voltage, a high supply current, etc.) to cause the quantization circuits associated with the first processing circuits sub-domain to operate at a high performance mode with, for example, a higher input swing, a higher bandwidth, a higher resolution, a higher linearity, a lower noise, etc. The controller can also set a second processing circuits power sub-domain at a low power state, or a fully-off state, to cause the quantization circuits associated with the second processing circuits sub-domain to operate at a low performance mode with, for example, a lower input swing, a lower bandwidth, a lower resolution, a lower linearity, a higher noise, etc., or to disable the quantization circuits. In some examples, the first processing circuits power sub-domain can be associated with quantization circuit units of the first subset of the pixel cells corresponding to the region of interest, whereas the second processing circuits power sub-domain can be associated with quantization circuit units of the second subset of the array of pixel cells outside the region of interest.

In addition, the memory can be divided into different memory power sub-domains in different ways. For example, banks of memory devices of different quantization units used by different groups of pixel cells (e.g., different rows/columns/blocks of pixel cells), or by different pixel cells, can be associated with different memory power sub-domains. The controller can enable first banks of memory devices of a first memory power sub-domain if, for example, the first banks of memory devices are used by the first subset of the pixel cells corresponding to a region of interest, and disable (or operate at a lower power state) other banks of memory devices. In some examples, a bank of memory devices used by a group of pixel cells (or a pixel cell) can be divided into multiple memory power sub-domains. Different groups of bits of a bank of memory devices can be associated with different memory power sub-domains, and the controller can control the power states of the different groups of bits based on, for example, a resolution of the quantization result to be stored at the bank of memory devices. For example, when the quantization unit operates at a high resolution (e.g., 12-bit quantization), the controller can fully turn on 12 bits of a bank of memory devices to store the 12-bit quantization result. When the quantization circuit operates a low power state with reduced quantization resolution (e.g., 8-bit, 4-bit, 1-bit, etc.), the controller can disable groups of bits of the bank of memory devices that are not used to store the quantization result, to reduce leakage current and overall power consumption of the memory.

In some examples, the controller can also set a memory power domain/sub-domain to a power state out of multiple power states, such as a fully-on state, a fully-off state, and an intermediate state in which the memory operates at a low power mode. In the fully-on state, the supply voltage to the memory can be set at a level that supports read and write operations. In the fully-off state, the supply voltage to the memory can be dropped to zero with loss of read/write capability and the stored data, but also with minimum leakage current. Further, under the low power mode, the supply voltage to the memory can be reduced such that the memory cannot support read and write operations, but can still retain the stored data.

The controller can perform a temporal power state control operation, in which the controller can vary the power state of different processing circuits and memory power sub-domains with respect to time, to further reduce power consumption. For example, a frame period can be divided into multiple stages. In a first stage, the controller can disable the memory of a quantization unit, and operate the processing circuits of the quantization unit at a low power state to detect light and to generate a quantization result at a very low resolution (e.g., 1 bit). In the second stage, if the quantization result indicates presence of light, the controller can operate the quantization unit at the fully-on state to generate and store the quantization result. In the third state, after the quantization result is stored, the controller can turn off the processing circuits within the quantization unit, and operate the memory of the quantization unit at the low power state to reduce leakage while retaining the stored data. After the stored data has been read out from the memory, the controller can disable the entire quantization unit until the next frame period starts.

The image sensor can include a hierarchy of power control circuits to enable setting of the power states of the processing circuits and memory power domains/sub-domains. Each power control circuit can include, for example, a power gate, a multiplexor, etc., to selectively connect or disconnect a circuit (e.g., a quantization circuit unit, one or more memory bits, etc.) to a power supply, to a bias voltage, etc., to enable/disable the circuit. Each power control circuit may also include a programmable current source to set a bias current of, for example, the processing circuits to adjust the performance mode (e.g., a bandwidth, a linearity, a resolution, etc.) as well as the power consumption of the processing circuits. In some examples, the image sensor can include a global power control circuit (e.g., a global power gate) between the supply voltage terminals of the entire processing circuits and of the entire memory and the power system of the image sensor, to enable or disable the entire processing circuits power domain and/or the entire memory power domain of the image sensor. In addition, the image sensor can include local power control circuits within different power sub-domains, such as at the quantization unit used by a group of pixel cells or by a pixel cell, to adjust the power state of a particular processing circuits/memory power sub-domain.

The controller can control the hierarchy of power control circuits based on various signaling arrangements. In some examples, each pixel cell (or a block of pixel cells) of the array of pixel cells can be connected to a row bus and a column bus each driven by the controller, and the image sensor can include a plurality of row buses and a plurality of column buses connected to the pixel cells. Each pixel cell (or block of pixel cells) can be individually addressable by signals on the row buses and the column buses, and the pixel cells can in turn control the power state of the processing circuits and banks of the memory device associated with the pixel cells. The controller can receive a programming map that includes programming data for each pixel cell, extract the programming data for each pixel cell from the programming map, and transmit different programming data targeted at different pixel cells via signaling on the row buses and the column buses. The programming data may specify a power state of the circuits and/or the bank of memory devices associated with a particular pixel cell/block of pixel cells. A pixel cell (or a block of pixel cells) receiving the programming data can then set the power state of the associated circuits and/or the bank of memory devices based on the programming data, which in turn allows individual setting of power states of quantization circuit units and/or memory of different power sub-domains. The programming data may also configure other operations of the pixel cells, such as a duration of the exposure period. Meanwhile, the supply voltage terminals of the quantization circuits and the memory can be connected to the power supply of the image sensor via global power gates, which can be controlled by global signals provided by the controller to set the power states of the processing circuits and memory power domains.

In some examples, the controller can control the hierarchy of power control circuits using a combination of additional row/column signals after transmitting the programming data to the target pixel cells. This can reduce the number of different sets of programming data to be transmitted to perform a temporal power state control operation. For example, after the read out operation completes for the memory used by a row of pixel cells, the controller can transmit a row control signal to the row of pixel cells to power off the memory, instead of a new set of programming data to individually set the power state of the memory of each pixel cell in the row. As another example, the controller can use the row buses/column buses to transmit a bias voltage for the quantization circuit units, and the bias voltage can be gated by local power control circuits, based on the programming data, to selectively turn off individual quantization circuits used by pixel cells outside the region of interest based on the programming data. After the quantization operations complete and quantization results are stored in the memory, the controller can switch the bias voltage supplied by the row/column buses to ground to turn off all the quantization circuit units to reduce power.

With the disclosed techniques, an image sensor can individually set the power states of different processing circuits and memory power domains/sub-domains, and selectively power down quantization circuits and memory (or operate them at a low power state) that are not used in a sparse image sensing operation. As quantizer and memory typically consume the most power within an image sensor, disabling quantization circuits and memory that are not used by pixel cells of the region of interest can lead to substantial reduction in power consumption and improvement in power efficiency. Moreover, by associating pixels, blocks of pixels, different bits of the memory, and/or different circuit components of a quantization circuit unit with different power sub-domains, a fine grain control of power consumption, both spatially and temporally, can be provided. Such arrangements can refine the list of components of the image sensor that are enabled or disabled at any given time to support the sparse image sensing operation, which can further improve the power efficiency of the image sensor. All these can improve the performance of the image sensor, especially in view of power constraint imposed by a mobile device such as a wearable device, as well as the performance of applications that rely on the outputs of the image sensor.

The disclosed techniques may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120*a*, 120*b*, 120*c*, and 120*d*. Each of image sensors 120*a*, 120*b*, 120*c*, and 120*d* may include a pixel array configured to generate image data representing different fields of views along different directions. For example, sensors 120*a* and 120*b* may be configured to provide image data representing two fields of view towards a direction A along the Z axis, whereas sensor 120*c* may be configured to provide image data representing a field of view towards a direction B along the X axis, and sensor 120*d* may be configured to provide image data representing a field of view towards a direction C along the X axis.

In some embodiments, sensors 120*a*-120*d* can be configured as input devices to control or influence the display content of the near-eye display 100, to provide an interactive VR/AR/MR experience to a user who wears near-eye display 100. For example, sensors 120*a*-120*d* can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to near-eye display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
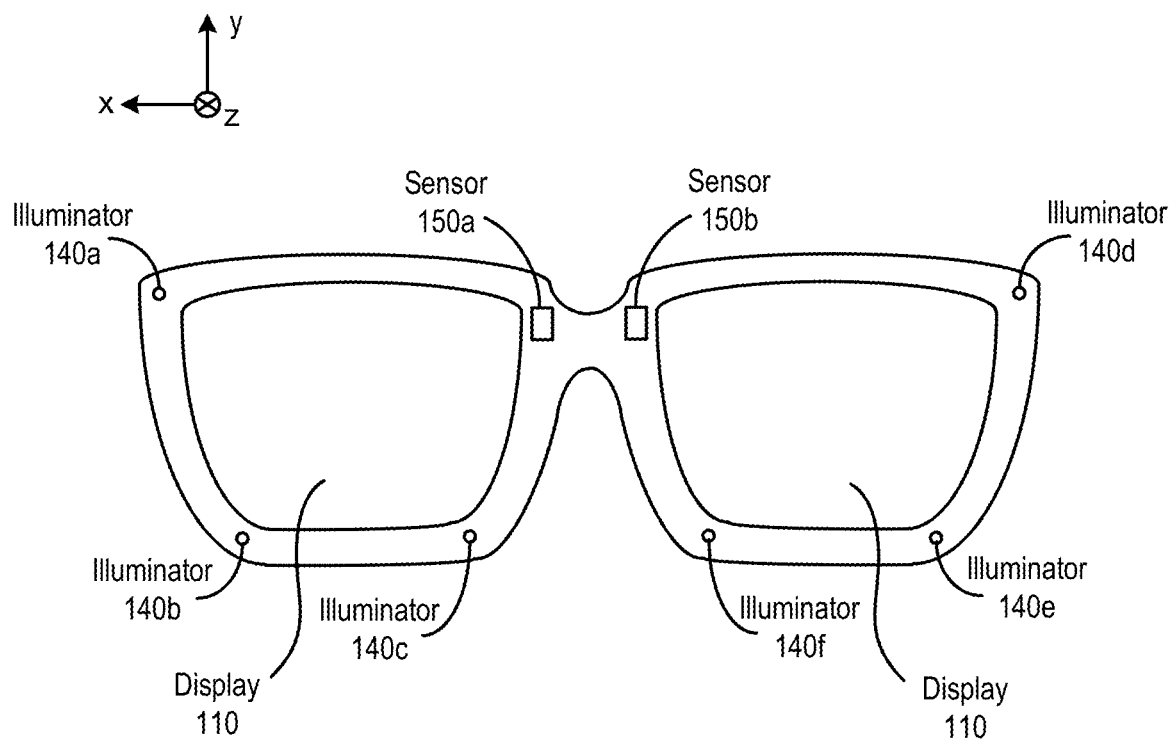

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b.

Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Image sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by image sensor 150b. Image sensor 150b may also include a pixel array to generate an image of the reflected pattern. Based on the images of the reflected pattern from image sensors 150a and 150b, the system can determine a gaze point of the user, and update the image data provided to near-eye display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
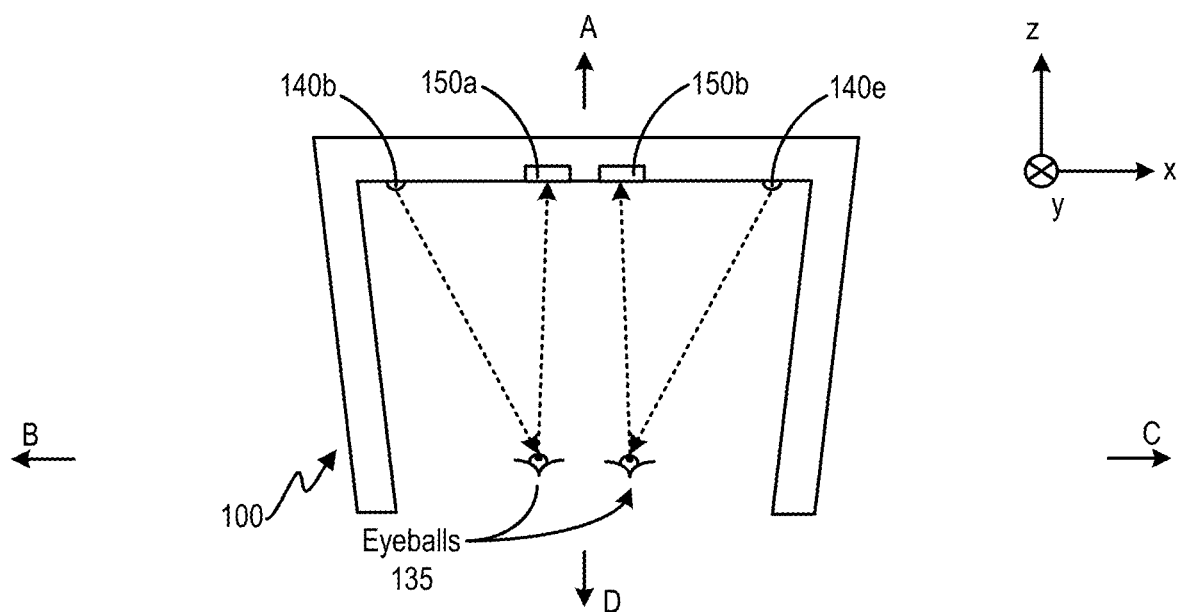
Figure 2:
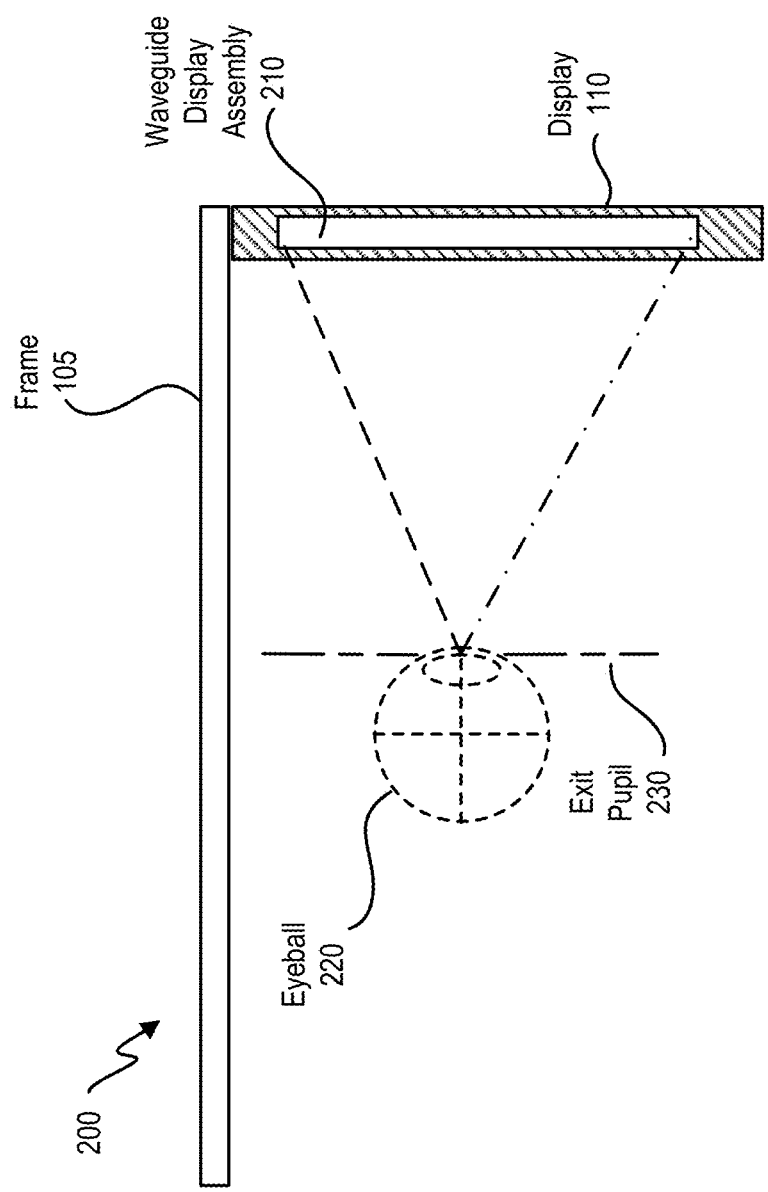
FIG. 2 is an embodiment of a cross section of the near-eye display.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
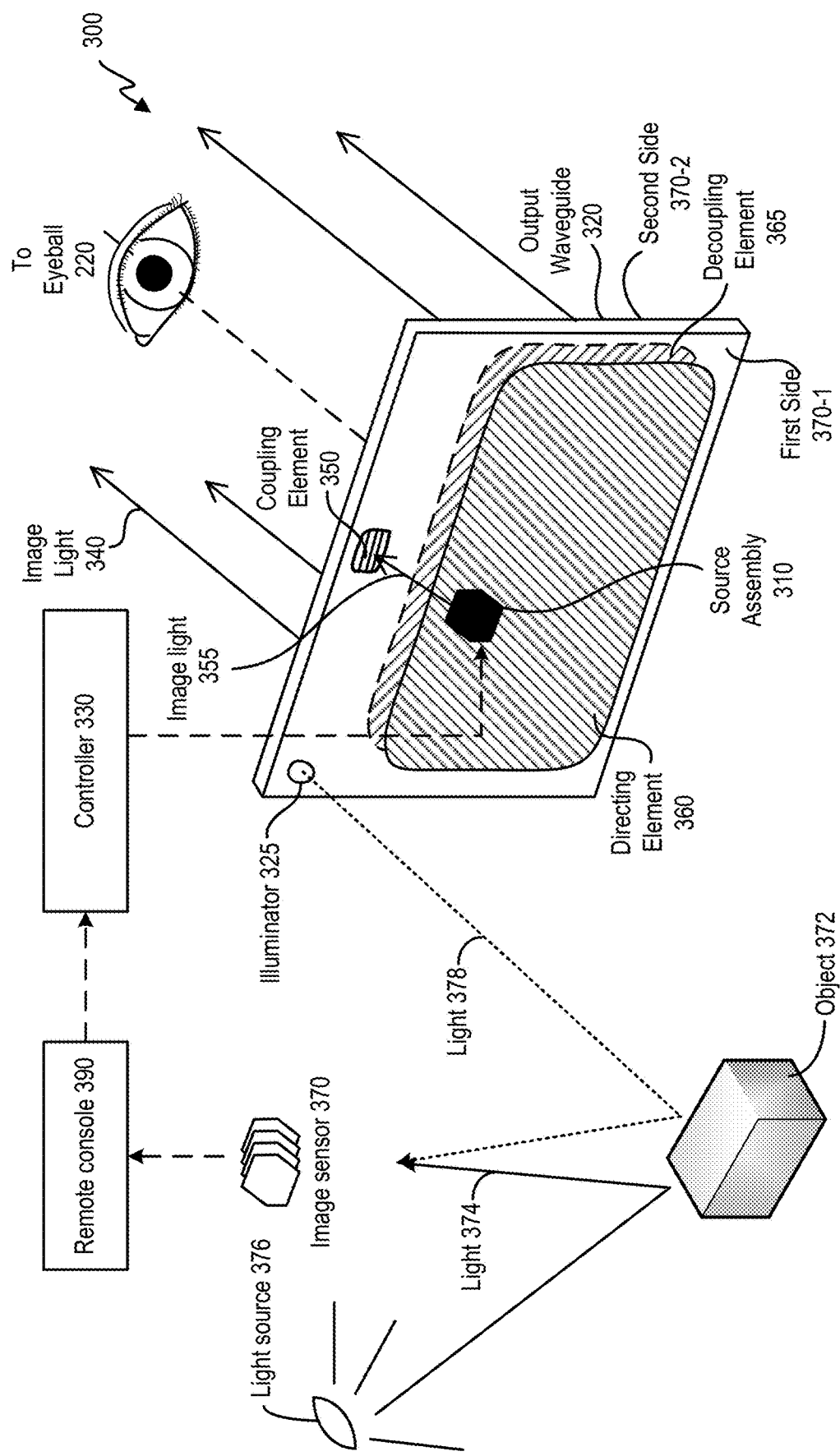
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
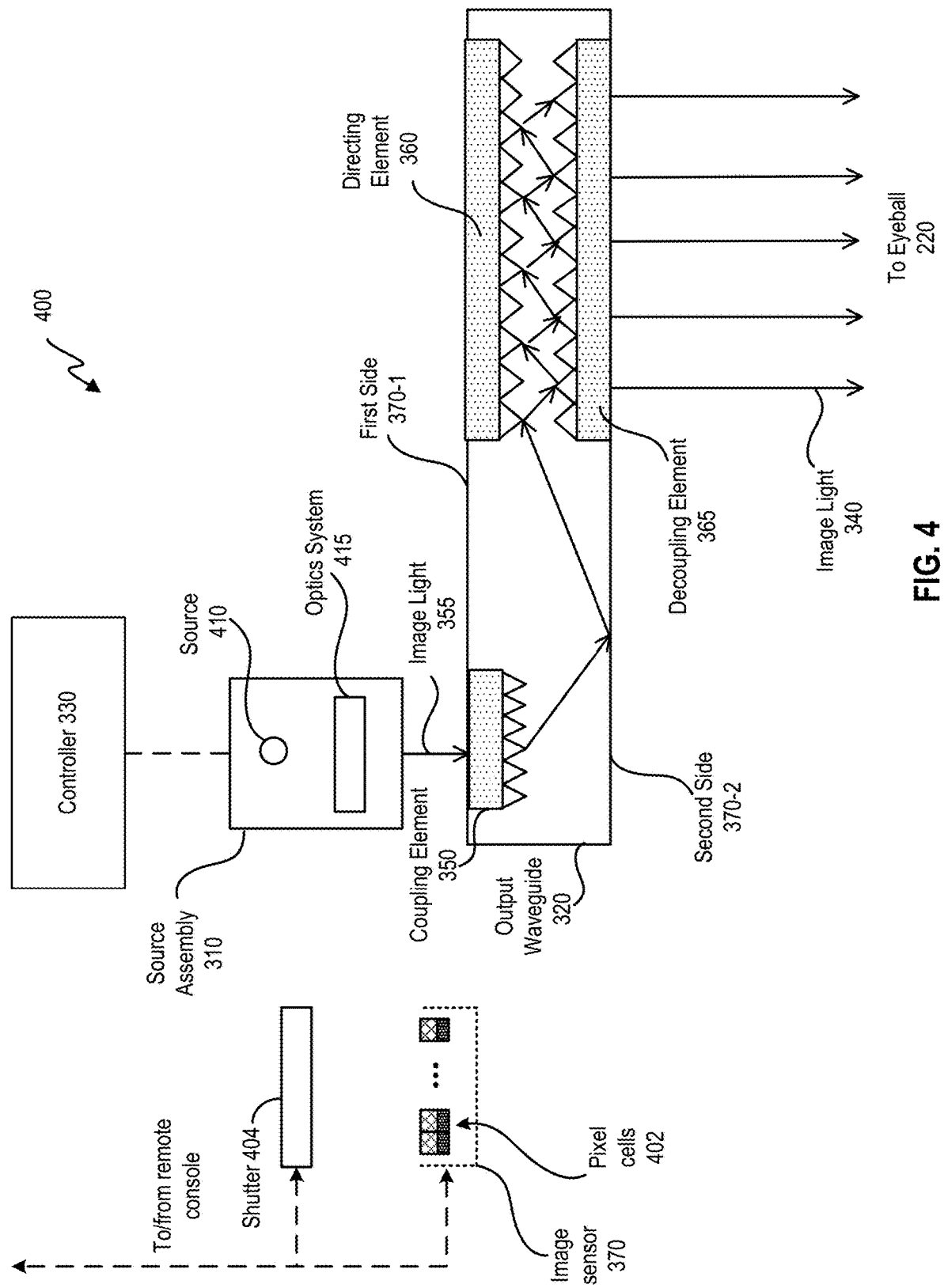
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is a diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
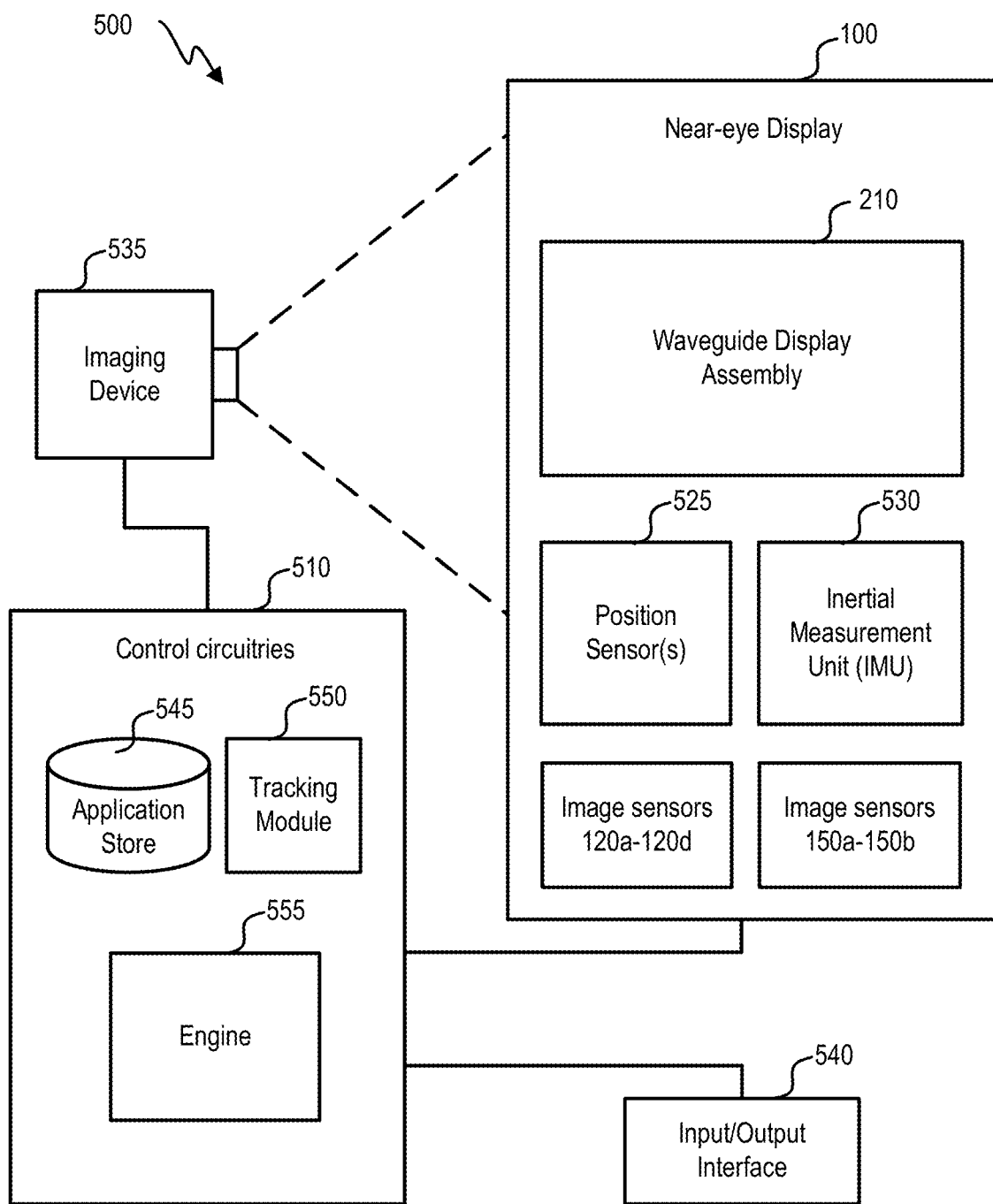
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120*a*-120*d* and 150*a*-150*b* that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120*a*-120*d* of FIG. 1A for generating image data of a physical environment in which the user is located, for performing location tracking of the user. Imaging device 535 may further include, for example, image sensors 150*a*-150*b* of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6A:
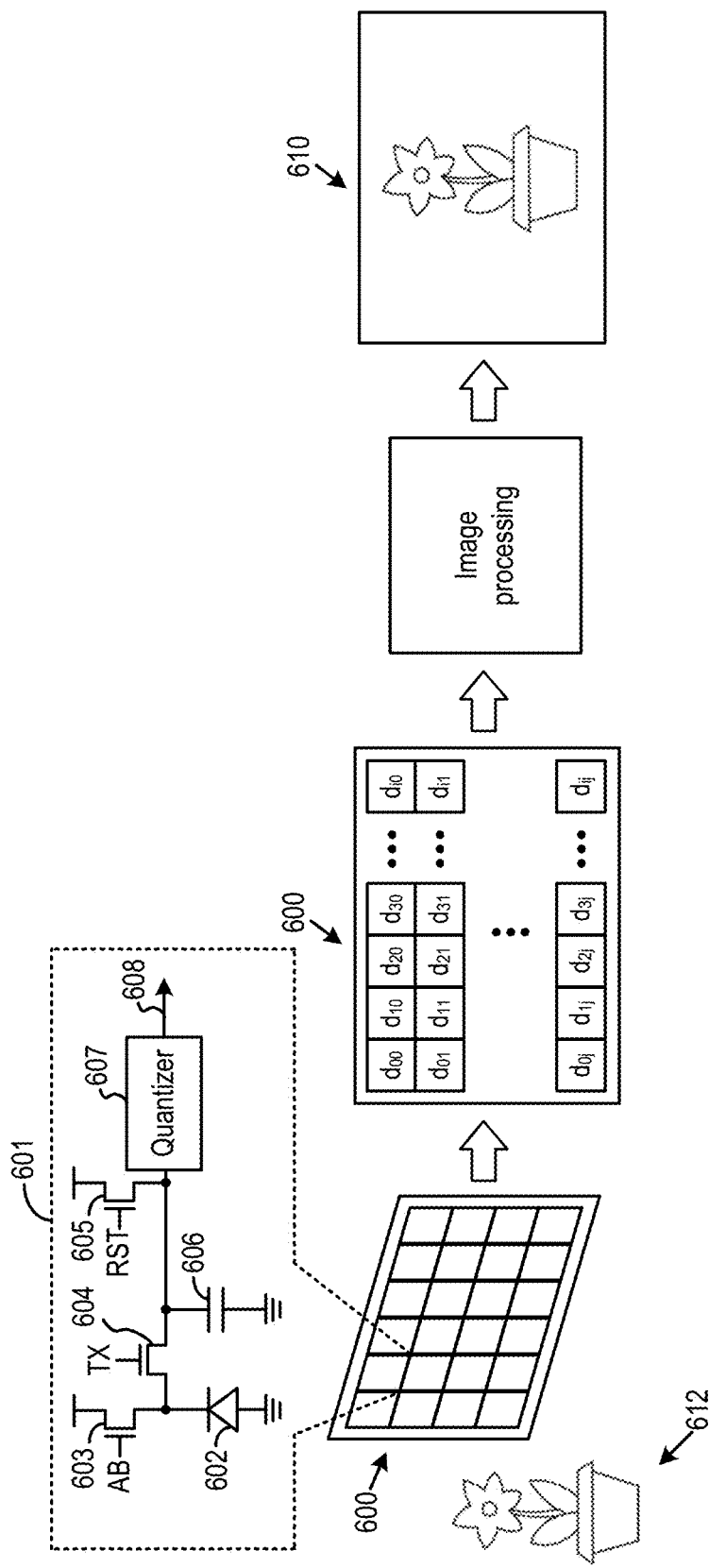
FIG. 6A, FIG. 6B, FIG. 6C, FIG. 6D, FIG. 6E, and FIG. 6F illustrate examples of an image sensor and its operations.
Figure 6B:
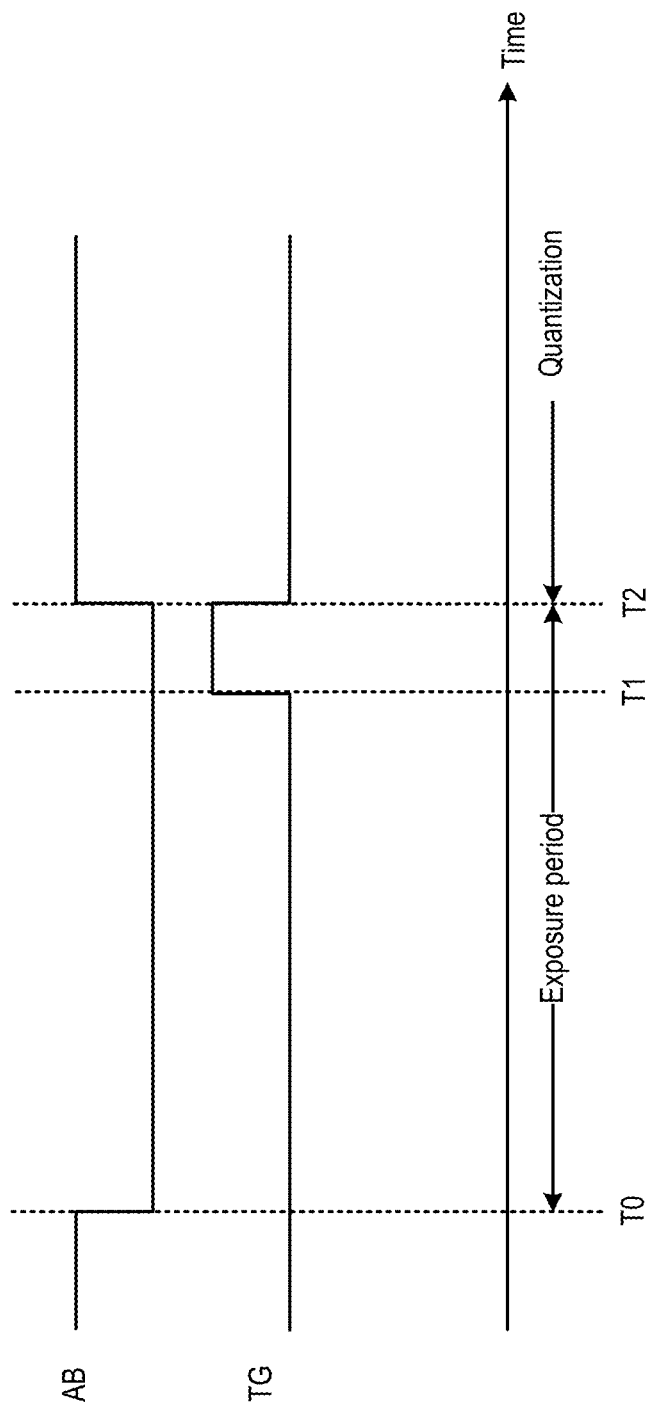

FIG. 6A, FIG. 6B, FIG. 6C, FIG. 6D, FIG. 6E, and FIG. 6F illustrate examples of an image sensor 600 and its operations. As shown in FIG. 6A, image sensor 600 can include an array of pixel cells, including pixel cell 601, and can generate digital intensity data corresponding to pixels of an image. Pixel cell 601 may be part of pixel cells 402 of FIG. 4. As shown in FIG. 6A, pixel cell 601 may include one or more photodiodes 602, an electronic shutter gate 603, a transfer gate 604, a reset gate 605, a charge storage device 606, and a quantizer 607. Photodiode 602 may include, for example, a P-N diode, a P-I-N diode, a pinned diode, etc., whereas charge storage device 606 can be a floating diffusion node of transfer gate 604. Photodiode 602 can generate and accumulate charge upon receiving light within an exposure period, and the quantity of charge generated within the exposure period can be proportional to the intensity of the light. The exposure period can be defined based on the timing of AB signal controlling electronic shutter gate 603, which can steer the charge generated by photodiode 602 away when enabled, and based on the timing of the TX signal controlling transfer gate 604, which can transfer the charge generated by photodiode 602 to charge storage device 606 when enabled. For example, referring to FIG. 6B, the AB signal can be de-asserted at time T0 to allow photodiode 602 to generate charge and accumulate at least some of the charge as residual charge until photodiode 602 saturates. T0 can mark the start of the exposure period. The TX signal can set transfer gate 604 at a partially-on state to transfer additional charge (e.g., overflow charge) generated by photodiode 602 after saturation to charge storage device 606. At time T1, the TG signal can be asserted to transfer the residual charge to charge storage device 606, so that charge storage device 606 can store all of the charge generated by photodiode 602 since the beginning of the exposure period at time T0. At the time T2, the TX signal can be de-asserted to isolate charge storage device 606 from photodiode 602, whereas the AB signal can be asserted to steer charge generated by photodiode 602 away. The time T2 can mark the end of the exposure period. An analog voltage across charge storage device 606 at time T2 can represent the total quantity of charge stored in charge storage device 606, which can correspond to the total quantity of charge generated by photodiode 602 within the exposure period. Both TX and AB signals can be generated by a controller (not shown in FIG. 6A) which can be part of pixel cell 601. After the analog voltage is quantized, reset gate 605 can be enabled by an RST signal to remove the charge in charge storage device 606 to prepare for the next measurement.

Figure 6C:
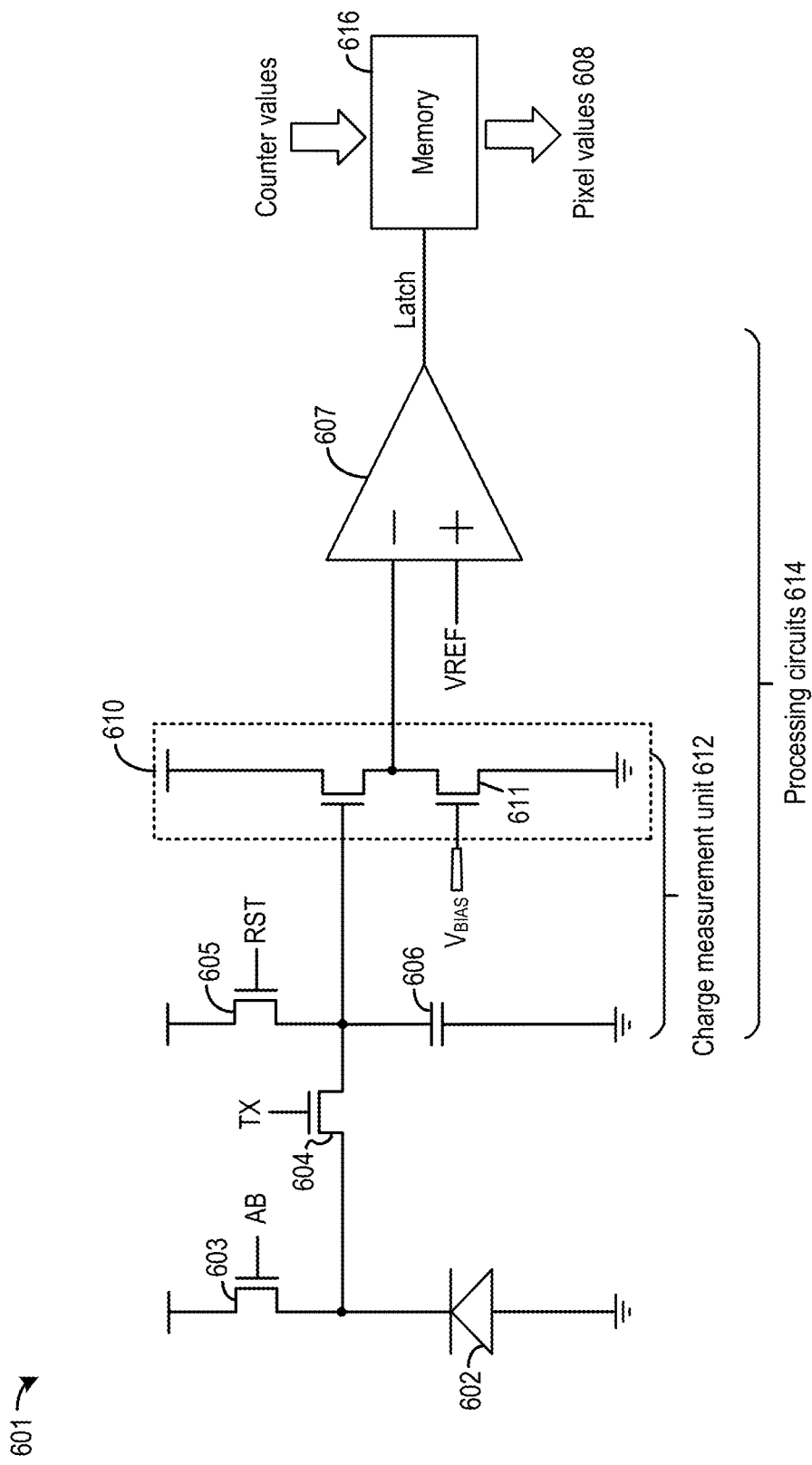

FIG. 6C illustrates additional components of pixel cell 601. As shown in FIG. 6C, pixel cell 601 can include a source follower 610 that can buffer the voltage at charge storage device 606, and output the voltage to quantizer 607. Charge storage device 606 and source follower 610 can form a charge measurement unit 612. Source follower 610 can include a current source 611 controlled by a bias voltage $V_{BIAS}$, which sets the current that flows through source follower 610. Quantizer 607 can include a comparator. Charge measurement unit 612 and quantizer 607 together can form a processing circuits 614. The comparator is further coupled with a memory 616 to store a quantization output as pixel value 608. Memory 616 can include a bank of memory devices, such as static random access memory (SRAM) devices, with each memory device configured as a bit cell. The number of memory devices in the bank can be based on a resolution of the quantization output. For example, if the quantization output has a 10-bit resolution, memory 616 can include a bank of ten SRAM bit cells. In a case where pixel cell 601 includes multiple photodiodes to detect light of different wavelength channels, memory 616 may include multiple banks of SRAM bit cells.

Figure 6D:
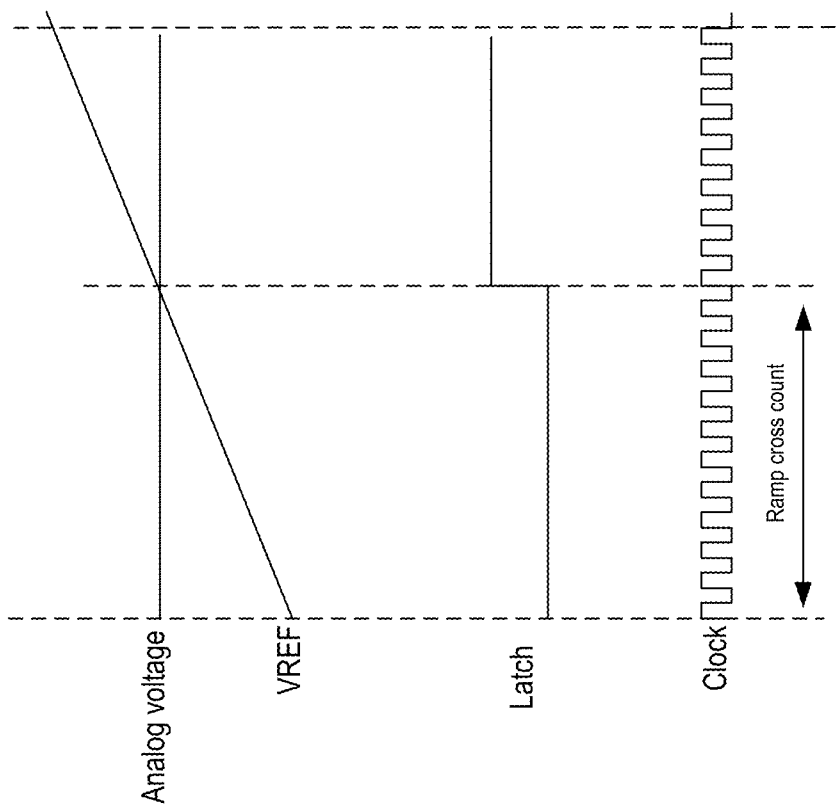

Quantizer 607 can be controlled by the controller to quantize the analog voltage after time T2 to generate a pixel value 608. FIG. 6D illustrates an example quantization operation performed by quantizer 607. As shown in FIG. 6D, quantizer 607 can compare the analog voltage output by source follower 610 with a ramping reference voltage (labelled "VREF" in FIG. 6C and FIG. 6D) to generate a comparison decision (labelled "Latch" in FIG. 6C and FIG. 6D). The time it takes for the decision to trip can be measured by a counter to represent a result of quantization of the analog voltage. In some examples, the time can be measured by a free-running counter that starts counting when the ramping reference voltage is at the start point. The free-running counter can periodically update its count value based on a clock signal (labelled "clock" in FIG. 6D) and as the ramping reference voltage ramps up (or down). The comparator output trips when the ramping reference voltage meets the analog voltage. The tripping of the comparator output can cause a count value to be stored in memory 614. The count value can represent a quantization output of the analog voltage. Referring back to FIG. 6C, the count value stored in memory 614 can be read out as pixel value 608.

In FIG. 6A and FIG. 6C, pixel cell 601 is illustrated as including processing circuits 614 (including charge measurement unit 612 and quantizer 607) and memory 616. In some examples, processing circuits 614 and memory 616 can be external to pixel cell 601. For example, a block of pixel cells can share and take turns in accessing processing circuits 614 and memory 612 to quantize the charge generated by the photodiode(s) of each pixel cell and to store the quantization result.

Figure 6E:
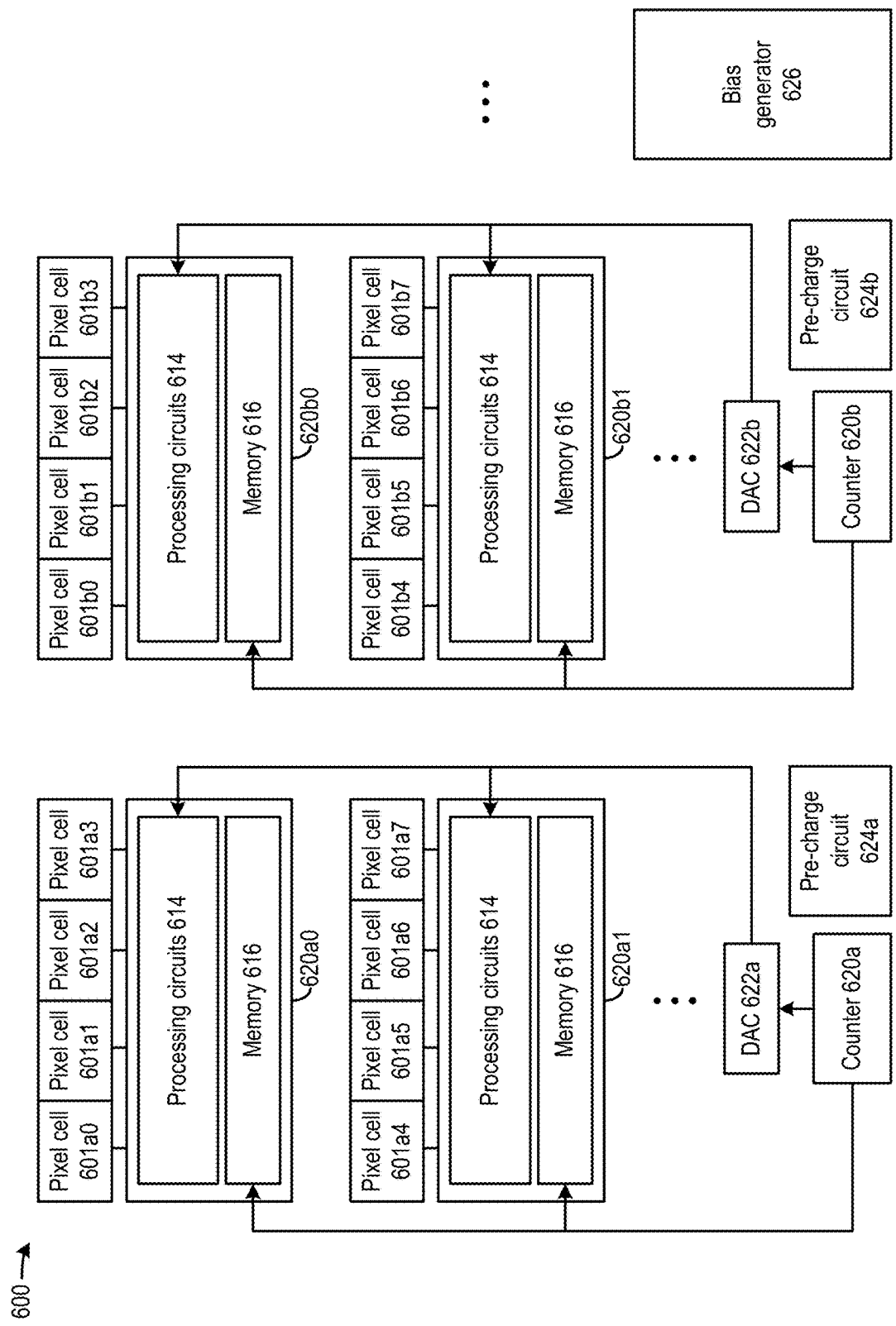
Figure 6F:
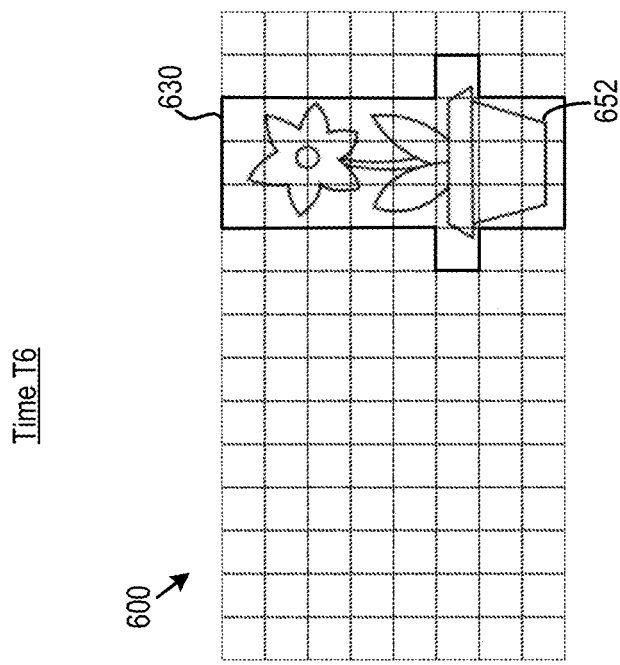
Figure 6F:
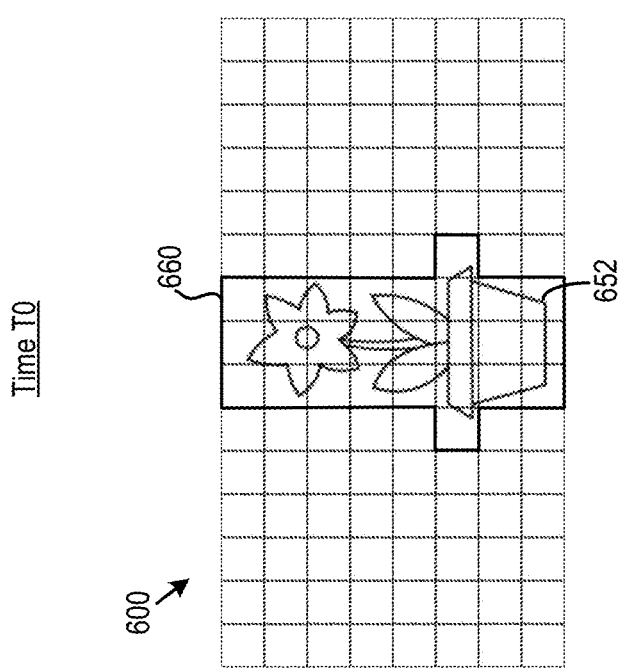

FIG. 6E illustrates additional components of image sensor 600. As shown in FIG. 6E, image sensor 600 includes pixel cells 601 arranged in rows and columns, such as pixel cells 601a0-a3, 601a4-a7, 601b0-b3, 601b4-b7, etc. Each pixel cell may include one or more photodiodes 602. Image sensor 600 further includes quantization units 620 (e.g., quantization unit 620a0, a1, b0, b1, etc.) comprising processing circuits 614 (e.g., charge measurement unit 612 and comparator/quantizer 607) and memory 616. In the example of FIG. 6E, a block of four pixel cells may share a quantization unit 620 via a multiplexor (not shown in FIG. 6E), where each pixel cell takes turn in accessing quantization unit 620 to quantize the charge. For example, pixel cells 601a0-a3 share quantization unit 620a0, pixel cells 601a4-a7 share quantization unit 621a1, pixel cells 601b0-b3 share quantization unit 620b0, whereas pixel cells 601b4-b7 share quantization unit 620b1. In some examples, each pixel cell may include or has its dedicated quantization unit.

In addition, image sensor 600 further includes other circuits, such as counter 620 (e.g., counters 620a, 620b, etc.), digital-to-analog converter (DAC) 622 (e.g., DAC 622a, 622b, etc.) each configured as an analog threshold generation circuit, pre-charge circuit 624 (e.g., pre-charge circuits 624a, 624b, etc.), bias generator 626, etc. Counter 620 can be configured as a digital ramp circuit to supply count values to memory 614. The count values can also be supplied to DAC 622 to generate an analog ramp, such as VREF of FIG. 6C and FIG. 6D, which can be supplied to quantizer 607 to perform the quantization operation. Each column of blocks of pixel cells 601 and/or quantization unit 620 may share a counter 620 and a DAC 622. For example, counter 620a and DAC 622a are shared by quantization unit 620a0, 620a1, etc., in a first column, whereas counter 620b and DAC 622b are shared by quantization unit 620b0, 620b1, etc., in a second column. In addition, in a case where memory 616 are implemented as dynamic random access memory (DRAM) devices, pre-charge circuit 624 can pre-charge the dynamic random access memory (DRAM) devices prior to a read operation. Image sensor 600 can include a pre-charge circuit 624 for each column of pixel cells, such as a pre-charge circuit 624a to pre-charge memory 616 of a first column pixel cells, a pre-charge circuit 624b to pre-charge memory 616 of a second column of pixel cells, etc. In addition, bias generator 626 may include other circuits, such as current mirrors, current references, voltage references, digital-to-analog converter (DAC), etc., to generate bias voltages for processing circuits 614 (e.g., $V_{BIAS}$).

The image data from image sensor 600 can be transmitted to the host processor (not shown in FIG. 6A-FIG. 6E) to support different applications, such as identifying and tracking object 652, performing depth sensing of object 652 with respect to image sensor 600, etc. For all these applications, only a subset of pixel cells provides relevant information (e.g., pixel data of object 612), whereas the reset of pixel cells does not provide relevant information. For example, referring to FIG. 6F, at time T0, a group of pixel cells 650 of image sensor 600 receives light reflected by object 612, whereas time T6, object 652 may have shifted (e.g., due to a movement of object 612, a movement of image sensor 600, or both), and a group of pixel cells 670 of image sensor 600 receive light reflected by object 612. At both times T0 and T6, image sensor 600 can transmit only the pixel data from group of pixel cells 660 and 670, as a sparse image frame, to the host processor to reduce the volume of pixel data being transmitted. Such arrangements can allow transmission of higher resolution images at a higher frame rate. For example, a larger pixel cell array including more pixel cells can be used to image object 652 to improve image resolution, while the bandwidth and power required to provide the improved image resolution can be reduced when only a subset of the pixel cells, including the pixel cells that provide pixel data of object 652, transmit the pixel data to the host processor. Similarly, image sensor 600 can be operated to generate images at a higher frame rate, but the increases in bandwidth and power can be reduced when each image only includes pixel values output by the subset of the pixel cells. Similar techniques can be employed by image sensor 600 in the case of 3D sensing.

FIG. 7A, FIG. 7B, FIG. 7C, FIG. 7D, and FIG. 7E illustrate examples of an image processing system 700 and its operations. Image processing system 700 includes a host device 702 and an image sensor 704. Host device 702 can include a host processor 706 which operates an application 708 which can perform operations including, for example, fusion of 2D and 3D sensing, object recognition and tracking, location tracking, etc., on image 710 generated by image sensor 704. In some examples, image processing system 700 can be in a wearable device. In some examples, processing system 700 can be split into multiple separate devices. For example, host device 702 can be a personal computer (PC), a smart phone, a camera base station, or an integrated circuit such as a central processing unit (CPU), a field-programmable gate array (FPGA), a micro controller unit (MCU), etc. Host device 702 and image sensor 704 can be electrically connected via an interconnect (not shown in FIG. 7A), such as an interconnect compatible with the Mobile Industry Processor Interface (MIPI) standard.

Figure 7A:
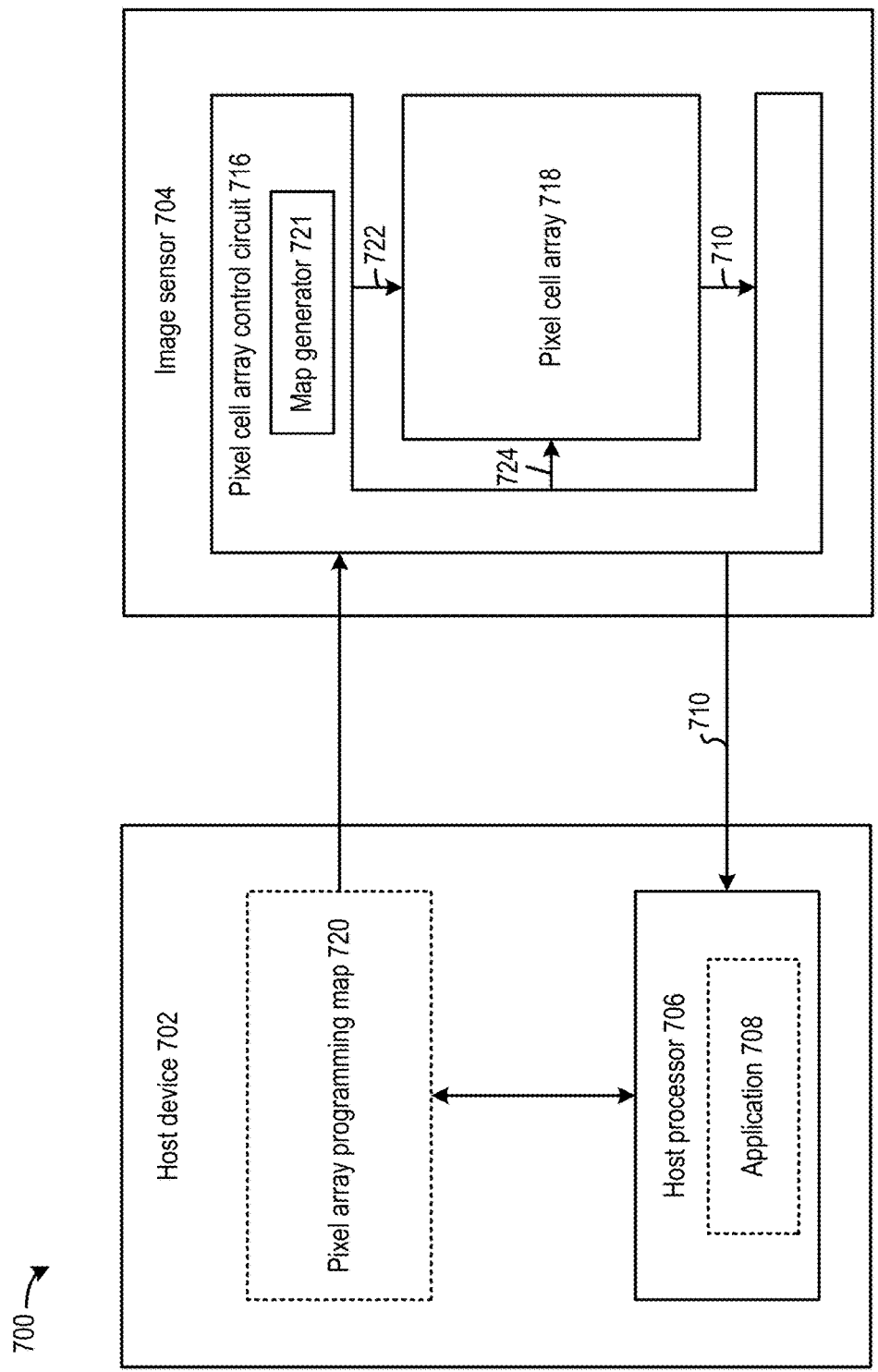
FIG. 7A, FIG. 7B, and FIG. 7C illustrate examples of an image processing system and its operations.

Referring to FIG. 7A, image sensor 704 includes a pixel cell array control circuit 716 and a pixel cell array 718. Each pixel cell of pixel cell array 718 can include similar components as pixel cell 601 of FIG. 6A and FIG. 6C such as photodiode 602, electronic shutter gate 603, transfer gate 604, processing circuits 614, and memory 616, to perform a light measurement operation to generate pixel data. Blocks of pixel cells can also share quantization units 620 comprising processing circuits 614 and memory 616 as shown in FIG. 6E. Image sensor 704 further includes other circuits, such as counters 620 and DAC 622 shown in FIG. 6E. In some examples, pixel cell array 718 and pixel cell array control circuit 716 can form a stack structure to maximize the light receiving surface of image sensor 704, which allows pixel cell array 718 to include more pixel cells to improve resolution.

Each pixel cell in pixel cell array 718 may include a configuration memory, which can be part of or external to the pixel cell, to store programming data for configuring/ programming the light measurement operation at the each pixel cell, or at blocks of pixel cells. The configuration memory of each pixel cell can be individually addressable, which allows the light measurement operation at each pixel cell, or a block of pixel cells, to be individually programmed by pixel cell array control circuit 716 based on a pixel array programming map 720. In some examples, pixel array programming map 720 can be generated by host processor 706 as a result of the object tracking operation on image 710. In some examples, pixel cell array control circuit 716 may also include a programming map generator 721 to generate pixel array programming map 720 based on image 710. Pixel cell array control circuit 716 can extract programming data from pixel array programming map 720 and transmit the programming data in the form of control signals 722 and 724 to pixel cell array 718. Programming data can be read out from the configuration memory to configure the light measurement operation.

As to be described in details below, the configuration of the light measurement operation at a pixel cell can include, for example, setting a power state of the different circuit components accessed/associated by the pixel cell, such as quantization unit 620. The configuration may also include other aspects of the light measurement operation, such as setting an exposure period for the light measurement operation, setting the quantization resolution/bit depth, etc.

Figure 7B:
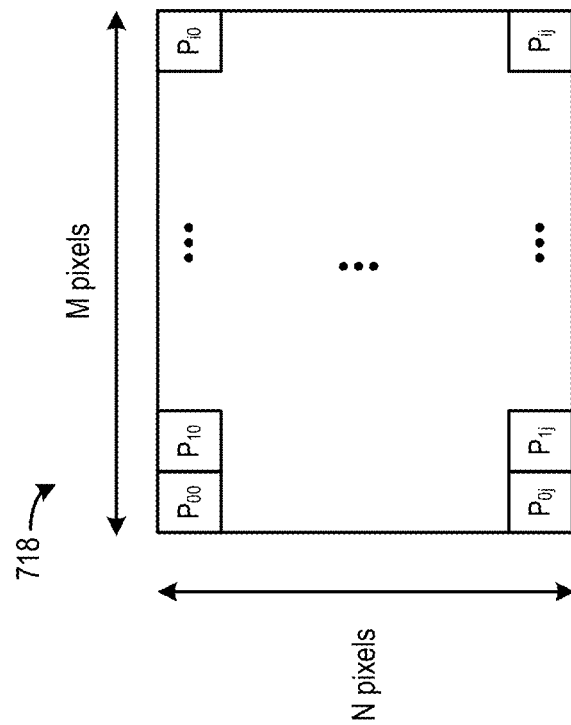
Figure 7B:
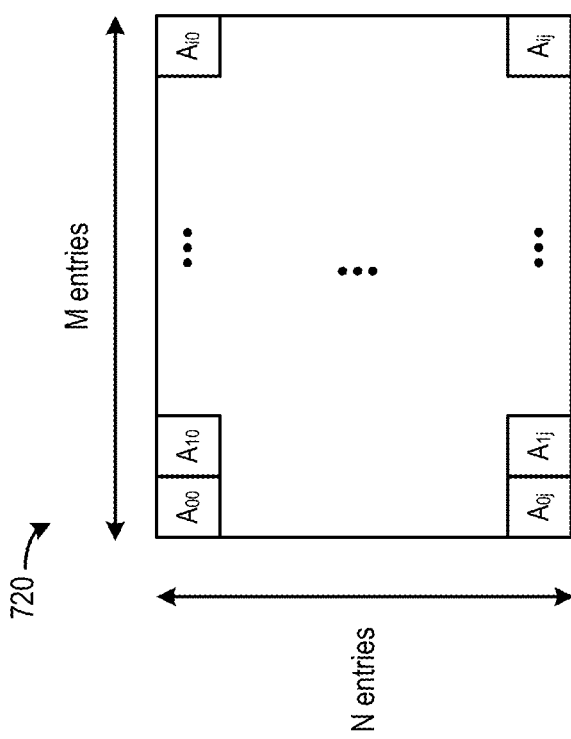

Pixel array programming map 720 can include programming data targeted at each pixel cell of the array of pixel cells. FIG. 7B illustrates an example of pixel array programming map 720. As shown in FIG. 7B, pixel array programming map 720 can include a two-dimensional array of programming data, with each entry of programming data of the two-dimensional array targeted at a pixel cell of pixel cell array 718. For example, in a case where pixel cell array 718 has a width of M pixels (e.g., M columns of pixels) and a height of N pixels (e.g., N rows of pixels), pixel array programming map 720 also has a width of M entries (e.g., M columns of entries) and a height of N entries (e.g., N rows of entries). The programming data $A_{00}$ at entry (0, 0) of pixel array programming map 720 is targeted at pixel cell $P_{00}$ at pixel location (0, 0) of pixel cell array 718, whereas the programming data $A_{01}$ at entry (0, 1) of pixel array programming map 720 is targeted at pixel cell $P_{01}$ at pixel location (0, 1) of pixel cell array 718. In some examples, the programming data of each entry of pixel array programming map 720 can be transmitted sequentially following a predetermined scanning pattern, such as traversing a row from left to right (e.g., $A_{00}, A_{01}, \ldots A_{0i}$), followed by the next row from left to right (e.g., $A_{10}, A_{11}, \ldots A_{1i}$), to form a stream of serial data. The programming data for each entry can be extracted and identified from the stream of serial data based on the scanning pattern and the order by which the entries are received. In some examples, pixel array programming map 720 can be sent only when certain programming data need to be updated between frames, and only the programming data that need to be updated are included in pixel array programming map 720. In some examples, each entry of pixel array programming map 720 can also target at a block of pixel cells (e.g., a 2×2 array of pixel cells, a 4×4 array of pixel cells, etc.).

Figure 7C:
Figure 7C:
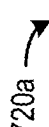

Depending on the configuration operation, each entry of pixel array programming map 720 can either include binary programming data or non-binary programming data. FIG. 7C illustrates examples of pixel array programming maps 720a and 720b. As shown in FIG. 7C, pixel array programming map 720a includes binary programming data 0 and 1. In some examples, the binary programming data at each entry of pixel array programming map 720a can enable (e.g., with programming data set to 1) or disable (e.g., with programming data set to 0) the generation of pixel data at the pixel cell corresponding to the entry. The binary programming data can also set a power state of the quantization unit 620 used by the pixel cell. For example, if the programming data indicates that the pixel cell is not to generate pixel data, the processing circuits and memory included in the quantization unit used by the pixel cell can be powered down.

In addition, pixel array programming map 720b may include non-binary programming data such as −1, 0, 1, or other values. The non-binary programming data of pixel array programming map 720b, as shown in FIG. 7C, can be used to, for example, set an exposure period, set a quantization resolution, etc. For example, a programming value of −1 can indicate the pixel cell and the quantization unit being disabled during a frame period, a programming value of 0 can indicate the pixel cell and the quantization unit operating in a low resolution mode, whereas a programming value 1 can indicate the pixel cell and the quantization unit operating in the full resolution mode. The pixel cell can then set the power state of the processing circuits and the memory of the quantization unit accordingly.

In some examples, pixel array programming map 720a/b can be generated by the application (e.g., application 708) operating at host device 702, or map generator 721 of pixel cell array control circuit 716, that consumes the pixel data from pixel cell array 718. For example, application 708/map generator 721 may identify, from an image, pixels that contain relevant information, and determine a region of interest (ROI) comprising the pixels. Pixel cells that generate pixel data corresponding to the ROI can then be identified. As an illustrative example, referring back to the example of FIG. 6F, application 708/map generator 721 may identify an ROI including the group of pixel cells 620 as providing relevant information (e.g., pixel data of object 612) in an image at time T0. Application 708/map generator 721 can then predict the change in the ROI between times T0 and T6 based on, for example, a direction and a speed of movement of object 652 with respect to image sensor 600. Application 708/map generator 721 can then predict the new image location of the ROI at time T6, which includes the group of pixel cells 630, based on the image location of the group of pixel cells 660 at time T0 and the predicted change. Based on the image location of the group of pixel cells 630 at time T6, application 708/map generator 721 can generate pixel array programming map 720a by setting the programming data of the entries corresponding to the group of pixel cells 670 to one, while setting the programming data of the rest of the entries to zero, so that only the group of pixel cells 670 transmits pixel data to host device 702. In some examples, the ROIs can also be used to set a non-uniform spatial sampling rate such that each pixel cell corresponding to the ROIs transmits pixel data, whereas outside the ROI, a sparsely distributed set of pixel cells is selected to transmit pixel data. The selection of which pixel cells to transmit pixel data can be encoded in pixel array programming map 720a.

In some examples, application 708/map generator 721 may maintain a model of an environment in which an object being tracked is located based on prior images, and predict the pixel cells that are likely to provide the pixel data of the object in a current image based on an environment model. In some examples, image sensor 704, or other processing circuits that are part of the same chip as image sensor 704, may also compute fixed primitives (e.g. temporal or spatial contrast) and estimate where relevant information is occurring based on those primitives, and generate pixel array programming map 720a based on the estimation.

Figure 8A:
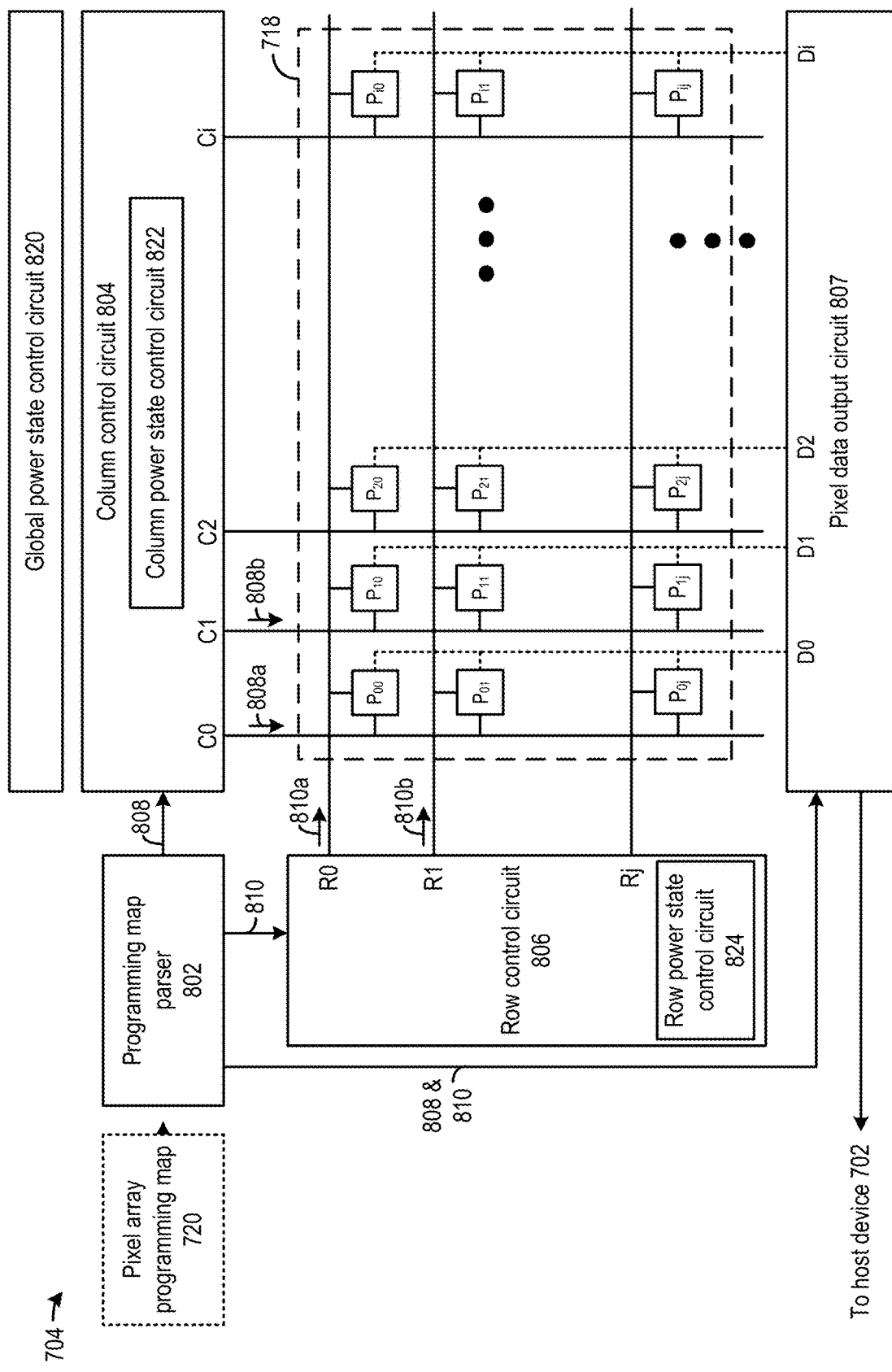
FIG. 8A, FIG. 8B, and FIG. 8C illustrate example components of the image processing system of FIGS. 7A-7E.
Figure 8B:
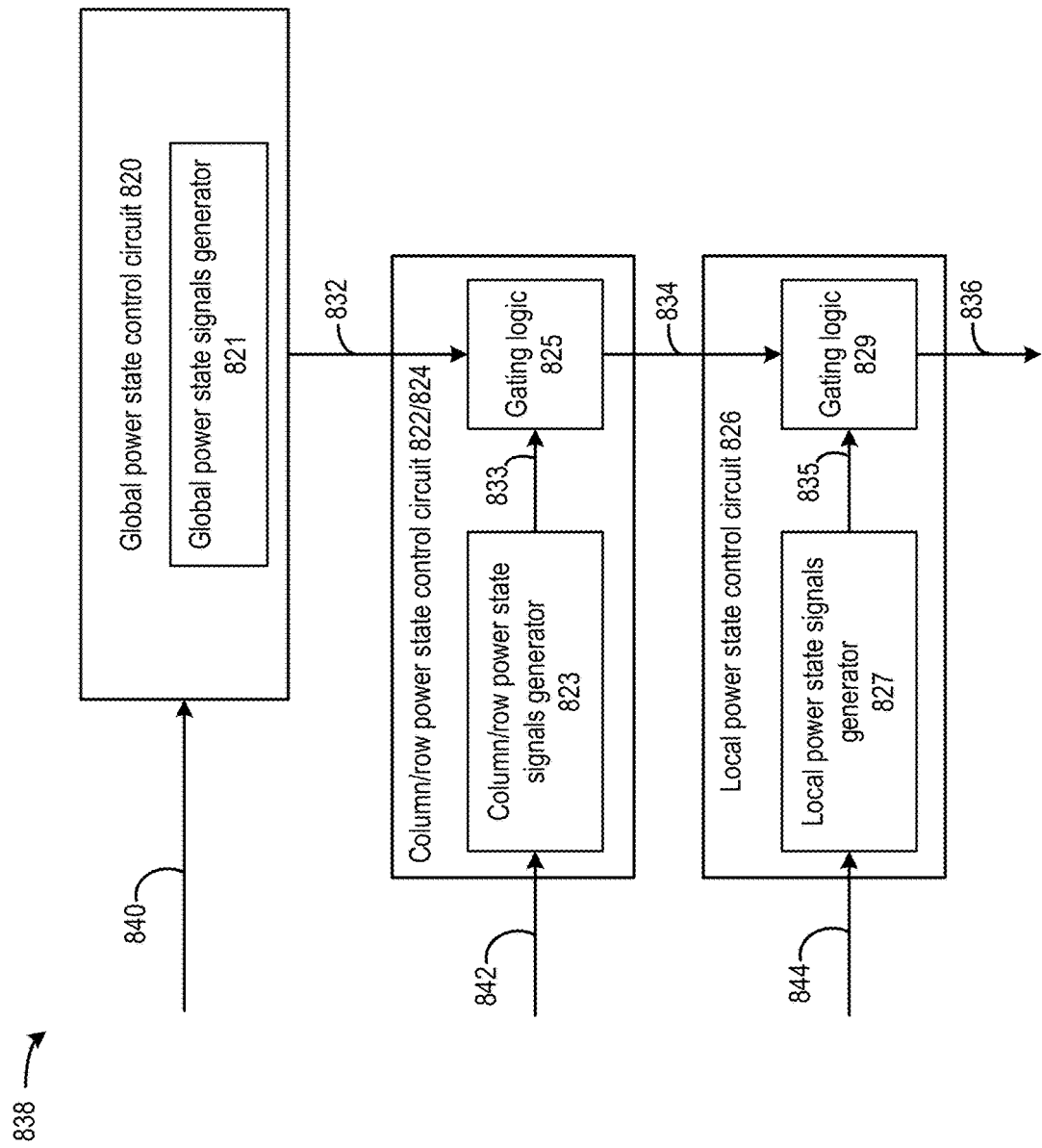

FIG. 8A and FIG. 8B illustrate example components of pixel cell array control circuit 716 and pixel cell array 718 of image sensor 704. As shown in FIG. 8A, pixel cell array control circuit 716 can include a programming map parser 802, a column control circuit 804, a row control circuit 806, and a pixel data output circuit 807. Programming map parser 802 can parse pixel array programming map 720, which can be in a serial data stream, to identify the programming data for each pixel cell (or block of pixel cells). The identification of the programming data can be based on, for example, a pre-determined scanning pattern by which the two-dimensional pixel array programming map is converted into the serial format, as well as the order by which the programming data is received by programming map parser 802 from the serial data stream. Programming map parser 802 can create a mapping among the row addresses of the pixel cells, the column addresses of the pixel cells, and one or more configuration signals based on the programming data targeted at the pixel cells. Based on the mapping, programming map parser 802 can transmit control signals 808 including the column addresses and the configuration signals to column control circuit 804, as well as control signals 810 including the row addresses mapped to the column addresses and the configuration signals to row control circuit 806. In some examples, the configuration signals can also be split between control signals 808 and control signals 810, or sent as part of control signals 810 to row control circuit 806.

Column control circuit 804 and row control circuit 806 are configured to forward the configuration signals received from programming map parser 802 to the configuration memory of each pixel cell of pixel cell array 718. In FIG. 8A, each box labelled $P_{ij}$ (e.g., $P_{00}$, $P_{01}$, $P_{10}$, $P_{11}$, etc.) can represent a pixel cell or a block of pixel cells (e.g., a 2×2 array of pixel cells, a 4×4 array of pixel cells, etc.) and can include or can be associated with a quantization unit 620 of FIG. 6E comprising processing circuits 614 and memory 616. As shown in FIG. 8A, column control circuit 804 drives a plurality of sets of column buses C0, C1, . . . Ci. Each set of column buses includes one or more buses and can be used to transmit control signals 722 of FIG. 7A, which can include a column selection signal and/or other configuration signals, to a column of pixel cells. For example, column bus(es) C0 can transmit a column selection signal 808a to select a column of pixel cells (or a column of blocks of pixel cells) $p_{00}$, $p_{01}$, . . . $p_{0j}$, column bus(es) C1 can transmit a column selection signal 808b to select a column of pixel cells (or blocks of pixel cells) $p_{10}$, $p_{11}$, . . . $p_{1j}$, etc.

Further, row control circuit 806 drives a plurality of sets of row buses labelled R0, R1, . . . Rj. Each set of row buses also includes one or more buses and can be used to transmit control signals 724 of FIG. 7A, which can include a row selection signal and/or other configuration signals, to a row of pixel cells, or a row of blocks of pixel cells. For example, row bus(es) R0 can transmit a row selection signal 810a to select a row of pixel cells (or blocks of pixel cells) $p_{00}$, $p_{10}$, . . . $p_{i0}$, row bus(es) R1 can transmit a row selection signal 810b to select a row of pixel cells (or blocks of pixel cells) $p_{01}$, $p_{11}$, . . . $p_{1i}$, etc. Any pixel cell (or block of pixel cells) within pixel cell array 718 can be selected based on a combination of the row selection signal and the column signal to receive the configuration signals. The row selection signals, column selection signals, and the configuration signals (if any) are synchronized based on control signals 808 and 810 from programming map parser 802, as described above. Each column of pixel cells can share a set of output buses to transmit pixel data to pixel data output module 807. For example, column of pixel cells (or blocks of pixel cells) $p_{00}$, $p_{01}$, ... $p_{0j}$ can share output buses $D_0$, column of pixel cells (or blocks of pixel cells) $p_{10}$, $p_{11}$, ... $p_{1j}$ can share output buses $D_1$, etc.

Pixel data output module 807 can receive the pixel data from the buses, convert the pixel data into one or more serial data streams (e.g., using a shift register), and transmit the data streams to host device 702 under a pre-determined protocol such as MIPI. The data stream can come from a quantization unit 620 (e.g., processing circuits 614 and memory 616) associated with each pixel cell (or block of pixel cells) as part of a sparse image frame. In addition, pixel data output module 807 can also receive control signals 808 and 810 from programming map parser 802 to determine, for example, which pixel cell does not output pixel data, the bit width of pixel data output by each pixel cell, etc., and then adjust the generation of serial data streams accordingly. For example, pixel data output module 807 can control the shift register to skip a number of bits in generating the serial data streams to account for, for example, variable bit widths of output pixel data among the pixel cells, the disabling of pixel data output at certain pixel cells, etc.

In addition, pixel cell array control circuit 716 further includes a global power state control circuit 820, a column power state control circuit 822, a row power state control circuit 824, and a local power state control circuit 826 at each pixel cell or each block of pixel cells (not shown in FIG. 8A) forming hierarchical power state control circuits. Global power state control circuit 820 can be of the highest level in the hierarchy, followed by row/column power state control circuit 822/824, with local power state control circuit 826 at the lowest level in the hierarchy.

The hierarchical power state control circuits can provide different granularities in controlling the power state of image sensor 704. For example, global power state control circuit 820 can control a global power state of all circuits of image sensor 704, including processing circuits 614 and memory 616 of all pixel cells, DAC 622 and counter 620 of FIG. 6E, etc. Row power state control circuit 822 can control the power state of processing circuits 614 and memory 616 of each row of pixel cells (or blocks of pixel cells) separately, whereas column power state control circuit 824 can control the power state of processing circuits 614 and memory 616 of each column of pixel cells (or blocks of pixel cells) separately. Some examples may include row power state control circuit 822 but not column power state control circuit 824, or vice versa. In addition, local power state control circuit 826 can be part of a pixel cell or a block of pixel cells, and can control the power state of processing circuits 614 and memory 616 of the pixel cell or the block of pixel cells.

FIG. 8B illustrates examples of internal components of hierarchical power state control circuits and their operations. Specifically, global power state control circuit 820 can output a global power state signal 832, which can be in the form of a bias voltage, a bias current, a supply voltage, or programming data, that sets a global power state of image sensor 704. Moreover, column power state control circuit 822 (or row power state control circuit 824) can output a column/row power state signal 834 that sets a power state of a column/row of pixel cells (or blocks of pixel cells) of image sensor 704. Column/row power state signal 834 can be transmitted as row signals 810 and column signals 808 to the pixel cells. Further, local power state control circuit 826 can output a local power state signal 836 that sets a power state of the pixel cell (or a block of pixel cells), including the associated processing circuits 614 and memory 616. Local power state signal 836 can be output to processing circuits 614 and memory 616 of the pixel cells to control their power state.

In hierarchical power state control circuits 838, an upper-level power state signal can set an upper bound for a lower-level power state signal. For example, global power state signal 832 can be an upper level power state signal for column/row power state signal 834 and set an upper bound for column/row power state signal 834. Moreover, column/row power state signal 834 can be an upper level power state signal for local power state signal 836 and set an upper bound for local power state signal 836. For example, if global power state signal 832 indicates a low power state, column/row power state signal 834 and local power state signal 836 may also indicate a low power state.

Each of global power state control circuit 820, column/row power state control circuit 822/824, and local power state control circuit 826 can include a power state signal generator, whereas column/row power state control circuit 822/824, and local power state control circuit 826 can include a gating logic to enforce the upper bound imposed by an upper-level power state signal. Specifically, global power state control circuit 820 can include a global power state signals generator 821 to generate global power state signal 832. Global power state signals generator 821 can generate global power state signal 832 based on, for example, an external configuration signal 840 (e.g., from host device 702), a pre-determined temporal sequences of global power states, etc.

In addition, column/row power state control circuit 822/824 can include a column/row power state signals generator 823 and a gating logic 825. Column/row power state signals generator 823 can generate an intermediate column/row power state signal 833 based on, for example, an external configuration signal 842 (e.g., from host device 702), a pre-determined temporal sequences of row/column power states, etc. Gating logic 825 can select one of global power state signal 832 or intermediate column/row power state signal 833 representing the lower power state as column/row power state signal 834.

Further, local power state control circuit 826 can include a local power state signals generator 827 and a gating logic 829. Local power state signals generator 827 can generate an intermediate local power state signal 835 based on, for example, an external configuration signal 844, which can be from a pixel array programming map, a pre-determined temporal sequence of row/column power states, etc. Gating logic 829 can select one of intermediate local power state signal 835 or column/row power state signal 834 representing the lower power state as local power state signal 836.

Figure 8C:
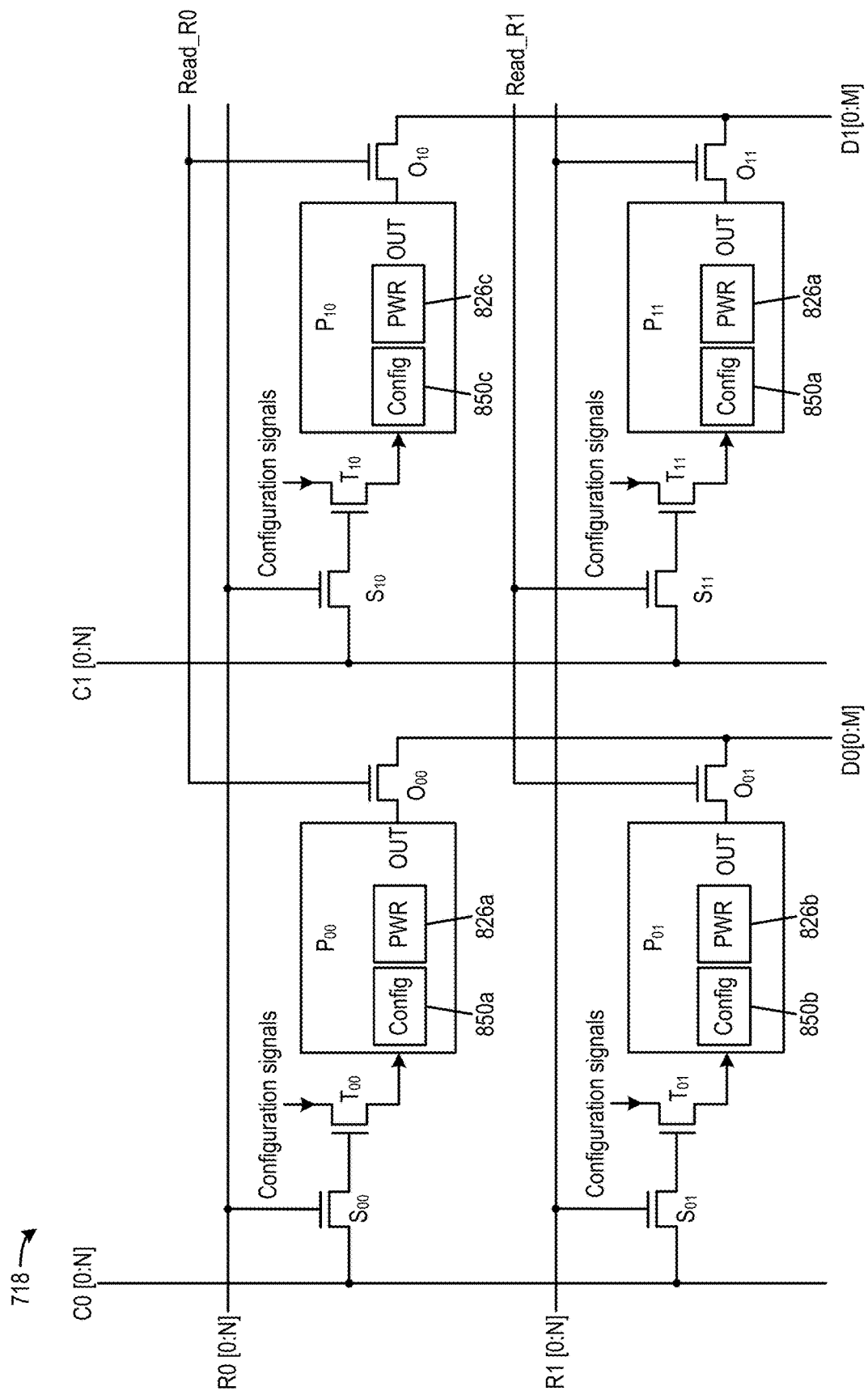

FIG. 8C illustrates additional details of pixel cell array 718, including local power state control circuit 826 (e.g., 826a, 826b, 826c, and 826d, labelled as "PWR" in FIG. 8C) and configuration memory 850 (e.g., 850a, 850b, 850c, and 850d, labelled as "Config" in FIG. 8C) of each pixel cell (or each block of pixel cells). Configuration memory 850 can store first programming data to control a light measurement operation (e.g., exposure period duration, quantization resolution, etc.) of a pixel cell (or a block of pixel cells). In addition, configuration memory 850 can also store second programming data that can be used by local power state control circuit 826 to set the power states of processing circuits 614 and memory 616. Configuration memory 850 can be implemented as a static random access memory (SRAM). Although FIG. 8C shows that local power state control circuit 826 and configuration memory 850 are internal to each pixel cell, it is understood that configuration memory 850 can also be external to each pixel cell, such as when local power state control circuit 826 and configuration memory 850 are for a block of pixel cells.

As shown in FIG. 8C, the configuration memory 850 of each pixel cell is coupled with column buses C and row buses R via transistors S, such as $S_{00}$, $S_{10}$, $S_{10}$, $S_{11}$, etc. In some examples, each set of column buses (e.g., C0, C1, etc.) and row buses (e.g., R0, R1, etc.) can include multiple bits. For example, in FIG. 8C, each set of column buses and row buses can carry N+1 bits. It is understood that in some examples each set of column buses and row buses can also carry a single data bit. Each pixel cell is also electrically connected with transistors T, such as $T_{00}$, $T_{10}$, $T_{10}$, $T_{11}$, etc., to control the transmission of configuration signals to the pixel cell (or block of pixel cells). Transistor(s) S of each pixel cell can be driven by the row and column select signals to enable (or disable) the corresponding transistors T to transmit configuration signals to the pixel cell. In some examples, column control circuit 804 and row control circuit 806 can be programmed by a single write instruction (e.g., from host device 702) to write to configuration memory 850 of multiple pixel cells simultaneously. Column control circuit 804 and row control circuit 806 can then control the row buses and column buses to write to the configuration memory of the pixel cells.

In some examples, local power state control circuit 826 can also receive configuration signals directly from transistors T without storing the configuration signals in configuration memory 850. For example, as described above, local power state control circuit 826 can receive row/column power state signal 834, which can be an analog signal such as a voltage bias signal, a supply voltage, etc., to control the power state of the pixel cell and the processing circuits and/or memory used by the pixel cell.

In addition, each pixel cell also includes transistors O, such as $O_{00}$, $O_{10}$, $O_{10}$, $O_{11}$, etc., to control the sharing of the output bus D among a column of pixel cells. The transistors O of each row can be controlled by a read signal (e.g., read_R0, read_R1, etc.) to enable a row-by-row read out of the pixel data, such that one row of pixel cells output pixel data through output buses D0, D1, . . . Di, followed by the next row of pixel cells.

In some examples, the circuit components of pixel cell array 718, including processing circuits 614 and memory 616, counters 620, DAC 622, etc., can be organized into a hierarchical power domain managed by hierarchical power state control circuits 838. The hierarchical power domain may include a hierarchy of multiple power domains and power sub-domains. The hierarchical power state control circuits can individually set a power state of each power domain, and each power sub-domain under each power domain. Such arrangements allow fine grain control of the power consumption by image sensor 704 and support various spatial and temporal power state control operations to further improve the power efficiency of image sensor 704.

Figure 9A:
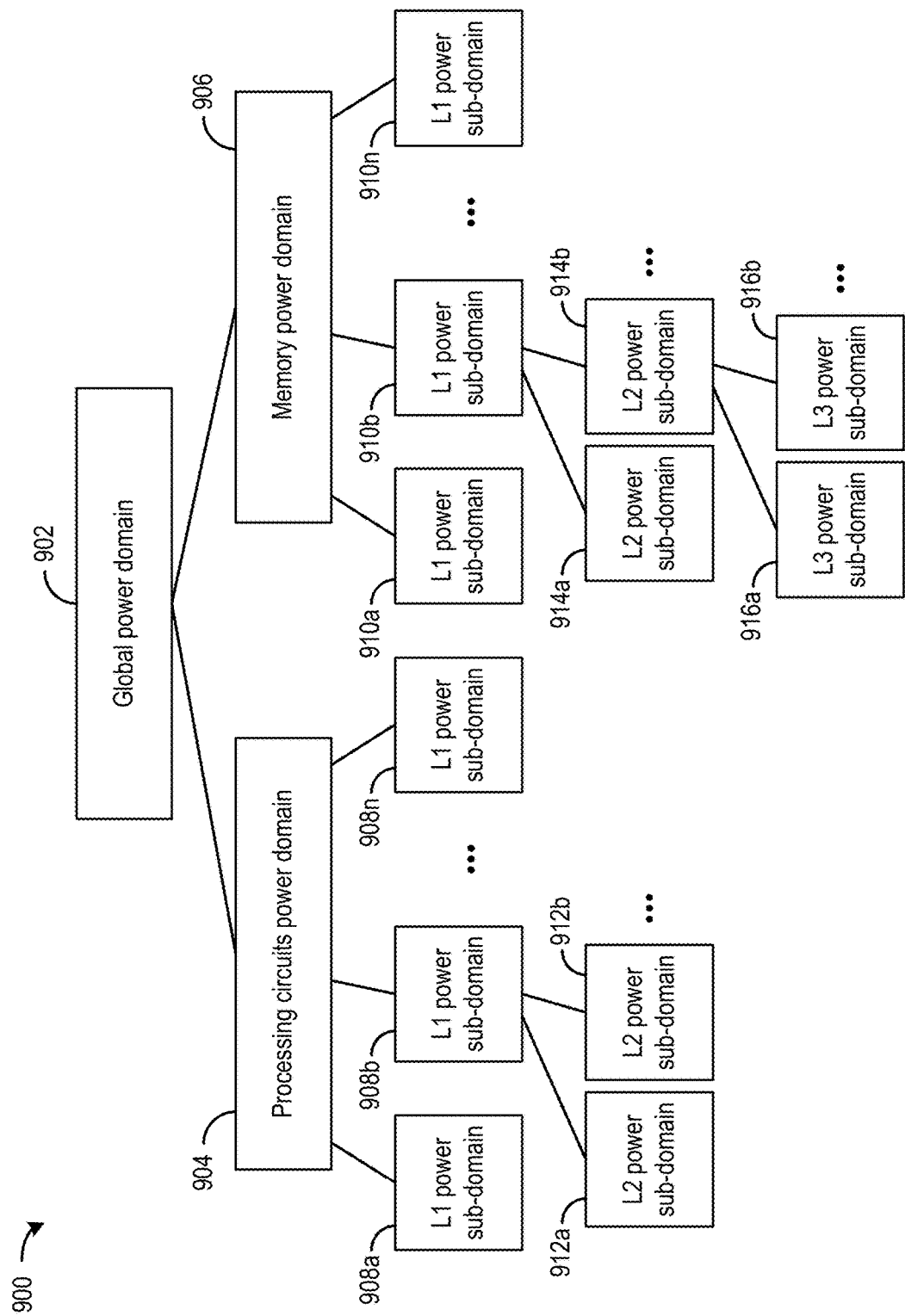
FIG. 9A, FIG. 9B, and FIG. 9C illustrate examples of a hierarchical power domain of an image sensor of FIGS. 7A-7E.
Figure 9B:
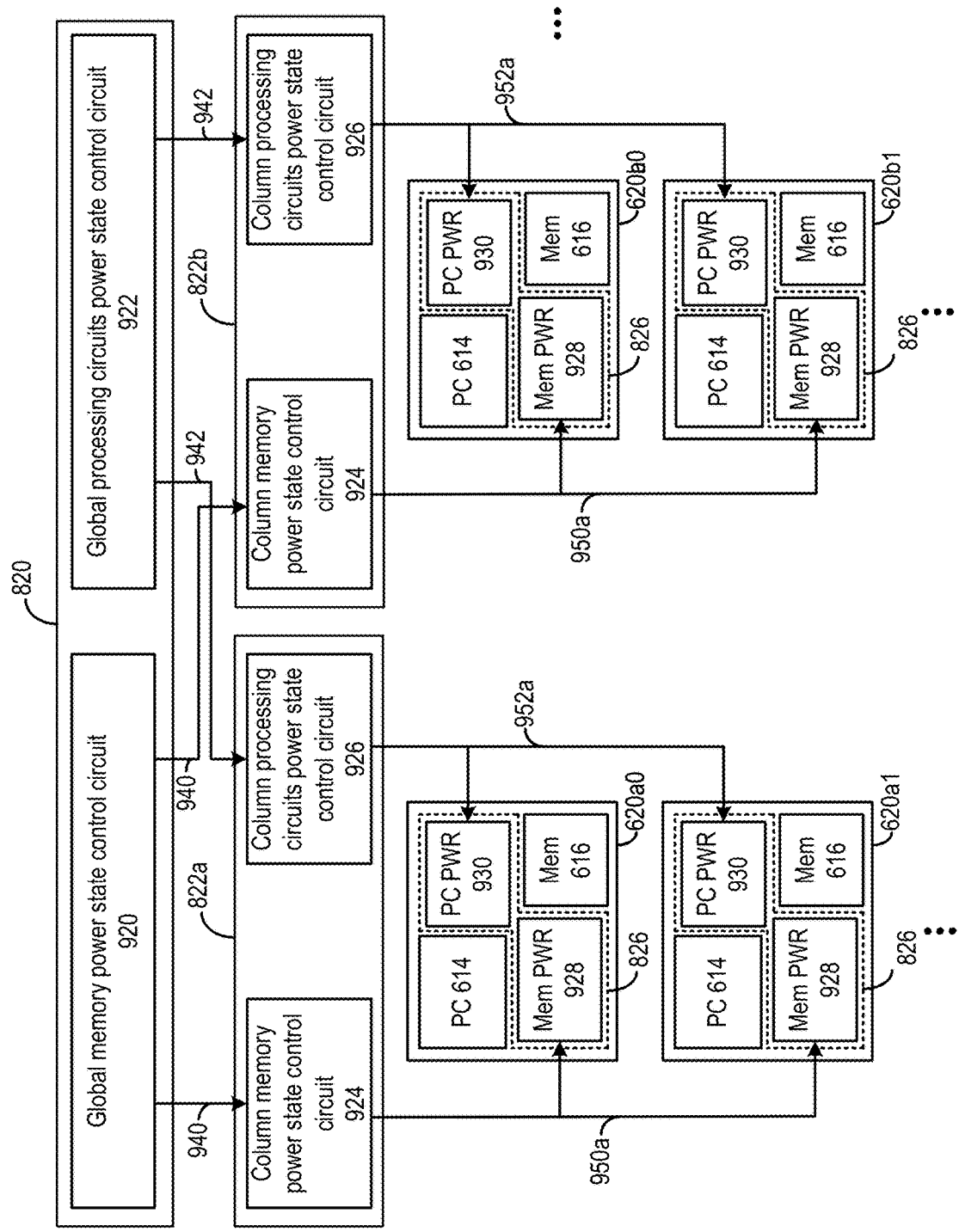
Figure 9C:
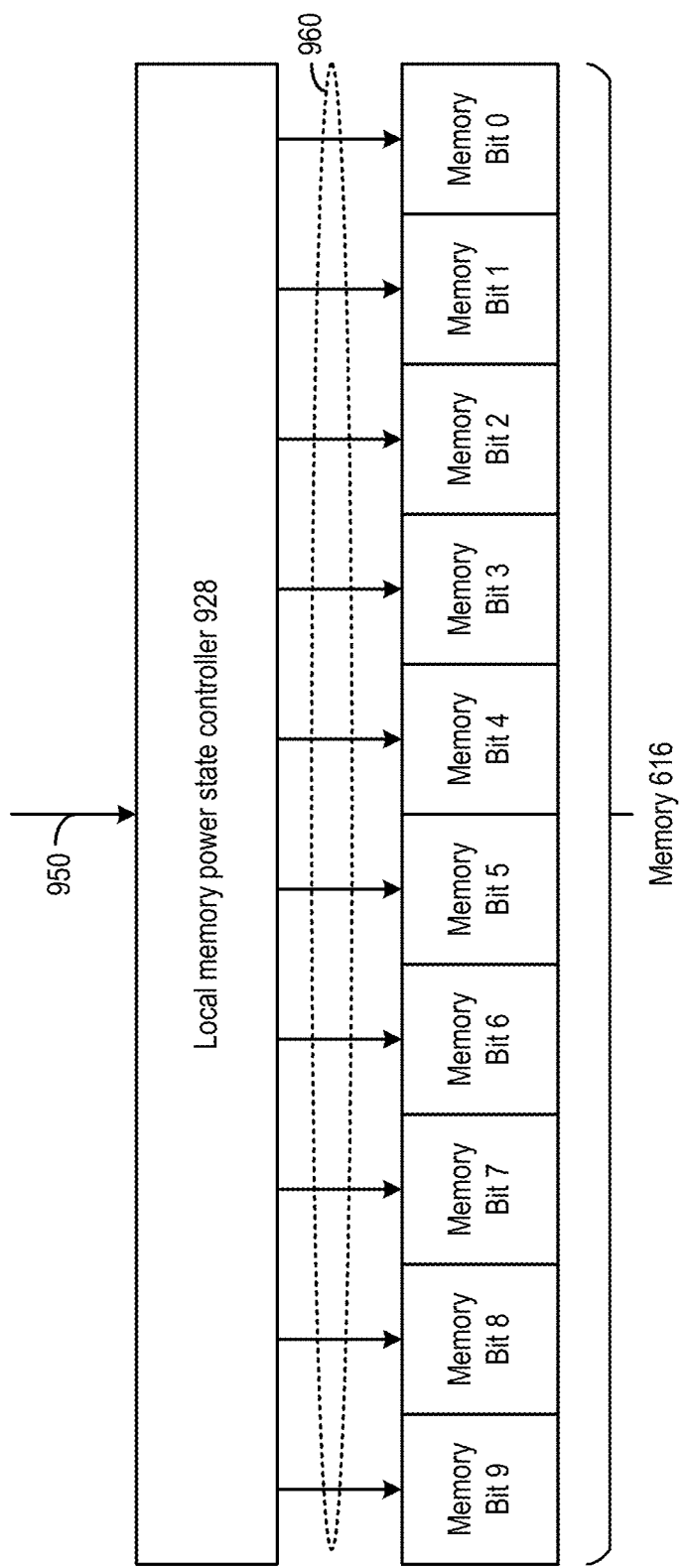

FIG. 9A, FIG. 9B, and FIG. 9C illustrate examples of a hierarchical power domain 900. As shown in FIG. 9A, hierarchical power domain 900 includes a global power domain 902 which is the highest level within hierarchical power domain 900. Global power domain 902 is associated with, for example, processing circuits 614 and memory 616 of all pixel cells in pixel cell array 718, together with other circuits of image sensor 704 such as counters 620 and DAC 622. Setting a power state of global power domain 902 can set a power state of each of these circuits.

The second level of hierarchical power domain 900 comprises a processing circuits power domain and 904 and a memory power domain 906. Processing circuits power domain 904 can be associated with processing circuits 614 of all pixel cells in pixel cell array 718, together with counters 620, DAC 622, and bias generator 626, whereas memory power domain 906 can be associated with memory 616 of all pixel cells in pixel cell array 718 and pre-charge circuit 624. The power states of processing circuits power domain 904 and memory power domain 906 can be set separately. As to be described below, such arrangements allow processing circuits 614 to be powered off after quantization completes, while memory 616 can remain powered on to retain the stored quantization results before read out by host device 702, to reduce power consumption.

The third level of hierarchical power domain 900 comprises level 1 (L1) power sub-domains under each of processing circuits power domain 904 and memory power domain 906. For example, processing circuits power domain 904 may include L1 power sub-domains 908a-908n, whereas memory power domain 906 may include L1 power sub-domains 910a-910n. Each L1 power sub-domain 906 of processing circuits power domain 904 can be associated with, for example, processing circuits 614 of a row or a column of pixel cells (or blocks of pixel cells), counters 620, DAC 622, pre-charge circuit 624, bias generator 626, and other supporting circuits (e.g., clocking circuits, sense amplifier circuits, interface circuits such as mobile industry processor interface (MIPI) interface circuits, etc.). Moreover, each L1 power sub-domain 910 of memory power domain 906 can be associated with memory 616 of a row or a column of pixel cells (or blocks of pixel cells).

The fourth level of hierarchical power domain 900 comprises level 2 (L2) power sub-domains under some of L1 power sub-domains 908 of processing circuits power domain 904 and L1 power sub-domains 910 of memory power domain 906. For example, in FIG. 9A, L1 power sub-domain 908b can have L2 power sub-domains 912a, 912b, etc., whereas L1 power sub-domain 910b can have L2 power sub-domains 914a, 914b, etc. L2 power sub-domains can be associated with a pixel cell, or a block of pixel cells, within a row or a column represented by L1 power sub-domain 908/910. For example, L2 power sub-domains 912a and 912b can be associated with processing circuits 614 of different pixel cells (or blocks of pixel cells) within a row or a column of pixel cells/blocks of pixel cells associated with L1 power sub-domain 908b, as well as pre-charge circuit 624 for a particular row/column (e.g., pre-charge circuit 624a, pre-charge circuit 624b, etc.), whereas L2 power sub-domains 914a and 914b can be associated with memory 616 of different pixel cells (or blocks of pixel cells) within a row or a column of pixel cells/blocks of pixel cells associated with L1 power sub-domain 910b.

In addition, hierarchical power domain 900 may further comprise a fifth level, represented by L3 power sub-domains 916a, 916b, etc., under some or all of L2 power sub-domains 914 under memory power domain 906. L3 power sub-domains can be associated with different subsets of bits of memory 616. As to be described below, subsets of bits (e.g., most significant bits (MSBs), least significant bits (LSBs), etc.) of memory 616 can be separately enabled/disabled based on a number of bits of the quantization results to be stored at memory 616, which can be based on the quantization resolution of processing circuits 614. The quantization resolution, in turn, can be based on setting a power state of processing circuits 614.

Different components of hierarchical power state control circuits 838 can set the power states of different levels of hierarchical power domain 900. For example, global power state control circuit 820 can set the power states of global power domain 902, processing circuits power domain 904, and memory power domain 906. Moreover, column/row power state control circuit 822/824 can set the power states of L1 power sub-domains 908, whereas local power state control circuits 826 can set the power states of L2 and L3 power sub-domains.

FIG. 9B and FIG. 9C illustrate examples of internal components of global power state control circuit 820, column power state control circuit 822, and local power state control circuit 826 to manage different levels of hierarchical power domain 900. As shown in FIG. 9B, global power state control circuit 820 can include a global memory power state control circuit 920 and a global processing circuits power state control circuit 922 to control, respectively, memory power domain 906 and processing circuits power domain 904. Each of global memory power state control circuit 920 and global processing circuits power state control circuit 922 can include global power state signals generator 821 of FIG. 8B. Global memory power state control circuit 920 can transmit global memory power state signals 940 to set a power state of memory power domain 906, and global processing circuits power signals 942 to set a power state of processing circuits power domain 904.

In addition, column power state control circuit 822 for each column (e.g., 822a, 822b, etc.) can include a column memory power state control circuit 924 and a column processing circuits power state control circuit 926 to control, respectively, a processing circuits L1 power sub-domain (e.g., 908a) and a memory power L1 sub-domain (e.g., 910a) for pixel cells of a particular column. Each of column memory power state control circuit 924 and column processing circuits power state control circuit 926 can include column/row power state signals generator 823 and gating logic 825 of FIG. 8B. Column memory power state control circuit 924 can generate column memory power state signals 950 (e.g., 950a, 950b), whereas column processing circuits power state control circuit 926 can generate column processing circuits power state signals 952 (e.g., 952a, 952b). As described above, with gating logic 825, column memory power state control circuit 924 can generate column memory power state signals 950 with an upper bound imposed by global memory power state signals 940, whereas column processing circuits power state control circuit 926 can generate column processing circuits power state signals 952 with an upper bound imposed by global processing circuits power state signals 942.

Further, each local power state control circuit 826 at a pixel cell (or a block of pixel cells) can include a local memory power state control circuit 928 (labelled "Mem PWR" in FIG. 9C) and a local processing circuits power state control circuit 930 (labelled "PC PWR" in FIG. 9C) to control, respectively, a processing circuits L2 power sub-domain (e.g., 912a) and a memory L2 power sub-domain (e.g., 914a) of a quantization unit 620 (e.g., 620a0, 620a1, 620b0, 620b1, etc.) associated with the pixel cell/block of pixel cells. Local memory and processing circuits power state signals can be generated with an upper bound imposed by, respectively, column memory and processing circuits power state signals 950 and 952. Moreover, as shown in FIG. 9C, local memory power state control circuit 928 can generate local memory power state signals 960 to further control memory L3 power sub-domains to, for example, enable/disable subsets of bits of memory 616 at the quantization unit.

Figure 10A:
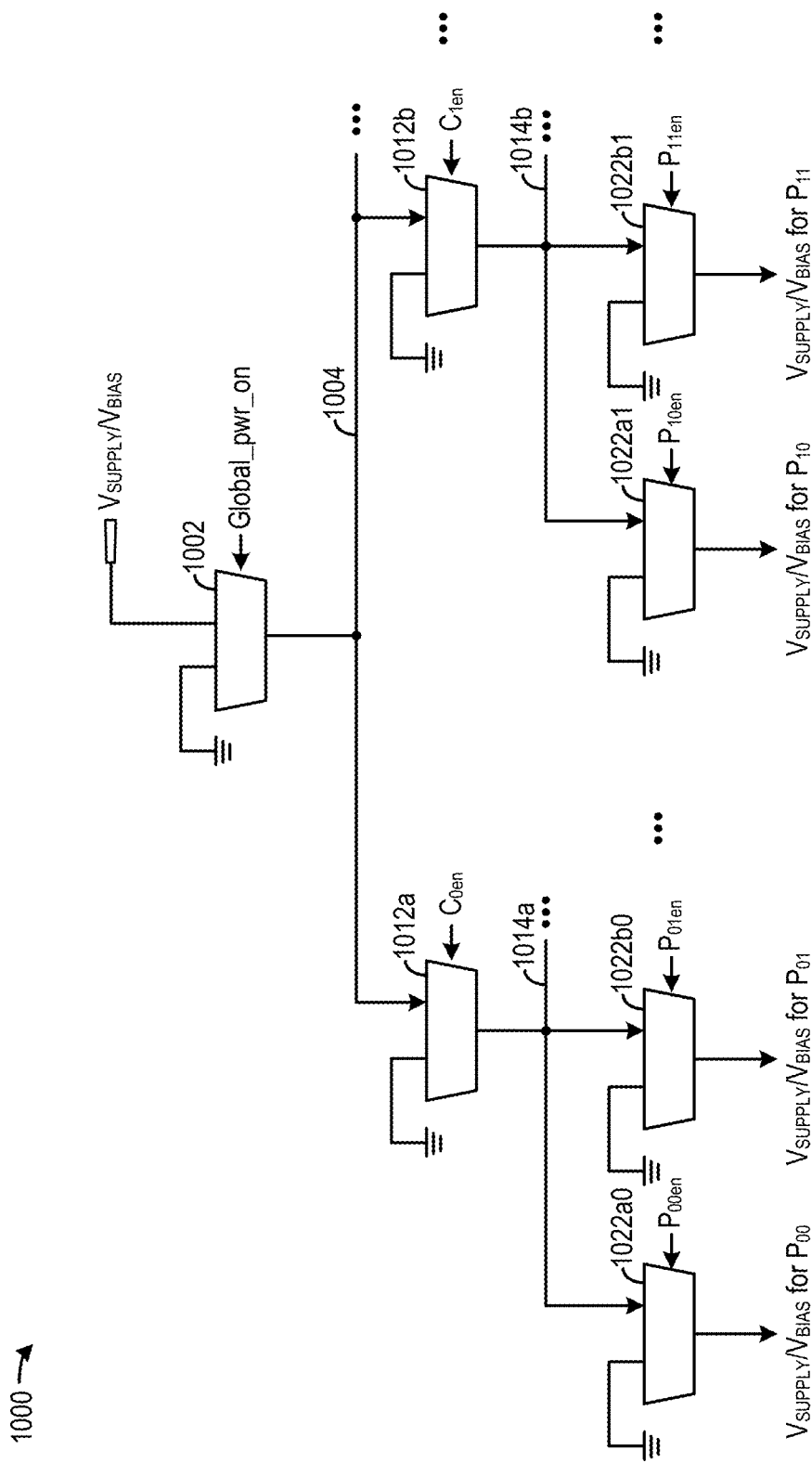
FIG. 10A, FIG. 10B, FIG. 10C, and FIG. 10D illustrate example components of the image sensor of FIGS. 7A-7C.

FIG. 10A, FIG. 10B, FIG. 10C, and FIG. 10D illustrate examples of internal circuit components of image sensor 704 to set a power state. As shown in FIG. 10A, image sensor 704 can include a hierarchical multiplexors network 1000 to selectively transmit an analog signal, such as a supply voltage $V_{SUPPLY}$ or a bias voltage $V_{BIAS}$ to circuits associated with different power sub-domains. Image sensor 704 may include two hierarchical networks of multiplexors 1000, one for processing circuits power domain 904 and its lower-level power sub-domains 908 and 912, and another one for memory power domain 906 and its lower-level power sub-domains 910, 914, and 916. In hierarchical multiplexors network 1000, multiplexor 1002 can be at a highest level to selectively pass $V_{SUPPLY}/V_{BIAS}$ voltages or a ground voltage to a global network 1004 supplied to each row or column of pixel cells (or blocks of pixel cells), based on a global power state signal (labelled "global_pwr_on" in FIG. 10A) from global memory power state control circuit 920 or global processing circuits power state control circuit 922.

Hierarchical multiplexors network 1000 further includes multiplexors 1012 (e.g., 1012a, 1012b, etc.) at a second level. Each multiplexor 1012 can selectively pass $V_{SUPPLY}/V_{BIAS}$ voltages or a ground voltage from multiplexor 1002 to, for example, a column signal line 1014 connected to a column of pixel cells (or blocks of pixel cells), in a case where columns of pixel cells are grouped into different L1 power sub-domains 908. For example, multiplexor 1012a can control column signal line 1014a based on column enable signal $C_{0en}$ that indicates whether processing circuits 614 and memory 616 of a first column (C0) of pixel cells are enabled or disabled. Moreover, multiplexor 1012b can control column signal line 1014b based on column enable signal $C_{1en}$ that indicates whether processing circuits 614 and memory 616 of a second column (C1) of pixel cells are enabled or disabled. Column enable signals $C_{0en}$ and $C_{1en}$ are generated by column memory power state control circuit 924 or column processing circuits power state control circuit 926. In a case where rows of pixel cells are grouped into different L1 power sub-domains 908, each multiplexor 1012 can selectively pass $V_{SUPPLY}/V_{BIAS}$ voltages or a ground voltage to a row bus/signal line.

Hierarchical multiplexors network 1000 also includes multiplexors 1022 (e.g., 1022a0, 1022b0, 1022a1, 1022b1, etc.) at a third level. Each multiplexor 1022 can selectively pass $V_{SUPPLY}/V_{BIAS}$ voltages or a ground voltage from multiplexors 1012 to each pixel cell (or a block of pixel cells) based on a selection signal for the pixel cell. For example, multiplexor 1022a0 can selectively pass $V_{SUPPLY}/V_{BIAS}$ voltages or a ground voltage from multiplexors 1012a to pixel cell (or block of pixel cells) $P_{00}$ of the first column based on $P_{00en}$ signal, whereas multiplexor 1022a1 can selectively pass $V_{SUPPLY}/V_{BIAS}$ voltages or a ground voltage from multiplexors 1012a to pixel cell (or block of pixel cells) $P_{01}$ of the first column based on $P_{01en}$ signal. Moreover, multiplexor 1022a1 can selectively pass $V_{SUPPLY}/V_{BIAS}$ voltages or a ground voltage from multiplexors 1012b to pixel cell (or block of pixel cells) $P_{10}$ of the second column based on $P_{10en}$ signal, whereas multiplexor 1022b1 can selectively pass $V_{SUPPLY}/V_{BIAS}$ voltages or a ground voltage from multiplexors 1012b to pixel cell (or block of pixel cells) $P_{11}$ of the second column based on $P_{11en}$ signal. The $P_{00en}$, $P_{01en}$, $P_{10en}$, and $P_{11en}$ signals are generated by local memory power state control circuit 928 or local processing circuits power state control circuit 930 based on, for example, a pixel array programming map (e.g., pixel array programming map 720).

Figure 10B:
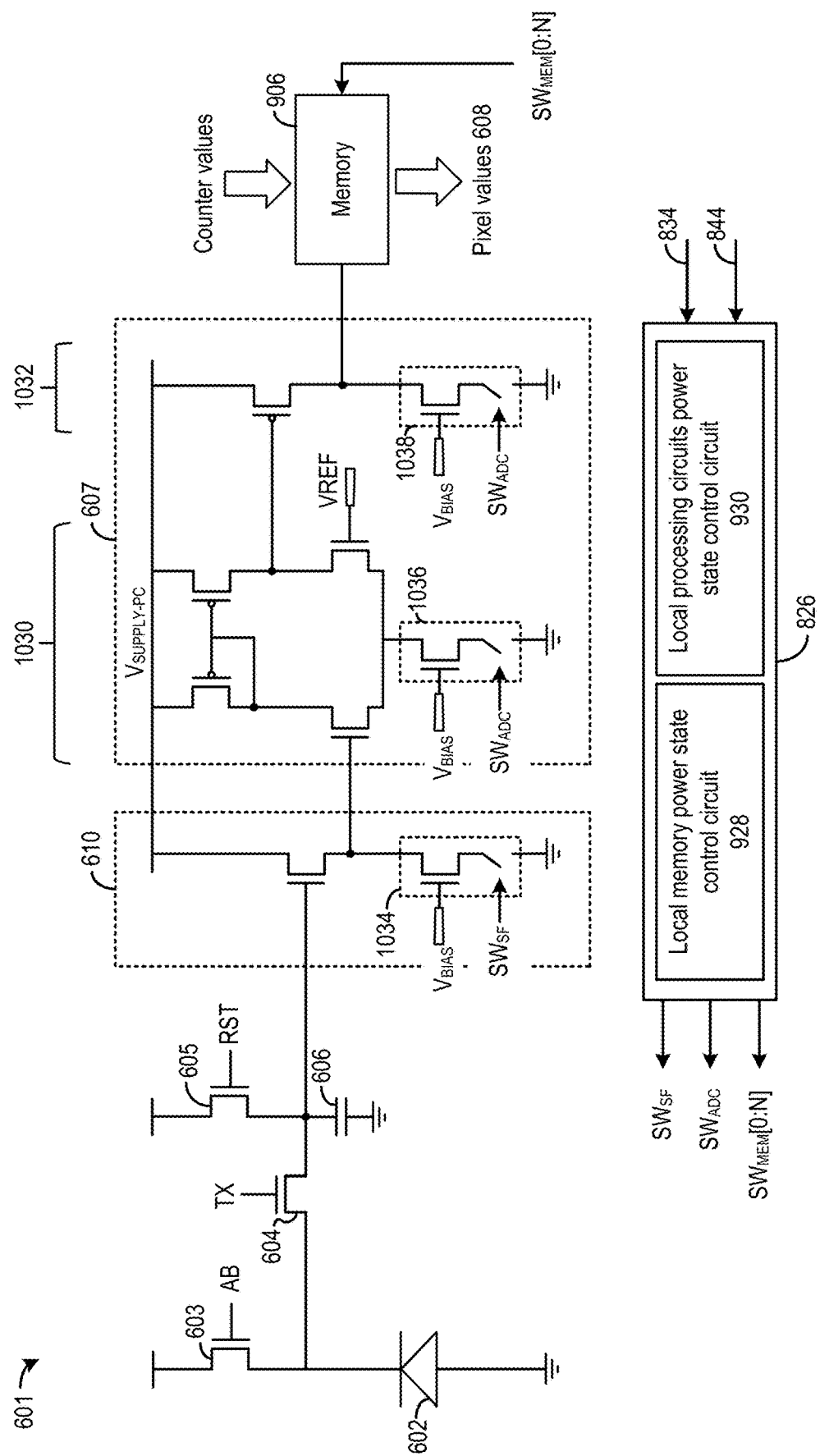
Figure 10C:
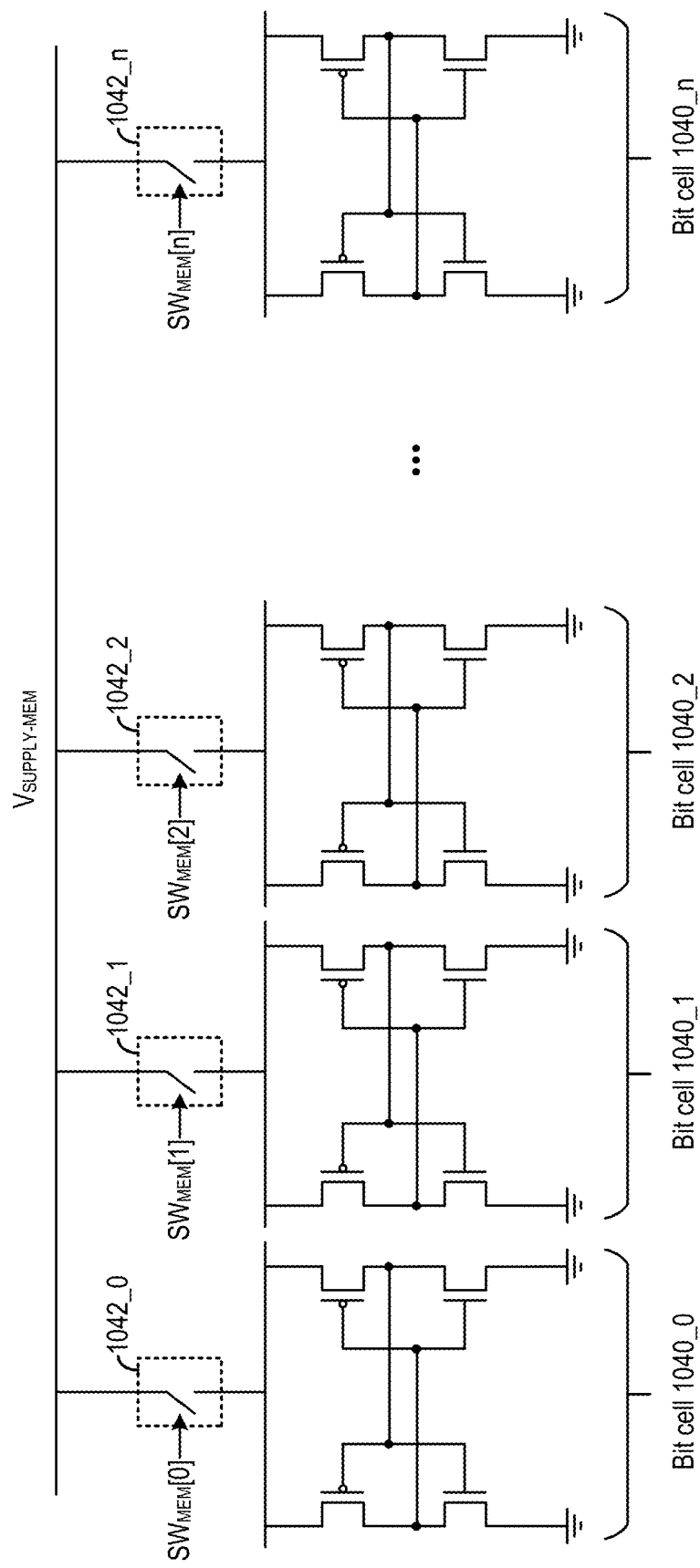
Figure 10D:
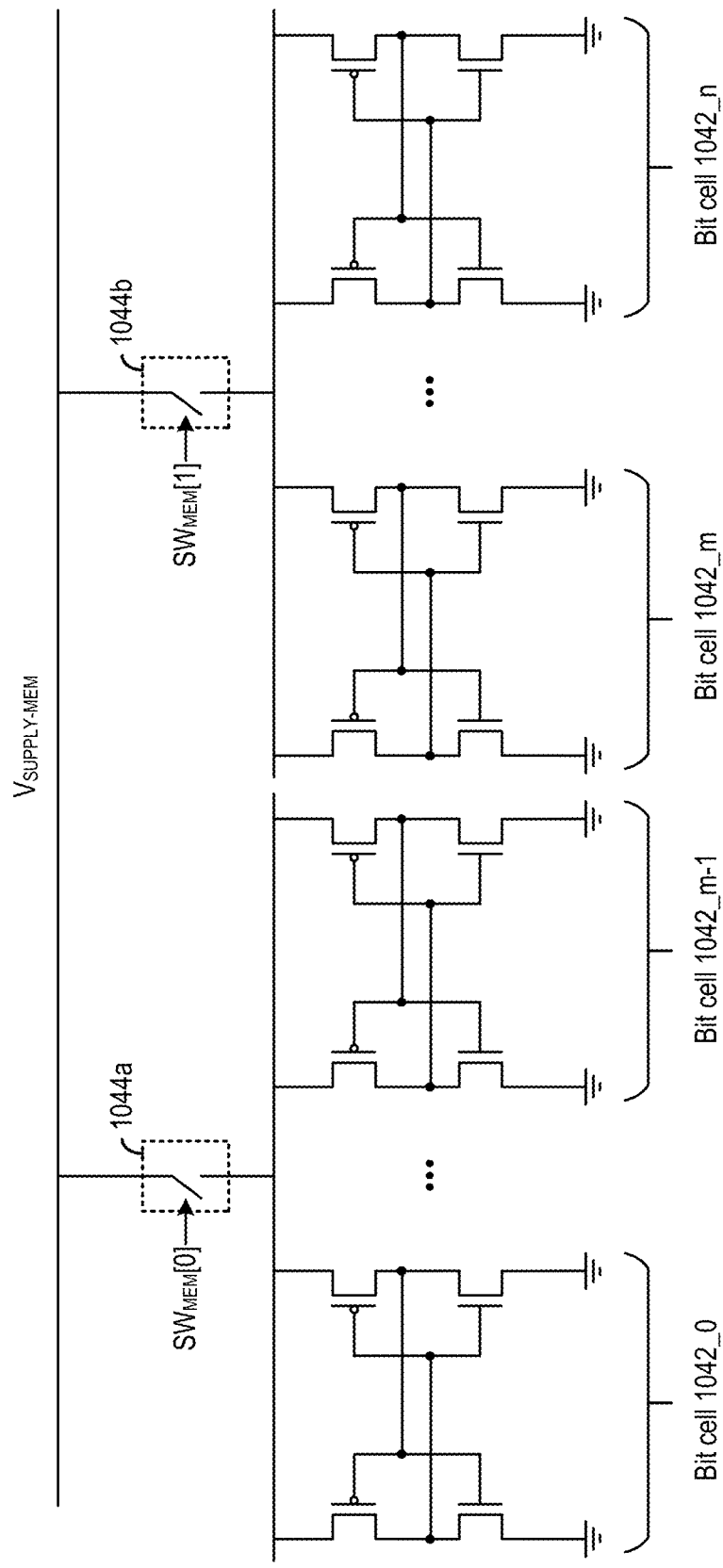

FIG. 10B, FIG. 10C, and FIG. 10D illustrate examples of circuit components to control the power state of processing circuits 614 and memory 616. As shown in FIG. 10B, quantizer/comparator 607 can include a differential amplifier 1030 that compares between the output of source follower 610 and VREF, and an output stage 1032 to generate an output of the comparator. Source follower 610 and quantizer/comparator 607 can receive a supply voltage $V_{SUPPLY-PC}$ from one of multiplexors 1022, which can pass a non-zero voltage or a zero voltage as $V_{SUPPLY-PC}$. In addition, each of source follower 610, differential amplifier 1030, and output stage 1032 can include a switchable current source that sets the bandwidth and gain. For example, source follower 610 includes a switchable current source 1034, differential comparator 1030 includes a switchable current source 1036, whereas output stage 1032 includes a switchable current source 1038. Each current source can be switched on/off by disconnecting the current source from the ground (as shown in FIG. 10B), or by disconnecting the bias voltage $V_{BIAS}$ from the current source. Switchable current source 1034 of source follower 610 can be controlled by a $SW_{SF}$ signal, whereas switchable current sources 1036 and 1038 can be controlled by a $SW_{ADC}$ signal. Both $SW_{SF}$ and $SW_{ADC}$ signals can be generated by local power state control circuit 826 based on, for example, column/row power state signal 834 from column processing circuits power state control circuit 926 and external configuration signal 844 from, for example, pixel array programming map 720.

In addition to $SW_{SF}$ and $SW_{ADC}$ signals, local power state control circuit 826 can also generate $SW_{MEM}$ signals to enable or disable memory 616. In some examples, $SW_{MEM}$ can enable/disable the entirety of memory 616 of a pixel cell (or a block of pixel cells). In some examples, $SW_{MEM}$ signals can include an [0:N] array that can enable/disable a subset of the bits of memory 616.

FIG. 10C illustrates an example of memory 616 including N+1 SRAM bit cells, including bit cells 1040_0, 1040_1, 1040_2, . . . 1040_n, with each bit cell including a power gate that allows enabling or disabling of individual bit cell. For example, bit cell 1040_0 includes a power gate 1042_0, controlled by the $SW_{MEM}[0]$ signal, to connect or disconnect bit cell 1040_0 from supply voltage $V_{SUPPLY-MEM}$, which can be supplied by one of multiplexors 1022, which can pass a non-zero voltage or a zero voltage as $V_{SUPPLY-MEM}$. Moreover, bit cell 1040_1 includes a power gate 1042_1, controlled by the $SW_{MEM}[1]$ signal, to connect or disconnect bit cell 1040_1 from $V_{SUPPLY-MEM}$. Further, bit cell 1040_2 includes a power gate 1042_2, controlled the by $SW_{MEM}[2]$ signal, to connect or disconnect bit cell 1040_2 from $V_{SUPPLY-MEM}$. Bit cell 1040_n includes a power gate 1042_n, controlled by the $SW_{MEM[n]}$ signal, to connect or disconnect bit cell 1040_n from $V_{SUPPLY-MEM}$. FIG. 10C allows each bit cell to be individually connected to or disconnected from $V_{SUPPLY-MEM}$.

FIG. 10D illustrate another example of circuit components to control the power state of memory 616. As shown in FIG. 10D, memory 616 includes two sets of bit cells, including bit cells 1040_0 to 1040_m-1, and bit cells 1040_m to 1040_n. Bit cells 1040_0 to 1040_m-1 can correspond to most significant bits (MSBs), whereas bit cells 1040_m to 1040_n can correspond to least significant bits (LSBs). The MSBs can be connected or disconnected from $V_{SUPPLY-MEM}$ by a power gate 1044a, which can be controlled by the $SW_{MEM}[1]$ signal. Moreover, the LSBs can be connected or disconnected from $V_{SUPPLY-MEM}$ by a power gate 1044b, which can be controlled by the $SW_{MEM}[0]$ signal.

The arrangements of FIG. 10C and FIG. 10D allow enabling or disabling of subsets of bit cells of memory 616 based on a resolution of quantization by quantizer/comparator 607. As to be described below, in a case where the bias current of quantizer/comparator 607 is variable to set a quantization resolution, the number of bit cells of memory 616 being enabled can match the quantization resolution. For example, if the bias current of quantizer/comparator 607 is set to support a 2-bit quantization resolution (e.g., out of a maximum of 10-bit quantization resolution), local memory power state control circuit 928 can disable all the bit cells of memory 616 except the first two bit cells (e.g., bits cell 1040_0 and 1040_1) to reduce power.

Figure 11A:
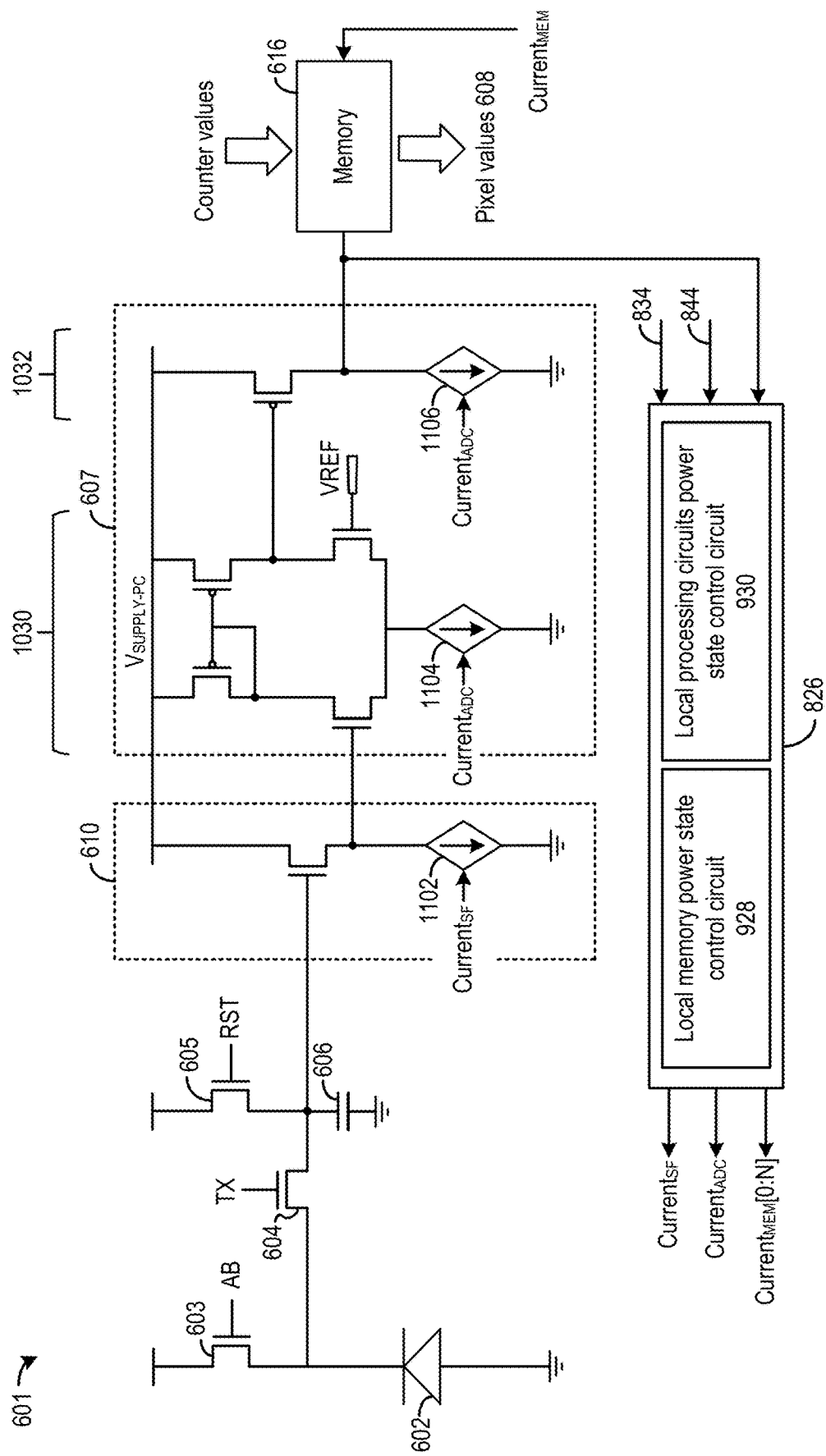

FIG. 11A, FIG. 11B, FIG. 11C, FIG. 11D, and FIG. 11E illustrate additional examples of circuit components to control the power state of processing circuits 614 and memory 616. In FIG. 11A, source follower 610 includes a programmable current source 1102, differential amplifier 1030 includes a programmable current source 1104, whereas output stage 1032 includes a programmable current source 1106. The programmable current sources can adjust the power states of source follower 610 and quantizer/comparator 607, with a low current leading to a low power state and vice versa. The current supplied by programmable current source 1102 can be controlled via a current$_{SF}$ signal, whereas the currents supplied by programmable current sources 1104 and 1106 can be controlled via a current$_{ADC}$ signal. Both current$_{SF}$ and current$_{ADC}$ signals can be generated by local power state control circuit 826.

The current supplied by the current sources can also adjust the performances of source follower 610 and quantizer/comparator 607. For example, a lower current can lead to a lower performance of source follower 610 and quantizer/comparator 607 (e.g., increased noise, reduced bandwidth, lower quantization resolution, etc.), whereas a higher current can lead to an improved performance (e.g., higher quantization resolution).

FIG. 11B illustrates an example of a mapping table 1110 between total currents supplied by programmable current sources 1104 and 1106 and quantization resolutions. As shown in table 1110, with total current at IQ0, IQ1, IQ2, IQ3, and IQ4, the quantization resolution provided by quantizer/comparator 607 is at, respectively, 1-bit, 2-bit, 4-bit, 8-bit, and 16-bit resolutions. In some examples, local processing circuits power state control circuit 930 can refer to mapping table 1110 to set the current$_{ADC}$ signal based on a target quantization resolution, which in turn can be based on a target power state/profile. Moreover, as described above, local memory power state control circuit 928 can also selectively enable a subset of bit cells of memory 616 based on the quantization resolution. For example, if total current is at IQ2 and the comparator 607 can only provide 4-bit resolution, local memory power state control circuit 928 can disable all except four bit cells to store a 4-bit quantization result.

Figure 11C:
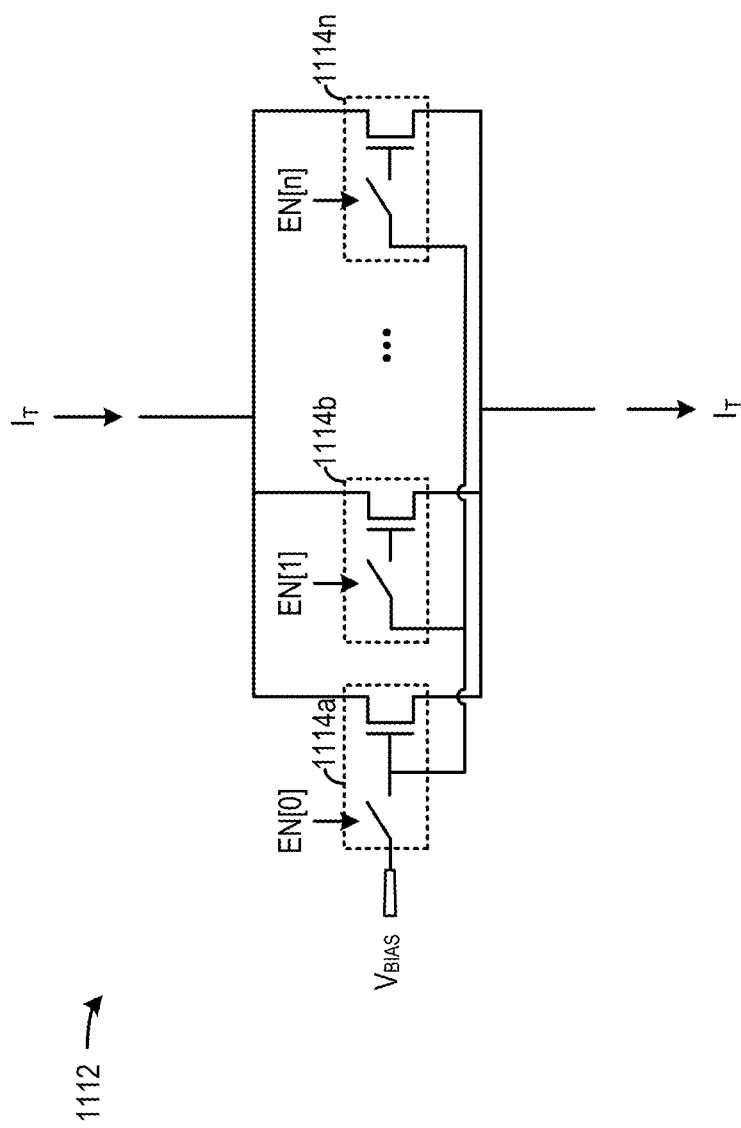
Figure 11D:
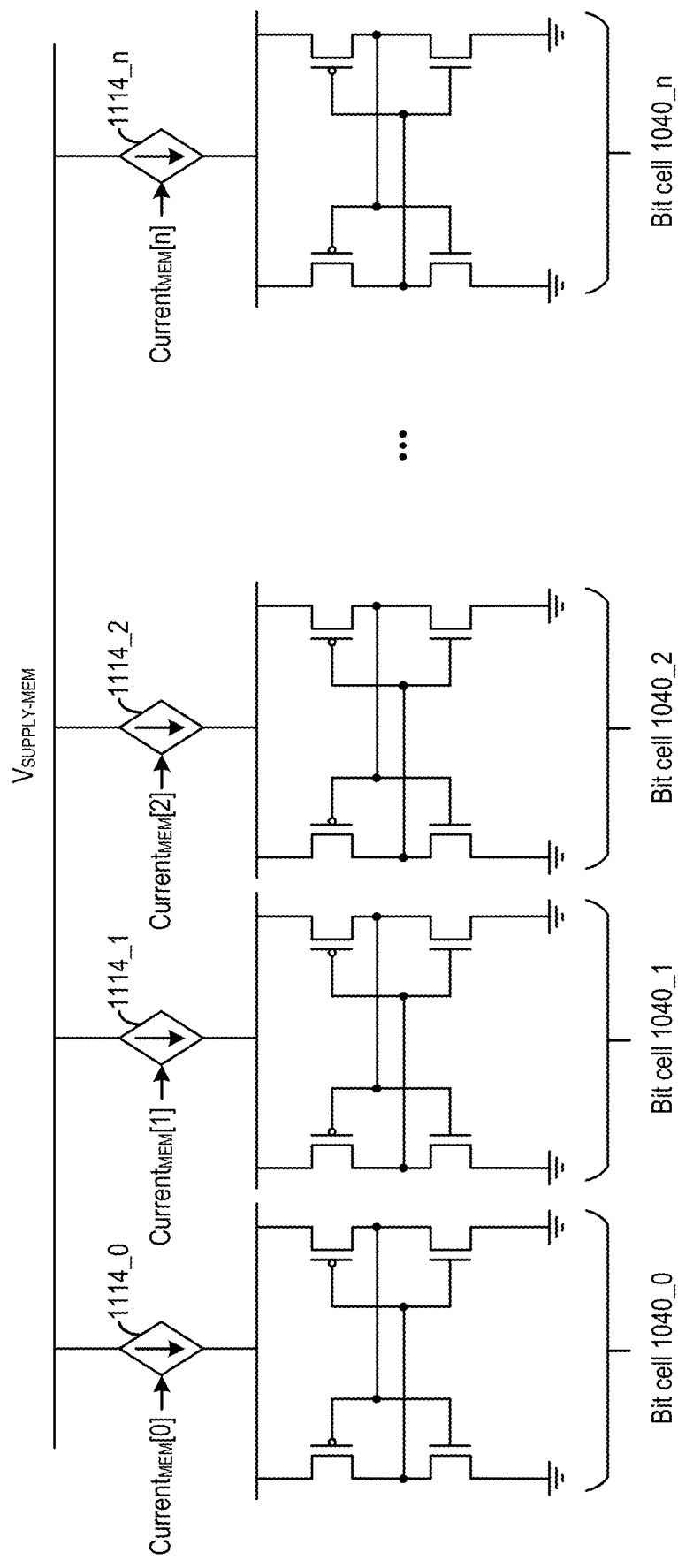

FIG. 11C illustrates an example of a programmable current source 1112 that can be part of programmable current sources 1102, 1104 and 1106 of FIG. 11A. As shown in FIG. 11C, programmable current source 1112 can include multiple switchable current sources, such as 1114, 1114b, 1114n, etc. The total current supplied by the programming current source 1112, labelled $I_T$, is based on how many of the switchable current sources are enabled. Each switchable current source can be enabled/disabled by, for example, connecting/disconnecting the current source to/from the bias voltage $V_{BIAS}$. Programmable current source 1112 can receive an array of programming bits EN (e.g., EN[0], EN[1], EN[n], etc.), with each programming bit to control whether a current source is connected to or disconnected from the bias voltage. When all current sources are disabled, the circuit that receives the current from programmable current 1112 can be disabled.

In some examples, memory 616 can also include programmable current sources. For example, referring to FIG. 11D, each of bit cells (e.g., 1040_0, 1040_1, 1040_2, 1040_n, etc.) can be connected to a programmable current source (e.g., 1114_0, 1114_1, 1114_2, 1114_n) to control a current that flows through each bit cell. Each programmable current source can be programmed based on a separate current$_{MEM}$ signal (e.g., current$_{MEM}$[0] for bit cell 1040_0, current$_{MEM}$[1] for bit cell 1040_1, current$_{MEM}$[n] for bit cell 1040_n, etc.). In some examples, the programmable current sources can also set a total current that flows through multiple bit cells, such as MSBs and LSBs, in similar fashion as FIG. 10D. Referring back to FIG. 11A, current$_{MEM}$ signals can be provided by local memory power state control circuit 928.

The programmable current sources can control an operation mode of memory 616. FIG. 11E illustrates a mapping table 1120. As shown in FIG. 11E, each bit cell (or a set of bit cells) can operate in one of three modes based on the total current supplied by the programmable current source. For example, when the programmable current source is completely disabled and no current is supplied to the bit cell, the bit cell can be disabled and supports no memory operation. In this mode, the main power consumption by the bit cell is due to flow of leakage current. Moreover, when the programmable current source is programmed to provide a current of IM0, the bit cell can operate in a partial operation mode where it retains the previously stored data but cannot support read/write access. Further, when the programmable current source is programmed to provide a current of IM1 higher than IM0, the bit cell can operate in a full operation mode in which the bit cell supports full read/write access.

Referring back to FIG. 11A, the programmable current sources 1102-1106, as well as the programmable quantization resolutions provided by quantizer/comparator 607, can support a temporal power state control operation, in which the control circuits can vary the power state of different processing circuits and memory power sub-domains with respect to time, to further reduce power consumption. For example, the quantization resolutions provided by quantizer/comparator 607 and the number of enabled bit cells of memory 616 can be initially set to support a low resolution operation to detect presence of light. Once light is detected, the quantization resolutions provided by quantizer/comparator 607 and the number of enabled bit cells of memory 616 can be increased to provide high resolution measurement of the light intensity. The temporal power state control operation can also involve a combination of pixel mapping programming data as well as row/column level power state signals.

Figure 12:
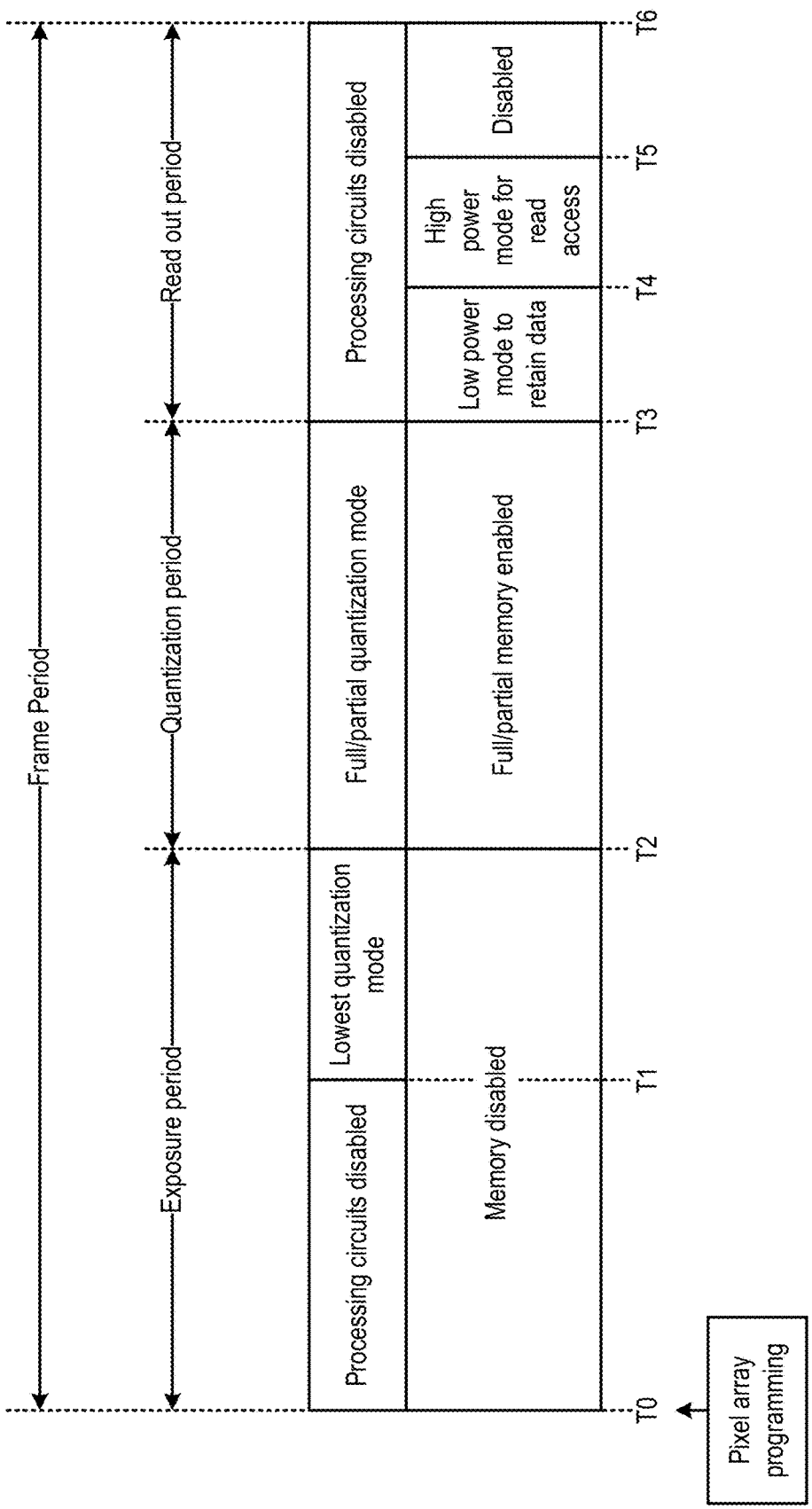
FIG. 12 illustrate an example operation of the example image sensor based on example techniques described in FIG. 7A-FIG. 11E.

FIG. 12 illustrates an example of a temporal power state control operation sequence 1200 to be performed at a pixel cell (or a block of pixel cells) of image sensor 704 based on the techniques described in FIG. 7A-FIG. 11E. The temporal power state control operation sequence is to be performed over a frame period between times T0 and T6 to generate a frame.

At or before time T0, the pixel cell may receive programming data, in the form of external configuration signal 844, from a pixel array programming map that selects the pixel cell to perform a light measurement operation. In a case where the programming data indicates that the pixel cell is to be disabled, processing circuits 614 and memory 616 of the pixel cell may be disabled over the entire frame period.

The exposure period for the pixel cell is between times T0 and T2. During the exposure period, one or more photodiodes (e.g., photodiode 602) can detect light and generate charge in response to the light, and the charge can be stored at charge storage device 606 (e.g., a floating diffusion). Between times T0 and T1, both processing circuits 614 and memory 616 can be disabled to reduce power if no quantization operation is performed during the exposure period. The disabling can be based on, for example, column state control circuit 822 transmitting column power state signal 834, which can carry a zero supply voltage $V_{SUPPLY-PC}$ for processing circuits 614 and $V_{SUPPLY-MEM}$ for memory 616, a zero bias voltage $V_{BIAS}$, etc., or digital codes representing zero $V_{SUPPLY-PC}$, $V_{SUPPLY-MEM}$, and/or $V_{BIAS}$, to a column of pixel cells. Local power state control circuit 826 can also generate local signals (e.g., SW$_{SF}$, current$_{SF}$, SW$_{ADC}$, current$_{ADC}$, SW$_{MEM}$, Current$_{MEM}$, etc.) based on column power state signal 834. Other circuits, such as pre-charge circuit 624 and bias generator 626, clocking circuits, sense amplifier circuits, MIPI interface circuits, etc., can also be powered down.

Towards the end of the exposure period, between times T1 and T2, processing circuits 614 can be controlled by local processing circuits power state control circuit 930 of the pixel cell to operate at the lowest quantization mode, e.g., with 1-bit quantization resolution. Processing circuits 614 can operate at the lowest quantization mode to detect whether the intensity of light received by the photodiode (represented by the voltage at charge storage device 606) exceeds a threshold. If it is not, this may indicate that image sensor 704 operates in a dark environment where no image frame is to be generated, and the processing circuits and the memory can continue to be disabled for the rest of the frame period. But if the intensity of light exceeds the threshold, local processing circuits power state control circuit 930 can start the quantization operation after the exposure period ends. Local processing circuits power state control circuit 930 can control processing circuits 614 to enter the lowest quantization mode when column state control circuit 822 adjusts the column power state signal 834 to transmit the full $V_{SUPPLY}$ and $V_{BIAS}$ signals, while local processing circuits power state control circuit 930 can select the current$_{SF}$ and current$_{ADC}$ signals based on table 1110 of FIG. 11B. Moreover, DAC 622 can be enabled to supply the threshold, and bias generator 626 can also be enabled. Meanwhile, memory 616 and counter 620 can remain disabled during the exposure period until time T2.

If the intensity of light received by the pixel cell within the exposure period exceeds the threshold, local power state control circuit 826 can start a quantization operation within a quantization period between times T2 and T3. Within the quantization period, local processing circuits power state control circuit 930 can select the current$_{SF}$ and current$_{ADC}$ signals for processing circuits 614 to achieve a target quantization resolution specified by, for example, programming data from the pixel array programming map. Local memory power state control circuit 928 can also enable a subset (or all) of bit cells of memory 616 to store the quantization result based on the target quantization resolution. Meanwhile, column power state control circuit 922 can also enable other circuits, such as DAC 622 and counter 620 for each column to support the quantization operations for the pixel cells of the column. For example, the counter 620 can be enabled to generate count values which can be fed to memory 616 as a digital ramp, and to DAC 622 to generate an analog ramp for VREF. A count value from counter 620 representing the quantization result can be stored at memory

616 at the end of quantization period. Other circuits that support the quantization and memory operations, such as clocking circuits, can also be enabled, whereas the sense amplifier circuits and the MIPI interface circuits can remain disabled.

After the quantization operation completes at time T3, processing circuits 614 can be disabled within the entire read out period between times T3 and T6, in which quantization results stored in memory 616 of each column (or each row) takes turn to be read out via pixel data output circuit 807. The disabling of processing circuits 614 can be based on, for example, column state control circuit 822 transmitting a column power state signal 834 for processing circuits 614, which can carry a zero supply voltage $V_{SUPPLY-PC}$, a zero bias voltage $V_{BIAS}$, etc., or digital codes representing zero $V_{SUPPLY-PC}$ and/or $V_{BIAS}$, to a column of pixel cells. Local power state control circuit 826 can also generate local signals (e.g., $SW_{SF}$, $current_{SF}$, $SW_{ADC}$, $current_{ADC}$, etc.) based on column power state signal 834. Moreover, circuits that support the quantization operations, such as counter 620, DAC 622, and bias generator 626 can also be disabled.

Meanwhile, memory 616 of each column can cycle through multiple power states during the read out period. For example, between times T3 and T4, when memory 616 of a column is waiting to be read out, local memory power state control circuit 928 can control the subset of bit cells of memory 616 that stores the quantization result to enter a low power mode so that the bit cells can retain the stored data but does not provide read/write access. Between times T4 and T4, when it is the memory's turn to be read out, local memory power state control circuit 928 can control the subset of bit cells of memory 616 to enter a full power mode to allow read access. Moreover, in a case where memory 616 includes DRAM devices, pre-charge circuit 624 for each column can also be enabled to pre-charge the DRAM devices prior to the read out operation. Between times T5 and T6, after the stored data is read out and transmitted to the host device, local memory power state control circuit 928 can disable memory 616, as well as pre-charge circuit 624.

The multiple power states of memory 616 can also be controlled based on column state control circuit 822 transmitting another column power state signal 834 for memory 616. For example, between times T3 and T4, column state control circuit 822 can transmit a column power state signal 834 indicating a low supply voltage $V_{SUPPLY-MEM}$, a low bias current represented by $current_{MEM}$, etc., to cause memory 616 to operate in a low power mode. Between times T4 and T5, column state control circuit 822 can transmit an updated column power state signal 834 indicating a high supply voltage $V_{SUPPLY-MEM}$, a high bias current represented by $current_{MEM}$, etc., to cause memory 616 to operate in a high power mode. And then between times T5 and T6, column state control circuit 822 can transmit a further updated column power state signal 834 indicating zero supply voltage $V_{SUPPLY-MEM}$ and/or zero bias current to disable memory 616.

In addition, during the read out period, the sense amplifier circuits and the MIPI interface circuits are also enabled to enable transmission of data read out from the memory to the host device. These circuits can be disabled after the read out operations and transmission of data from the memory complete.

FIG. 13 is a flowchart of an example method 1300 for generating image data. Method 1300 can be performed by, for example, pixel cell array control circuit 716 of image sensor 704. As described above, image sensor 704 may include pixel cell array 716, processing circuits 614, and memory 616. The processing circuits can also include comparators to quantize the voltages output by the pixel cells to generate quantization results, whereas the memory can include banks of memory devices to store the quantization results. The image sensor may also include other circuits, such as an analog threshold generation circuit to generate an analog threshold voltage (e.g., an analog ramp, a static threshold voltage, etc.), a digital ramp circuit (e.g., counter) to generate a digital ramp, to support the quantization operations by the processing circuits, as well as a bias generator to generate bias voltages for the processing circuits.

In some examples, the processing circuits and the memory banks can be divided into quantization units, where each quantization unit can be shared by a group of pixel cells, with each group of pixel cells comprising a block (e.g., a sub-array) of pixel cells, a row of pixel cells, or a column of pixel cells. In some examples, each pixel cell can include a quantization unit including a comparator and a bank of memory devices. The analog threshold generation circuit and the counter can be shared by all pixel cells within the array, or a row/column of pixel cells.

The processing circuits can be associated with a processing circuits power domain, whereas the memory can be associated with a memory power domain. Each of the processing circuits power domain and memory power domain further comprises a hierarchy of power sub-domains. For example, referring to FIG. 9A-FIG. 9C, first level processing circuits power sub-domains can be associated with processing circuits 614 of different columns of pixel cells, whereas second level processing circuits power sub-domains can be associated with processing circuits 614 of different pixel cells. The analog threshold generation circuit, the counter, and the bias generator can each be associated with a different first level or second level processing circuits power sub-domains. Moreover, first level memory power sub-domains can be associated with memory 616 of different columns of pixel cells, second level memory power sub-domains can be associated with memory 616 of different pixel cells, whereas third level memory power sub-domains can be associated with different subsets of bit cells of a bank of memory devices of memory 616 of a pixel cell.

In step 1302, pixel cell array control circuit 716 may receive a pixel array programming map, the pixel array programming map comprising programming data targeted at each block of pixel cells of an array of pixel cells of the image sensor. As described above, a pixel array programming map, such as pixel array programming map 720, can contain programming data targeted at each block of pixel cells to, for example, enable the block of pixel cells to measurement an intensity of light and to generate a quantization result, or to disable the block of pixel cells. The programming map can enable a subset of the pixel cells of the array to perform a sparse imaging operation. The programming data may also set other attributes of the measurement and quantization operations, such as a quantization resolution, a length of an exposure period, etc., for each block of pixel cells. As described above, each block of pixel cells can include a pixel cell or a sub-array of pixel cells.

In step 1304, pixel cell array control circuit 716 can transmit the programming data to each targeted block of pixel cells to individually configure first power states of the processing circuits associated with different processing circuits power sub-domains and to individually configure second power states of banks of memory associated with different memory power sub-domains.

Specifically, local power state control circuit 826 at each block of pixel cells can receive external configuration signal 844 representing the programming data targeted at the block of pixel cells, and determine the first power state for the processing circuits and the second power state for the bank of memory devices of the block of pixel cells based on external configuration signal 844. For example, if the programming data indicate that the block of pixel cells is to be disabled, local power state control circuit 826 can set the power sub-domains of the processing circuits and the bank of memory devices at a disabled state. On the other hand, if the programming data indicate that the block of pixel cells is to be enabled, local power state control circuit 826 can set the power sub-domains of the processing circuits and the bank of memory devices at an enabled state. The programming data can also indicate a quantization resolution, and local power state control circuit 826 can set the power sub-domains of the processing circuits and the bank of memory devices based on the quantization resolution. For example, local power state control circuit 826 can set a bias current, using the techniques described in FIG. 11A-FIG. 11E, for the processing circuits based on the quantization resolution. Local power state control 826 can also enable/disable a subset of bit cells of the memory based on the quantization resolution.

In step 1306, pixel cell array control circuit 716 can transmit a global processing circuits power state control signal to configure the processing circuits of the processing circuits power domain to switch from the first power states to a same third power state.

Specifically, the global processing circuits power state control signal can set an upper bound of the power state of all processing circuits associated with the global processing circuits power domain. For example, if the global processing circuits power state control signal signals that all processing circuits are disabled, this can overwrite the programming data targeted at each block of pixel cells and disable all processing circuits, including those that are enabled by the programming data. The global processing circuits power state control signal can be in the form of a bias voltage, a supply voltage, etc. Pixel cell array control circuit 716 can modulate the global processing circuits power state control signal to support a temporal power state control operation. Referring to FIG. 12, during the exposure period, the global processing circuits power state control signal can disable all processing circuits, including processing circuits of a subset of the pixel cells that are enabled to perform light measurement operation. Moreover, during the quantization period, the global processing circuits power state control signal can enable all processing circuits of blocks of pixel cells that are selected by the programming data to perform the light measurement operation. Further, after the quantization period ends, the global processing circuits power state control signal can disable all processing circuits again.

In step 1308, pixel cell array control circuit 716 can transmit a global memory power state control signal to configure the memory of the memory power domain to switch from the second power states to a same fourth power state.

Specifically, the global memory power state control signal can set an upper bound of the power state of all memory devices associated with the global memory power domain. For example, if the global memory power state control signal signals that all memory devices are disabled, this can overwrite the programming data targeted at each block of pixel cells and disable all memory devices, including those that are enabled by the programming data. The global memory power state control signal can also be in the form of a bias voltage, a supply voltage, etc. Pixel cell array control circuit 716 can modulate the global memory power state control signal to support a temporal power state control operation. Referring to FIG. 12, during the exposure period, the global circuits power state control signal can disable all memory devices, including the memory devices of a subset of the pixel cells that are enabled to perform light measurement operation. Moreover, during the quantization period, the global circuits power state control signal can enable all memory devices, or a subset of the memory devices, of blocks of pixel cells that are selected by the programming data to perform the light measurement operation based on the quantization resolution specified by the programming data. Further, after the quantization period ends, the global memory power state control signal can be modulated to operate the memory devices in a low power mode to retain stored data, followed by a high power mode to support read out operations, and in disabled mode after the read out operations complete. Pixel cell array control circuit 716 can set the power state of memory of each column of pixel cells sequentially, as well as the supporting circuits to support the memory read out operations for that column (e.g., pre-charge circuit), based on modulating a column memory power state control signal for each column.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
an array of pixel cells, each pixel cell of the array of pixel cells including one or more photodiodes configured to detect light;
processing circuits being associated with blocks of pixel cells of the array of pixel cells, the processing circuits being configured to quantize an intensity of the light detected by the one or more photodiodes of the associated block of pixel cells to generate quantization results, the processing circuits further being associated with first hierarchical power domains comprising a processing circuits power domain and processing circuits power sub-domains, wherein the processing circuits associated with different blocks of pixel cells are associated with different processing circuits power sub-domains;
banks of memory devices, each bank of memory devices being associated with a block of pixel cells, the bank of memory devices being configured to store the quantization results of the associated block of pixel cells, the banks of memory devices further being associated with second hierarchical power domains comprising a memory power domain and memory power sub-domains, wherein the banks of memory devices associated with different blocks of pixel cells are associated with different memory power sub-domains;
a processing circuits power state control circuit configured to control a power state of the processing circuits;
a memory power state control circuit configured to control a power state of the banks of memory devices; and
a pixel cell array control circuit configured to:
receive a pixel array programming map, the pixel array programming map comprising programming data targeted at each block of pixel cells of the array of pixel cells;
transmit the programming data to each targeted block of pixel cells to individually configure first power states of the processing circuits associated with different processing circuits power sub-domains and to individually configure second power states of banks of memory associated with different memory power sub-domains;
transmit, using the processing circuits power state control circuit, a global processing circuits power state control signal to configure the processing circuits of the processing circuits power domain to switch from the first power states to a same third power state; and
transmit, using the memory power state control circuit, a global memory power state control signal to configure the banks of memory devices of the memory power domain to switch from the second power states to a same fourth power state.

2. The apparatus of claim 1, wherein each block of pixel cells comprises a pixel cell, and wherein the processing circuits and a bank of memory devices associated with the block of pixel cells are part of the pixel cell.

3. The apparatus of claim 1, wherein each block of pixel cells comprises a plurality of pixel cells, and wherein each pixel cell of the block takes turns in accessing the processing circuits and a bank of memory devices associated with the block of pixel cells.

4. The apparatus of claim 1, wherein the processing circuits power domain is associated with the processing circuits of each block of pixel cells;
wherein the first hierarchical power domains further include first level processing circuits power sub-domains and second level processing circuits power sub-domains;
wherein each first level processing circuits power sub-domain is associated with processing circuits of blocks of pixel cells of the same column; and
wherein each second level processing circuits power sub-domain is associated with processing circuits of a block of pixel cells.

5. The apparatus of claim 4, wherein the processing circuits power state control circuit comprises:
a global processing circuits power state control circuit configured to set a power state of all processing circuits of the processing circuits power domain; and
column processing circuits power state control circuits configured to individually set a power state of the processing circuits of each column of blocks of pixel cells associated with each first level processing circuits power domain; and
wherein each block of pixel cells includes a local processing circuits power state control circuit configured to set a power state of the processing circuits of the block of pixel cells associated with a second level processing circuits power domain.

6. The apparatus of claim 5, wherein the global processing circuits power state control circuit is configured to transmit the global processing circuits power state control signal to each column processing circuits power state control circuit to set an upper limit of the power state of all processing circuits of the processing circuits power domain;
wherein each column processing circuits power state control circuit is configured to, based on the global processing circuits power state control signal, transmit a column processing circuits power state control signal to each block of pixel cells of the column to set an upper limit of the power state of all processing circuits of the column; and
wherein the local processing circuits power state control circuit of each block of pixel cells is configured to set the power state of the processing circuits of the block of pixel cells based on the column processing circuits power state control signal and the programming data.

7. The apparatus of claim 1, wherein the memory power domain is associated with the bank of memory devices of each block of pixel cells;
wherein the second hierarchical power domains further include first level memory power sub-domains and second level memory power sub-domains;
wherein each first level memory power sub-domain is associated with banks of memory devices of blocks of pixel cells of the same column; and
wherein each second level memory power sub-domain is associated with a bank of memory devices of a block of pixel cells.

8. The apparatus of claim 7, wherein the second hierarchical power domains further include third level memory power sub-domains associated with different subsets of memory devices within a bank of memory devices.

9. The apparatus of claim 8, wherein the memory power state control circuit comprises:
a global memory power state control circuit configured to set a power state of all banks of memory devices of the memory power domain; and
column memory power state control circuits configured to individually set a power state of the banks of memory devices of each column of blocks of pixel cells associated with each first level memory power domain; and
wherein each block of pixel cells includes a local memory power state control circuit configured to set power states of different subsets of memory devices of the bank of memory devices of the block of pixel cells associated with different third level memory power domains of the second level memory power domain of the block of pixel cells.

10. The apparatus of claim 9, wherein the global memory power state control circuit is configured to transmit the global memory power state control signal to each column memory power state control circuit to set an upper limit of the power state of all banks of memory devices of the memory power domain;
wherein each column memory power state control circuit is configured to, based on the global memory power state control signal, transmit a column memory power state control signal to each block of pixel cells of the column to set an upper limit of the power state of all banks of memory devices of the column; and
wherein the local memory power state control circuit of each block of pixel cells is configured to set the power states of the different subsets of memory devices of the bank of memory devices of the block of pixel cells based on the column memory power state control signal and the programming data.

11. The apparatus of claim 1, wherein the programming data indicate, for each block of pixel cells, one of: the block of pixel cells being fully enabled, the block of pixel cells being disabled, or a performance mode of the block of pixel cells.

12. The apparatus of claim 11, wherein the processing circuits associated with a block of pixel cells comprise a quantizer;
wherein the programming data indicate a quantization resolution of the quantizer; and
wherein the quantizer is configured based on at least one of the programming data or the global processing circuits power state control signal to generate the quantization result at the quantization resolution; and
wherein a subset of memory devices of the bank of memory devices associated with the block of pixel cells is configured based on at least one of the programming data or the global memory power state control signal to store the quantization result having the quantization resolution.

13. The apparatus of claim 12, wherein the quantizer is configured to generate the quantization result at the quantization resolution based on setting a bias current, the bias current being based on the at least one of the programming data or the global processing circuits power state control signal.

14. The apparatus of claim 1, wherein the banks of memory devices are configured to operate, based on the global memory power state control signal, in one of: a fully disabled mode, a full operation mode that supports read and write access operations, and a partial operation mode that retains the stored data but does not support read and write access operations.

15. The apparatus of claim 1, further comprising:
a bias generator configured to supply bias voltages to the processing circuits; and
a digital ramp circuit and an analog threshold generation circuit configured to supply signals to the processing circuits to support the generation of the quantization results by the processing circuits;
wherein the bias generator, the digital ramp circuit, and the analog threshold generation circuit are associated with different processing circuits power sub-domains of the processing circuits power domain; and
wherein the pixel cell array control circuit is configured to:
transmit the programming data to enable a subset of the blocks of pixel cells;
within a first part of an exposure period, transmit a first global processing circuits power state control signal and a first global memory power state control signal to disable all processing circuits, the bias generator, the digital ramp circuit, and the analog threshold generation circuit of the processing circuits power domain and all banks of memory devices of the memory power domain;
within a second part of the exposure period, transmit a second global memory power state control signal to cause the processing circuits of the subset of the blocks of pixel cells to operate in a low power mode, and to enable the analog threshold generation circuit to supply a static threshold to the processing circuits, to determine whether light of a threshold intensity is received by the array of pixel cells;
within a quantization period, transmit a second global processing circuits power state control signal and a third global memory power state control signal to enable the processing circuits, the digital ramp circuit, the analog threshold generation circuit, and the banks of memory devices of the subset of the blocks of pixel cells to generate and store quantization results based on the programming data; and
after the quantization period ends, transmit a third global processing circuits power state control signal to disable the processing circuits of the subset of the blocks of pixel cells, and to disable the digital ramp circuit and the analog threshold generation circuit.

16. The apparatus of claim 15, further comprising interface circuits configured to transmit data from the banks of memory devices to an external host device;
wherein the pixel cell array control circuit is further configured to:
within a first part of a read out period after the quantization period, transmit a fourth global memory power state control signal to cause the banks of memory devices of the subset of the blocks of pixel cells to retain the quantization results, and to disable the interface circuits;
within a second part of the read out period, transmit a fifth global memory power state control signal to columns of blocks of pixel cells sequentially to perform a read out operation from the banks of memory devices of each of the columns of blocks of pixel cells, and to enable the interface circuits to transmit data obtained from the read out operations to the host device; and transmit a sixth global memory power state control signal to the columns of blocks of pixel cells sequentially to disable the banks of memory devices of each of the columns of blocks of pixel cells, and to disable the interface circuits, after the read out operations complete for the column.

17. The apparatus of claim 16, wherein the banks of memory devices comprise dynamic random access memory (DRAM) devices; and wherein the apparatus further comprises, for each column of blocks of pixel cells, a pre-charge circuit configured to pre-charge the banks of memory devices of the column prior to read out operations, each pre-charge circuit of a column being associated with the memory power sub-domain as the banks of memory devices of the column;

wherein the fifth global memory power state control signal enables the pre-charge circuit of each column sequentially prior to the read out operations for the column; and wherein the sixth global memory power state control signal disables the pre-charge circuit of each column after the read out operations complete for the column.

18. A method comprising:

receiving a pixel array programming map, the pixel array programming map comprising programming data targeted at each block of pixel cells of an array of pixel cells of an image sensor, the image sensor further comprising processing circuits and banks of memory devices, the processing circuits and the banks of memory devices being associated with blocks of pixel cells of the array of pixel cells, the processing circuits further being associated with first hierarchical power domains comprising a processing circuits power domain and processing circuits power sub-domains, the banks of memory devices further being associated with second hierarchical power domains comprising a memory power domain and memory power sub-domains, wherein the processing circuits associated with different blocks of pixel cells are associated with different processing circuits power sub-domains, and wherein the banks of memory devices associated with different blocks of pixel cells are associated with different memory power sub-domains;

transmitting the programming data to each targeted block of pixel cells to individually configure first power states of the processing circuits associated with different processing circuits power sub-domains and to individually configure second power states of banks of memory associated with different memory power sub-domains;

transmitting a global processing circuits power state control signal to configure the processing circuits of the processing circuits power domain to switch from the first power states to a same third power state; and transmitting a global memory power state control signal to configure the banks of memory devices of the memory power domain to switch from the second power states to a same fourth power state.

19. The method of claim 18, wherein the programming data is transmitted to enable a subset of the blocks of pixel cells; and wherein the method further comprises:

within a first part of an exposure period, transmitting a first global processing circuits power state control signal and a first global memory power state control signal to disable all processing circuits of the processing circuits power domain and all banks of memory devices of the memory power domain;

within a second part of the exposure period, transmitting a second global memory power state control signal to cause the processing circuits of the subset of the blocks of pixel cells to operate in a low power mode to determine whether light of a threshold intensity is received by the array of pixel cells;

within a quantization period, transmitting a second global processing circuits power state control signal and a third global memory power state control signal to enable the processing circuits and the banks of memory devices of the subset of the blocks of pixel cells to generate and store quantization results based on the programming data; and after the quantization period ends, transmitting a third global processing circuits power state control signal to disable the processing circuits of the subset of the blocks of pixel cells.

20. The method of claim 19, further comprising:

within a first part of a read out period after the quantization period, transmitting a fourth global memory power state control signal to cause the banks of memory devices of the subset of the blocks of pixel cells to retain the quantization results;

within a second part of the read out period, transmitting a fifth global memory power state control signal to columns of blocks of pixel cells sequentially to perform a read out operation from the banks of memory devices of each of the columns of blocks of pixel cells; and transmitting a sixth global memory power state control signal to the columns of blocks of pixel cells sequentially to disable the banks of memory devices of each of the columns of blocks of pixel cells after the read out operations complete.

* * * * *